United States Patent [19]
Tanaka et al.

[11] Patent Number: 5,923,883
[45] Date of Patent: Jul. 13, 1999

[54] OPTIMIZATION APPARATUS WHICH REMOVES TRANSFER INSTRUCTIONS BY A GLOBAL ANALYSIS OF EQUIVALENCE RELATIONS

[75] Inventors: Hirohisa Tanaka, Higashiosaka; Junko Sayama, Kusatsu; Akira Tanaka, Yahata, all of Japan

[73] Assignee: Matsushita Electric Industrial Co., Ltd., Osaka, Japan

[21] Appl. No.: 08/815,723

[22] Filed: Mar. 12, 1997

[30] Foreign Application Priority Data

Mar. 12, 1996 [JP] Japan .................................. 8-054746

[51] Int. Cl.[6] ...................................................... G06F 9/45
[52] U.S. Cl. ............................ 395/709; 395/704; 395/561
[58] Field of Search ...................................... 395/682, 685, 395/561, 581, 709, 204

[56] References Cited

U.S. PATENT DOCUMENTS

| 5,303,377 | 4/1994 | Gupta et al. | 395/709 |
| 5,530,964 | 6/1996 | Alpert et al. | 395/709 |
| 5,642,512 | 6/1997 | Tanaka et al. | 395/705 |
| 5,715,440 | 2/1998 | Ohmura et al. | 395/580 |
| 5,787,285 | 7/1998 | Lanning | 395/704 |
| 5,805,894 | 9/1998 | Robison | 395/709 |

FOREIGN PATENT DOCUMENTS 0171631  2/1986  European Pat. Off. .

OTHER PUBLICATIONS

"Generalized Landing Pads", Armonk, IBM Technical Disclosure Bulletin, vol. 37, No. 12, Dec. 1994.
"The Power of Assignment Motion", Knoop et al., ACM Sigplan Notices, vol. 30, No. 6, Jun. 1995.
"CTP—A Family of Optimizing Compilers for the NS32532 Microprocessor", Bendelac et al., IEEE International Conference on Computer Design, Oct. 3–5, 1988.

*Primary Examiner*—Zami Maung
*Attorney, Agent, or Firm*—Price Gess & Ubell

[57] ABSTRACT

The basic block division unit 2 divides the instruction sequence into basic blocks which are sequences with a continuous execution order. The control flow analysis unit 3 analyzes the control flow between basic blocks. The global equivalence relation analysis unit 4 traces the control flow between basic blocks and analyzes equivalence relations between resources, such as memory and registers, which cross over between basic blocks. The code is then optimized using these equivalence relations which cross over between basic blocks. In this way, the equivalence relations between resources in the program are analyzed globally and are used in the optimization of the code, so that a greatest possible reduction can be achieved in the code size and execution time of the program.

28 Claims, 35 Drawing Sheets

FIG. 1 PRIOR ART

```
f1
{                          _f1;
                                add    # -8,sp
                                mov    1,(sp+4)
              f2(1,2);          mov    2,(sp)
                                jsr    _f2
                                add    # 8,sp
                                rts
}                          _f2;
f2(int p1,int p2)               mov    r1,(sp-4)
{                               mov    r2,(sp-8)
       int a, b;                add    # -16,sp mov    (sp+24), r1
                                mov    (sp+20), r2
              a=p1+p2;          add    r1, r2
                                mov    r2,(sp+4)

mov    (sp+24), r1
                                mov    (sp+20), r2
              b=p1-p2;          sub    r2, r1
                                mov    r1,(sp)
              f3( );            jsr    _f3
                                add    # 16,(sp)
                                mov    (sp-8), r2
                                mov    (sp-4), r1
                                rts
```

(a) CASE WHERE INSTRUCTION 17 CANNOT BE REWRITTEN (b) CASE WHERE INSTRUCTION 17 CAN BE REWRITTEN

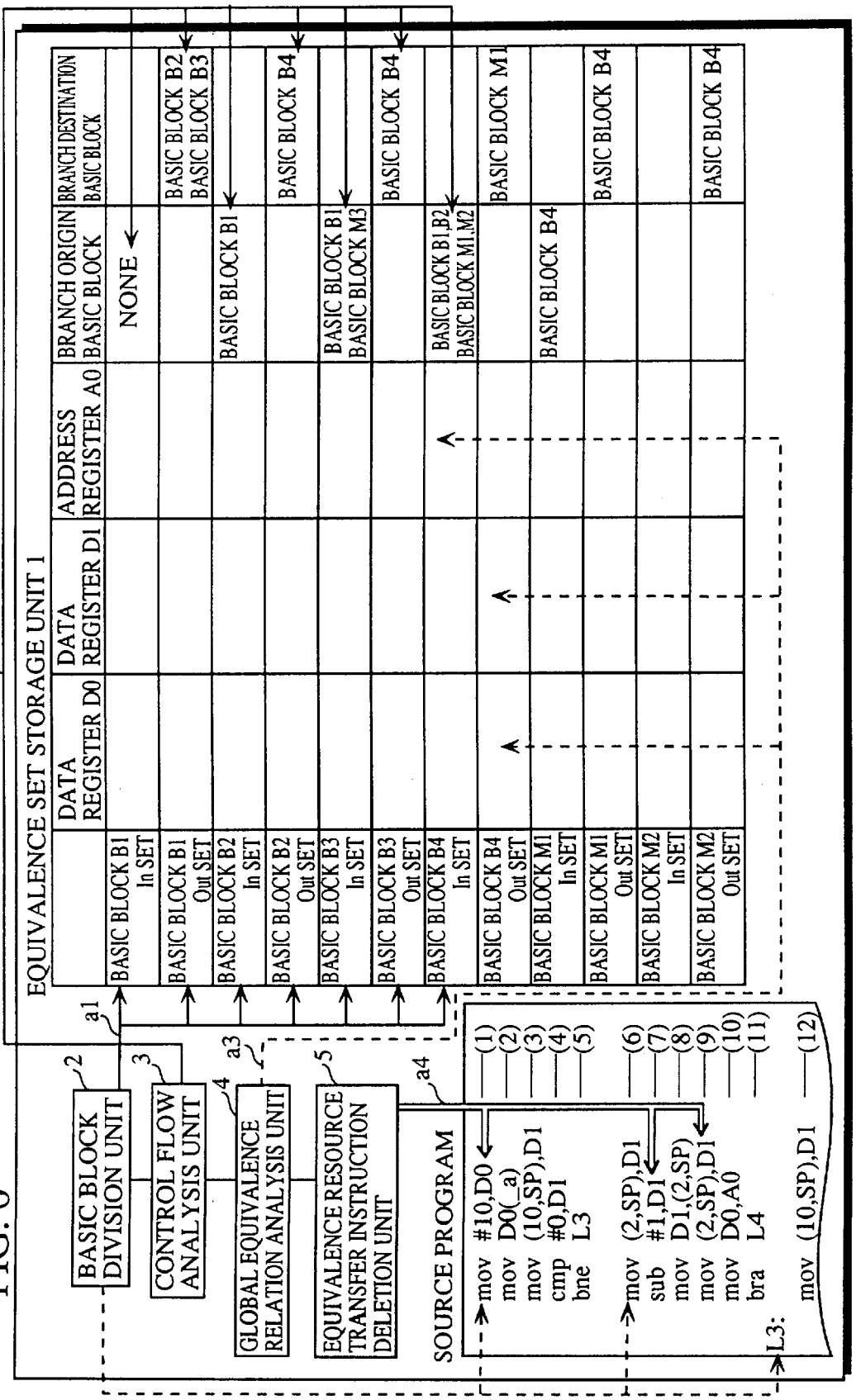

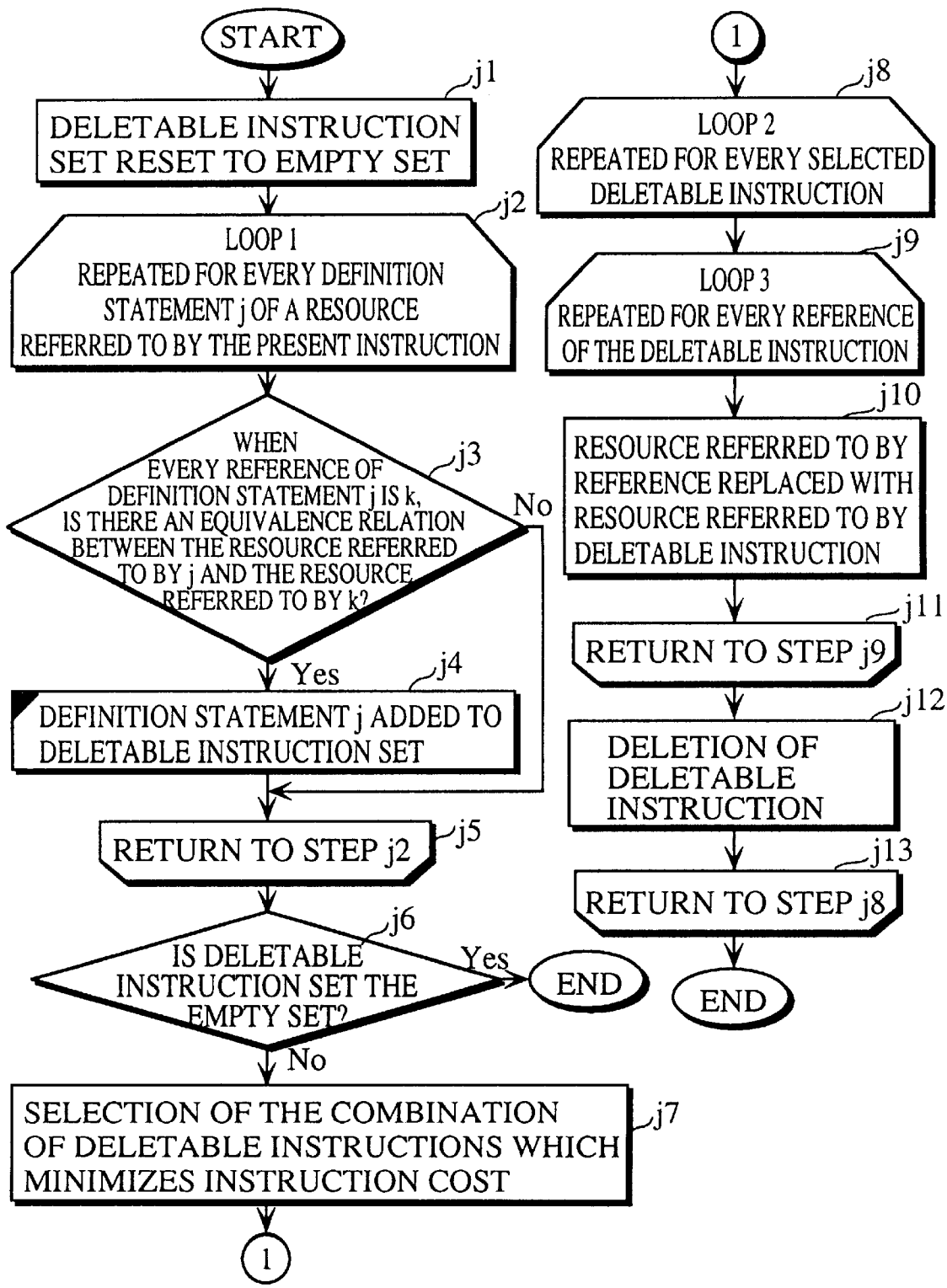

FIG. 17

BASIC BLOCK B1

$$\left.\begin{array}{l} D0 = \{\} \\ D1 = \{\} \\ A0 = \{\} \end{array}\right\} \text{In SET}$$

| INSTRUCTION | AFTER DELETION OF EQUIVALENCE RELATIONS | AFTER GENERATION OF EQUIVALENCE RELATIONS | |
|---|---|---|---|
| INSTRUCTION 1 : mov #10,D0 | D0= {} <br> D1= {} <br> A0= {} ←a | D0= {#10} ←b <br> D1= {} <br> A0= {} | (1) |
| INSTRUCTION 2 : mov D0,(_a) | D0= {#10} <br> D1= {} <br> A0= {} | D0= {#10,(_a)} <br> D1= {} <br> A0= {} | (2) |
| INSTRUCTION 3 : mov (10,SP),D1 | D0= {#10,(_a)} <br> D1= {} <br> A0= {} | D0= {#10,(_a)} <br> D1= {(10,SP)} <br> A0= {} | (3) |
| INSTRUCTION 4 : cmp #0,D1 | D0= {#10,(_a)} <br> D1= {(10,SP)} <br> A0= {} | D0= {#10,(_a)} <br> D1= {(10,SP)} <br> A0= {} | (4) |
| INSTRUCTION 5 : bne L3 | D0= {#10,(_a)} <br> D1= {(10,SP)} <br> A0= {} | D0= {#10,(_a)} <br> D1= {(10,SP)} <br> A0= {} | (5) |

FIG. 18

(a) UNIVERSAL SET

U = { #10,D0,(_a),(10,Sp),
    D1,#0,(2,SP),#1,A0,
    (20,SP),#100,(4,SP)}

ITERATION OF STEPS a2、a3、a4

```
       mov    #10,D0         —(1)
       mov    D0(_a)         —(2)      In   D0= {}      D1= {}       A0= {}
       mov    (10,SP),D1     —(3)      Out  D0= {#10,(_a)}
       cmp    #0,D1          —(4)           D1= {(10,SP)}   A0= {}
       bne    L3             —(5)

mov    (2,SP),D1      —(6)
       sub    #1,D1          —(7)
       mov    D1,(2,SP)      —(8)      In   D0=U  D1=U  A0=U
       mov    (2,SP),D1      —(9)      Out  D0=U- {D1,(2,SP)}
       mov    D0,A0          —(10)          D1= {(2,SP)}
       bra    L4             —(11)          A0=U- {D1,(2,SP)}
L3:
       mov    (10,SP),D1     —(12)
       mov    (20,SP),D0     —(13)     In   D0=U  D1=U  A0=U
       add    D1,D0          —(14)     Out  D0= {A0}   D1=U-
       mov    D0,A0          —(15)          {D0,A0}   A0= {D0}
L4:
       mov    #100,D1        —(16)
       mov    A0,D0          —(17)
       mov    D1,(4,SP)      —(18)     In   D0=U  D1=U  A0=U
       mov    D1,D0          —(19)     Out  D0=U- {A0}
       add    D0,A0          —(20)          D1=U- {A0}   A0= {}
       mov    (4,SP),D0      —(21)
```

FIG. 22

```
B1: In   D0=  {}         D1=  {}         A0=  {}
    Out  D0=  {#10,(_a)} D1=  {(10,SP)}  A0=  {}
B2: In   D0=  {#10,(_a)} D1=  {(10,SP)}  A0=  {}
    Out  D0=  {#10,(_a),A0}  D1=  {(2,SP)}  A0=  {#10,(_a),D0}
B3: In   D0=  {#10,(_a)} D1=  {(10,SP)}  A0=  {}
    Out  D0=  {A0}       D1=  {(10,SP)}  A0=  {D0}   ← c
B4: In   D0=  {A0}       D1=  {}         A0=  {D0}
    Out  D0=  {#100,(4,SP),D1}
         D1=  {#100,(4,SP),D0}  A0=  {}
```

FIG. 23(a)

```
        mov    #10,D0         ——(1)
        mov    D0(_a)          ——(2)
        mov    (10,SP),D1     ——(3)
        cmp    #0,D1           ——(4)
        bne    L3              ——(5)
                                    In   D0= {#10,(_a)}
                                         D1= {(10,SP)}   A0= {}
        mov    (2,SP),D1      ——(6)
        sub    #1,D1           ——(7)
        mov    D1,(2,SP)      ——(8)
        mov    (2,SP),D1      ——(9)
        mov    D0,A0           ——(10)
        bra    L4              ——(11)
                                    In   D0= {#10,(_a)}
                                         D1= {(10,SP)}   A0= {}
L3:
        mov    (10,SP),D1     ——(12)
        mov    (20,SP),D0     ——(13)
        add    D1,D0           ——(14)
        move   D0,A0           ——(15)
                                    In   D0= {A0}
L4:                                      D1= {}   A0= {D0}
        mov    #100,D1         ——(16)
        mov    A0,D0           ——(17)
        mov    D1,(4,SP)      ——(18)
        mov    D1,D0           ——(19)
        add    D0,A0           ——(20)
        mov    (4,SP),D0      ——(21)
```

FIG. 23(b)

```
        mov    #10,D0         ——(1)
        mov    D0(_a)          ——(2)
        mov    (10,SP),D1     ——(3)
        cmp    #0,D1           ——(4)
        bne    L3              ——(5)
                                    In   D0= {#10,(_a)}
                                         D1= {(10,SP)}   A0= {}
        mov    (2,SP),D1      ——(6)
        sub    #1,D1           ——(7)
        mov    D1,(2,SP)      ——(8)  DELETION mov    D0,A0           ——(10)
        bra    L4              ——(11)
                                    In   D0= {#10,(_a)}
                                         D1= {(10,SP)}   A0= {}
L3:                                 DELETION
        mov    (20,SP),D0     ——(13)
        add    D1,D0           ——(14)
        mov    D0,A0           ——(15)
                                    In   D0= {A0}
L4:                                      D1= {}   A0= {D0}
        mov    #100,D1         ——(16)  DELETION
        mov    D1,(4,SP)      ——(18)
        mov    D1,D0           ——(19)
        add    D0,A0           ——(20)  DELETION
```

FIG. 24 (a)

```
        mov    #1,D0        ―― 61
        mov    D0,(2,SP)    ―― 62
        mov    (4,SP),D1    ―― 63
        cmp    #1,D1        ―― 64
        beq    L2           ―― 65
        sub    #1,D1        ―― 66
        mov    D1,(4,SP)    ―― 67
        add    #2,D0        ―― 68
L2:
        mov    (4,SP),A0    ―― 69
        mov    A0,(8,SP)    ―― 70
```

FIG. 24 (b)

| INSTRUCTION | MEANING |
|---|---|
| mov A,B | CONTENT OF A STORED IN B |
| add A,B | CONTENTS OF A AND B ADDED, RESULT STORED IN B |
| sub A,B | CONTENT OF A SUBTRACTED FROM CONTENT OF B, RESULT STORED IN B |
| cmp A,B | CONTENTS OF A AND B COMPARED |
| beq label | WHEN RESULT OF COMPARISON IS EQUAL, BRANCH TO label |

FIG. 24 (c)

```
        mov    #1,D0       ⎫
        mov    D0,(2,SP)   ⎪
        mov    (4,SP),D1   ⎬ BASIC BLOCK B1
        cmp    #1,D1       ⎪
        beq    L2          ⎭ sub    #1,D1       ⎫
        mov    D1,(4,SP)   ⎬ BASIC BLOCK B2
        add    #2,D0       ⎭
L2:
        mov    (4,SP),A0   ⎫
        mov    A0,(8,SP)   ⎬ BASIC BLOCK B3
```

FIG. 25

INSTRUCTION COST TABLE
· CODE SIZE

| FIRST OPERAND | SECOND OPERAND | INSTRUCTION | | | |
|---|---|---|---|---|---|
| | | mov | add | sub | cmp |
| REGISTER | REGISTER | 1 | 1 | 1 | 1 |
| REGISTER | STACK | 2 | | | |
| REGISTER | REGISTER | 2 | | | |
| REGISTER | EXTERNAL MEMORY | 3 | | | |
| EXTERNAL MEMORY | REGISTER | 3 | | | |
| IMMEDIATE VALUE | REGISTER | 2 | 2 | 2 | 2 |

· EXECUTION TIME

| FIRST OPERAND | SECOND OPERAND | INSTRUCTION | | | |
|---|---|---|---|---|---|
| | | mov | add | sub | cmp |
| REGISTER | REGISTER | 1 | 1 | 1 | 1 |
| REGISTER | STACK | 1 | | | |
| STACK | REGISTER | 1 | | | |
| REGISTER | EXTERNAL MEMORY | 2 | | | |
| EXTERNAL MEMORY | REGISTER | 2 | | | |
| IMMEDIATE VALUE | REGISTER | 1 | 1 | 1 | 1 |

B1: In    D0= {}  D1= {}  A0= {}
    Out  D0= {#1,(2,SP)}  D1= {(4,SP)}  A0= {}
B2: In    D0= {#1,(2,SP)}  D1= {(4,SP)}  A0= {}
    Out  D0= {}  D1= {(4,SP)}  A0= {}
B3: In    D0= {}  D1= {(4,SP)}  A0= {}
    Out  D0= {}  D1= {A0,(4,SP),(8,SP)}
                 A0= {D1,(4,SP),(8,SP)}

FIG. 27

· COPY PROPAGATION (a)

```
mov    D0,D1          ——— 81
         ⸽  D1=D0
         ⸽
mov    D1,D2          ——— 82
```

⇓ COPY PROPAGATION (b)

```
(INSTRUCTION 81 DELETED)
    ⸽
mov    D0,D2          ——— 83
```

FIG. 28(a)

|   |   |   |
|---|---|---|
| mov | (2,SP),D1 | —— 41 |
| mov | D0,A0 | —— 42 |
| cmp | #0,D1 | —— 43 |
| beq | L1 | —— 44 |
| sub | A0,D1 | —— 45 |
| mov | D1,(20,SP) | —— 46 |
| mov | (10,SP),A0 | —— 47 |
| sub | #1,A0 | —— 48 |
| mov | A0,(10,SP) | —— 49 |
| mov | D0,A0 | —— 50 |

L1:
|   |   |   |
|---|---|---|
| mov | A0,D1 | —— 51 |
| add | #1,D1 | —— 52 |

FIG. 28(b)

```
        mov   (2,SP),D1   ⎫
        mov   D0,A0       ⎬  BASIC BLOCK B1
        cmp   #0,D1       ⎪
        beq   L1          ⎭
        sub   A0,D1       ⎫
        mov   D1,(20,SP)  ⎪
        mov   (10,SP),A0  ⎬  BASIC BLOCK B2
        sub   #1,A0       ⎪
        mov   A0,(10,SP)  ⎪
        mov   D0,A0       ⎭
L1:
        mov   A0,D1       ⎫  BASIC BLOCK B3
        add   #1,D1       ⎭
```

```
B1: In   D0= {}   D1= {}        A0= {}
    Out  D0= {A0} D1= {(2,SP)}   A0= {D0}
B2: In   D0= {A0} D1= {(2,SP)}   A0= {D0}  ← d
    Out  D0= {A0} D1= {(20,SP)}  A0= {D0}
B3: In   D0= {A0} D1= {}         A0= {D0}  ← e
    Out  D0= {A0} D1= {}         A0= {D0}
```

FIG. 30

· ONLY INSTRUCTION 42 DELETED

| INSTRUCTIONS WHOSE OPERANDS ARE REPLACED | AFTER REPLACEMENT OF OPERANDS | CHANGE IN INSTRUCTION COST DUE TO REPLACEMENT(SIZE/TIME) | DELETED INSTRUCTION | INSTRUCTION COST OF DELETED INSTRUCTION(SIZE/TIME) | CHANGE COST (SIZE/TIME) |
|---|---|---|---|---|---|
| sub A0,D1<br>mov A0,D1 | sub D0,D1<br>mov D0,D1 | 0/0<br>0/0 | mov D0,A0 | 1/1 | −1/−1 |

· ONLY INSTRUCTION 50 DELETED

| INSTRUCTIONS WHOSE OPERANDS ARE REPLACED | AFTER REPLACEMENT OF OPERANDS | CHANGE IN INSTRUCTION COST DUE TO REPLACEMENT(SIZE/TIME) | DELETED INSTRUCTION | INSTRUCTION COST OF DELETED INSTRUCTION(SIZE/TIME) | CHANGE COST (SIZE/TIME) |
|---|---|---|---|---|---|
| mov A0,D1 | mov D0,D1 | 0/0 | mov D0,A0 | 1/1 | −1/−1 |

· INSTRUCTIONS 42,50 BOTH DELETED

| INSTRUCTIONS WHOSE OPERANDS ARE REPLACED | AFTER REPLACEMENT OF OPERANDS | CHANGE IN INSTRUCTION COST DUE TO REPLACEMENT(SIZE/TIME) | DELETED INSTRUCTION | INSTRUCTION COST OF DELETED INSTRUCTION(SIZE/TIME) | CHANGE COST (SIZE/TIME) |
|---|---|---|---|---|---|
| sub A0,D1<br>mov A0,D1 | sub D0,D1<br>mov D0,D1 | 0/0<br>0/0 | mov D0,A0 (INSTRUCTION 42)<br>mov D0,A0 (INSTRUCTION 50) | 1/1<br>1/1 | −2/−2 |

FIG. 31

```
        mov    (2,SP),D1      —— (41) (← mov  D0,A0  DELETED)
        cmp    #0,D1          —— (43)
        beq    L1             —— (44)
        sub    D0,D1          —— (45) (← sub  A0,D1  REPLACED)
        mov    D1,(20,SP)     —— (46)
        mov    (10,SP),A0     —— (47)
        sub    #1,A0          —— (48)
        mov    A0,(10,SP)     —— (49)
L1:                                  (← mov  D0,A0  DELETED)
        mov    D0,D1          —— (51) (← mov  A0,D1  REPLACED))
        add    #1,D1          —— (52)
```

OPTIMIZATION APPARATUS WHICH REMOVES TRANSFER INSTRUCTIONS BY A GLOBAL ANALYSIS OF EQUIVALENCE RELATIONS

BACKGROUND OF THE INVENTION

1. Field of the Invention

The present invention relates to an optimization apparatus which removes transfer instructions and replaces operands.

2. Description of the Prior Art

In recent years, a great number of information devices which use embedded microprocessors have been developed to meet a variety of needs. The software side of the development of such devices has focused on the acceleration of processing and the reduction of hardware cost (here, measured in terms of memory size). For embedded processors, programs have to be stored in ROM, so that increases in program size can greatly affect manufacturing cost. Consequently, programs used by embedded microprocessors need to be completely relieved of redundant transfer instructions and to be developed in assembly language to make the greatest possible use of microprocessor functions, such as addressing mode. However, the syntax rules used in assembly language are the instruction system of the processor itself, so that software development hag conventionally been inefficient and has had problems concerning portability.

Improvements in the efficiency of software development for embedded microprocessors have been conventionally achieved by developing software in a high-level programming language. This method, however, has the drawback that a large number of redundant instructions are generated when the program is compiled into machine language, leading to an increase in the memory size of the generated software.

The following is an explanation of why machine language programs which have been generated from a high-level programming language are large, with reference to FIG. 1. In FIG. 1, the machine language instructions corresponding to calculations written in a high-level programming language have been shown using a curved bracket "{".

In FIG. 1, the sequence of instructions from "mov 1, (sp+4)" to "jsr_f2" corresponds to the function call instruction "f2(1,2);" in the source program. This shows that in the present example, a subroutine call instruction for the subroutine f2 is translated into the three instructions, "mov 1, (sp+4)" to "jsr_f2".

In the same way, the sequence of instructions from "mov (sp+24), r1", "mov (sp+20), r2" to "add r1, r2", "mov r2, (sp+4)" corresponds as shown by the curved bracket to the instruction "a=p1+p2". This shows that the addition instruction "a=p1+p2" that uses variables which are only used in subroutine f2 is translated into four instructions made up of "mov (sp+24), r1" to "add r1, r2" and "mov r2, (sp+4)".

As another example, the sequence of instructions from "mov (sp+24), r1" to "sub r2, r1", "mov r1, (sp)" corresponds as shown by the curved bracket to "b=p1–p2". This shows that the subtraction instruction "b=p1–p2" which uses the automatic variable in subroutine f2 is translated into four instructions made up of "mov (sp+24), r1"to "sub r2, r1" and "mov r1, (sp)".

As described above FIG. 1 shows that the relationship between calculations written in high-level programming language and machine language instructions is a one-to-many relationship. From FIG. 1, it can be seen that a number of "mov" transfer instructions are generated to perform the calculations written in the high-level processing language. These transfer instructions include redundant instructions and instructions which could be omitted if the program were better written.

Since a plurality of transfer instructions are generated during compiling, there have been demands for optimization of the machine language instructions which result from the translation of high-level programming language instructions. Here, there have been especially strong demands for optimization of development efficiency and memory size when developing programs for embedded microprocessors. As conventional methods, propagation processing and convolution can improve the execution time and memory size of machine language instructions, while redundant code can be removed according to a method which removes redundant instructions which use equivalence relations.

The following is an explanation, with reference to FIG. 2, of this method which removes redundant instructions that use equivalence relations. Here, FIG. 2 shows the changes in the equivalence relations due to the execution of each instruction in a basic block.

When a program is rewritten, there is a risk that the algorithm will be destroyed due to the rewriting of jump instructions in the middle of a sequence or instructions which are the jump destinations in the middle of a sequence. As a result, optimization has only been possible when the execution order of the program is continuous. Here, sequences of consecutive instructions which do not feature a branch to another sequence and sequences of consecutive instructions which are not branched to by other sequences are called "basic blocks", and are used as the basic unit during optimization.

In the example program shown in FIG. 2, the branch instruction "bra L4" expresses a branch to the label L4. The conditional branch instruction "bne L3" is a branch instruction whose execution depends on the state of the zero flag, so that a branch to label L3 is performed when the zero flag is "0". Due to the existence of this conditional branch instruction "bne L3" and the branch instruction "bra L4", the program cannot be optimized in its initial state. As a result, the program is divided into basic blocks based on the branch instructions and their branch address labels.

In the example program shown in FIG. 2, the sequence of instructions from the transfer instruction "mov #10, D0__(1)" to the conditional branch instruction "bne L3__(5)" is set as one basic block. In the same way the sequence of instructions from the transfer instruction "mov (2, SP), D1__(6)" to the branch instruction "bra L4__(11)" set as another basic block. The sequence of instructions from the transfer instruction "mov (10, SP), D1__(12)," onwards includes the label L4 which is the branch address of the branch instruction "bra L4__(11)". Here, since the label L4 is attached to the transfer instruction "mov #100, D1__(16)", the sequence of instructions from the transfer instruction "mov (10,SP), D1__(12)" to the transfer instruction "mov D0, A0__(15)" is set as one basic block and the sequence of instructions from the transfer instruction "mov #100, D1__(16)" to the transfer instruction "mov (4,SP), D0__(21)" is set as another basic block.

After dividing the program into basic blocks in this way, equivalence relations in each block are investigated. Here, if the position before the first instruction of a basic block, the position between two adjacent instructions, and the position after the final instruction in a basic block are set as "points", then equivalence relations are defined as the state when, at a given point in the program, the value held by one resource is the same as that held by another resource. As one example, if the value of the register D0 is the same as the value of the register A0 at point A, then register D0 and register A0 are said to exhibit an equivalence relation at point A, while if, at point B, register D1 is holding the immediate value 10, then register D1 and the immediate value 10 are said to exhibit an equivalence relation.

In the table on the right-hand side of FIG. 2, a table shows the transfer instruction "mov (2,SP), D1__(6)", the subtraction instruction "sub #1, D1__(7)", the transfer instruction "mov D1, (2,SP)__(8)", the transfer instruction "mov (2,SP), D1__(9)", etc., with a further column showing the registers "D0=", D1=", and "A0=" for each instruction. This column shows the equivalence relations exhibited by these registers after each of the instructions in this basic block is executed.

The transfer instruction "mov (2,SP), D1__(6)" transfers the value held in the memory region indicated by (2,SP) into the data register D1. Here, the memory region (2,SP) is a region which is two places past the value of the stack pointer. In FIG. 2, D1=(2,SP) is written to the right of the transfer instruction "mov (2,SP), D1__(6)" showing that the data register D1 and the stack (2,SP) exhibit an equivalence relation after the transfer instruction "mov (2,SP), D1__(6)" has been executed. In this way, the equivalence relations after this instruction can be understood.

The subtraction instruction "sub #1, D1__(7)" subtracts "1" from the stored value of the data register D1. While D1=(2,SP) is written to the right of the transfer instruction "mov (2,SP), D1__(6)", this is no longer valid after the subtraction instruction "sub #1, D1__(7)". This is to say, the execution of the subtraction instruction "sub #1, D1__(7)" reduces the value of the data register D1, and by doing so destroys the equivalence relation of the data register D1 with the stack (2,SP).

The transfer instruction "mov D1, (2,SP)__(8)" transfers the value held by the data register D1 into the stack region indicated by the address (2,SP) In FIG. 2, "D1=(2,SP)" is written to the right of the transfer instruction "mov D1, (2,SP)__(8)" showing that the data register D1 and the stack (2,SP) exhibit an equivalence relation after the transfer instruction "mov D1, (2,SP)__(8)" has been executed.

The transfer instruction "mov (2,SP), D1__(9)" transfers the value held by the stack region (2,SP) into the data register D1. In FIG. 2, "D1=(2,SP)" is written to the right of the transfer instruction "mov (2,SP), D1__(9)" showing that the data register D1 and the stack (2,SP) exhibit an equivalence relation after the transfer instruction "mov (2,SP), D1__(9)" has been executed.

The transfer instruction "mov D0, A0__(10)" transfers the value held by the data register D0 into the address register A0. In FIG. 2, "D0=A0", "D1=(2,SP)", and "A0=D0" are written to the right of the transfer instruction "mov D0, A0__(10)" showing that an equivalence relation between the data register D0 and the address register A0 is generated when the transfer instruction "mov D0, A0__(10)" is executed.

By clearly establishing the equivalence relations as shown above, it can be seen that the transfer instruction "mov (2,SP), D1__(9)" performs a transfer of a value regardless of the equivalence relation created by the transfer instruction "mov D1, (2,SP)__(8)", by which the destination resource can be seen to already store the transferred value. Accordingly, since an equivalence relation has been established by the transfer instruction "mov D1, (2,SP)__(8)", the transfer instruction "mov (2,SP), D1__(9)" is redundant. When redundant instructions, such as this transfer instruction "mov (2,SP), D1__(9)", with equivalence relations are detected, they can be deleted from the program.

As described above, equivalence relations are analyzed for each basic block and the redundant instructions are deleted from the program, reducing the total number of instructions in the program, and improving the memory size and execution time of the program.

Problem which the Present Invention is Attempting to Solve

Conventionally, there has been the problem that since the analysis of equivalence relations has not been allowed to exceed the boundaries of each basic block, redundant instructions have been left undeleted, which has limited the extent to which memory size and execution time can be improved. This is explained in more detail with reference to FIGS. 3 to 5. FIG. 3 shows a redundant transfer instruction in the example of FIG. 2 which will most probably not be deleted, FIG. 4 shows a pattern (deletion prohibited pattern) for the transfer instruction "mov A0, D0__(17)" of FIG. 3 by which it may not be deleted, and FIG. 5 shows a pattern (deletion possible pattern) by which for the transfer instruction "mov A0, D0__(17)" of FIG. 3 may be deleted.

In FIG. 3, the circled transfer instruction "mov A0, D0__(17)" in basic block 4 is a transfer instruction between resources A0 and D0 which already exhibit equivalence relations This equivalence relation between the address register A0 and the data register D0 is established by the transfer instruction "mov A0, D0__(10)" in the basic block B2 and the transfer instruction "mov A0, D0__(15)" in the basic block B3. Here, so long as no addition instruction or subtraction instruction which affects the values held by the address register A0 or the data register D0 is present between the transfer instruction "mov A0, D0__(10)" and the transfer instruction "mov A0, D0__(17)", or between the transfer instruction "mov A0, D0__(15)", and the transfer instruction "mov A0, D0__(17)", then the transfer instruction "mov A0, D0__(17)" in FIG. 3 will be a redundant instruction which may be deleted.

On the other hand, in FIGS. 4 and 5. basic blocks M1 and M2 follow these basic blocks, with a branch instruction to basic block B4 being placed at the end of these basic blocks. FIG. 4 shows that four routes to the basic block B4 are possible due to these branch instructions, with route (1) being a branch from basic block B2, route (2) being a branch from basic block B3, route (3) being a branch from basic block M1, and route (4) being a branch from basic block M2. The following is an explanation of how the equivalence relation between address register A0 and the data register D0 is affected by these various routes, with reference to FIG. 5. In the example shown in FIG. 5, the transfer instructions "mov D0, A0__(31)", "mov D0, A0__(32)" are respectively positioned at the end of basic blocks M1, M2. As a result, the transfer instruction "mov A0, D0__(17)" can be deleted.

In the example in FIG. 4, however, transfer instructions "mov D1, A0__(31)" and "mov #30, A0__(32)" which set a different value in register A0 are present at the respective ends of basic blocks M1 and M2. If the transfer instruction "mov A0, D0__(17)" is deleted in this case, the setting of the stored value of the data register D0 goes astray and destroys the algorithm in the program. As a result, the transfer instruction "mov A0, D0__(17)" a cannot be deleted When deleting equivalence relations between basic blocks, it is first necessary to judge whether the deletion prohibited pattern shown in FIG. 4 or the deletion possible pattern shown in FIG. 5 is present. However, it can be very difficult to ascertain the execution order of machine language programs due to the existence of branch instructions, so that the patterns of FIG. 4 or FIG. 5 cannot be recognized.

As a result, even when there is a large incidence of the deletion possible pattern of FIG. 5 after translation by a compiler, the redundant instructions cannot be deleted. As a result, the deletion of all deletable transfer instructions has not been possible. In the same way as the method for the deletion of redundant instructions involving equivalence relations, methods for the improvement of machine language programs using copy propagation are restricted to optimization which is limited by the boundaries of each basic block to protect the program algorithm. As a result, such methods will not be effective for the case of equivalence relations between basic blocks which was shown in FIG. 5.

SUMMARY OF THE INVENTION

In view of the stated problems, the primary object of the present invention is to provide an optimization apparatus which can achieve a thorough reduction of the code size and instruction execution time of a program by adeptly analyzing equivalence relations which cross over between basic blocks to allow the efficient deletion of transfer instructions.

This object can be achieved by an optimization apparatus which, for a program in which instructions are executed in a plurality of different execution orders due to conditional branches, analyzes hardware resources whose stored values are equal in every execution order and which deletes transfer instructions according to the analysis result, the optimization apparatus including: an execution order information generation unit for generating execution order information which includes branch origin-branch destination relations between a plurality of basic blocks, wherein a basic block is a small program unit which is divided from the program based on branch instructions and branch destination labels; a post-execution state analysis unit for analyzing which hardware resources are storing a same value in a state (hereinafter called the "post-execution state") after each instruction in a branch origin destination block has been executed by a processor, and for generating a post-execution equivalence set, made up of names of resources which store a same value in the post-execution state, for each branch origin basic block, a pre-execution state analysis unit for selecting common elements of the post-execution equivalence sets or all branch origin basic blocks which have a common branch destination basic block and for generating a pre-execution equivalence set for the common branch destination basic block, made up of names of resources which store a same value in a state (hereinafter called the "pre-execution state") when a first instruction in the branch destination basic block is about to be executed, a block internal analysis unit for analyzing, on receiving a pre-execution equivalence set of a basic block destination basic block, changes to composite elements of the equivalence group at every point after execution of an instruction included in the branch destination basic block, and for calculating an equivalence set after an execution of each instruction as a result of analysis of each instruction; a resource name judgment unit for judging, after receiving an equivalence set after execution of an instruction, whether a next instruction located immediately after the instruction indicates resource names as a transfer origin and a transfer destination which are included in the equivalence set; and a transfer instruction deletion unit for deleting the following instruction when the resource name judgment unit judges that the resource names indicated by the following instruction as the transfer origin and the transfer destination are resource names which are included in the equivalence set.

With the optimization apparatus, set products are calculated between branch blocks with a same branch destination, so that equivalent relations between registers, memory, and immediate values which do not depend on execution order can be detected. In this way, equivalence relations are obtained which are independent of execution routes due to conditional branches. since transfer instructions can be deleted after a reliable evaluation of equivalence relations, improved optimization can be achieved.

Here, the optimization apparatus may further include: a state table storage unit for storing a correspondence table, which has a plurality of resource names as index items and an entry cell corresponding to each index item, for each basic block; and an initialization unit for detecting all codes showing a transfer origin resource (hereinafter called source code) and all codes showing a transfer destination resource (hereinafter called destination code) from the entire program, and for initializing entry cells by writing all the detected codes into an entry cell of each branch destination basic block in the correspondence tables, wherein the post-execution state analysis unit includes: a first extraction unit for extracting, once the detected codes have been written by the initialization unit, one instruction at a time from a present basic block in order from a start of the basic block to an end; an instruction identifying unit for identifying the extracted instruction; a first deletion unit for deleting, when the extracted instruction has been identified as one of a transfer instruction and a calculation instruction, all of the codes written into an entry cell of the state table storage unit which has are source name of a destination code of the extracted instruction as an index item; an operand identifying unit for identifying, when the extracted instruction has been identified as a transfer instruction and deletion has been performed by the first deletion unit, resource names which are a source code and a destination code of the transfer instruction; a first writing unit for writing the resource name identified as the destination code into a cell which has the resource name identified as the source code as an index item and for writing the resource name identified as the source code into a cell which has the resource name identified as the destination code as an index item; an indicating unit for indicating a next extraction of an instruction to the first extracting unit when writing by the first writing unit has been performed; and a setting unit for setting, after a final instruction has been extracted due to repetition of the indicating by the indicating unit, a stored content of state table storage unit as the post-execution equivalence set of the present basic block.

With the optimization apparatus, equivalence relations are found by establishing all of the codes which may have equivalence relations in the state table storage unit and then deleting inappropriate elements, so that in branch destination basic blocks, all resources whose equivalence relations remain unchanged can be effectively maintained as having equivalence relations.

Here, the pre-execution state analysis unit may include an establishing unit for establishing a post-execution equivalence set in an entry cell corresponding to a branch destination basic block in a correspondence table stored by the state table storage unit, and the optimization apparatus may further include: a reserve storage unit for storing, once the establishing unit has established the post-execution equivalence set, a copy of the post-execution equivalence set obtained from the state table storage unit as a reserve; a first activating unit for reactivating the post-execution state analysis unit after the post-execution equivalence set has been established in an entry cell by the establishing unit; a collating unit for collating a new equivalence set achieved in the state table storage unit due to a reactivation of the post-execution state analysis unit with the reserve stored in the reserve storage unit, and for judging whether there has been any change to the reserve; and a second reactivation unit for reactivating the post-execution state analysis unit and the set product calculation unit when the collating unit judges that there is a change in a number of codes in the new equivalence set, and, when the collating unit judges that there is no change in a number of codes, the block internal analysis unit sets a result of a most recent set product calculation as a pre-execution equivalence relation set before commencing analysis of equivalence relations for each instruction.

With the optimization apparatus, the calculation of set products is repeated, so that the number of elements in the set products can be gradually reduced. If, for example, the source program is made up of five basic blocks, B1 to B5, with a loop construction so that a branch is performed from the end of basic block B5 to the start df basic block B1, the set product calculation process is repeated so that the global equivalence relations in the program can be coordinated.

Here, the first writing unit may include a first writing sub-unit for writing when a combination of a register name and a memory address is identified by the operand identifying unit, the memory address into an entry cell in the state table storage unit which has the register name as an index item, and the second writing unit may further include a second writing sub-unit for expressing, in the state table storage unit, memory addresses which have a same stored value due to a transfer instruction identified by the instruction identifying unit, by determining register names which are written in an entry cell which has the register name identified by the operand identifying unit as an index item and by writing the identified memory address into entry cells which have any of the determined register names as an index item, With the optimization apparatus, register names, memory addresses, and immediate values which hate equivalence relations due to transfer instructions can be expressed in the state table storage unit, so that the members written in the entry cells can be increased. By increasing the number of resources with equivalence relations in this way, the efficiency with which redundant transfer instructions are deleted can be improved.

Here, the second writing unit may further include: a first entry cell-register name detection unit for detecting, when a combination of a register name and a memory address is identified by the operand identifying unit, a register name which is an index item of any cell into which the identified memory address has already been written; and a third writing sub-unit for expressing, in the state table storage unit, register names and memory addresses which have a same stored value due to a transfer instruction identified by the instruction identifying unit, by copying all codes written in an entry cell which has the register name detected by the first entry cell-register name detection unit into an entry cell which has the identified register name as an index item, by writing a register name detected by the first entry cell-register name detection unit into an entry cell which has the register name identified by the operand identifying unit as an index item, and by writing a register name identified by the operand identifying unit into an entry cell which has any of the register names detected by the first entry cell-register name detection unit as an index item.

With the optimization apparatus, when a combination of a register and a memory address are identified as operand codes, more equivalence relations can be expressed in the state table storage unit by finding registers which have the identified memory address written in their entry cells As a result, the number of resources with equivalence relations can be increased and the efficiency with which redundant transfer instructions are deleted can be improved.

Here, the first writing unit may further include a fourth writing sub-unit for writing, when a combination of a register name and an immediate value is identified by the operand identifying unit, an immediate value code into an entry cell with the register name as an index item.

With the optimization apparatus of claim 8, when a combination or a register and an immediate value are identified as operand codes, the immediate value is written in the entry. cells of the identified register. As a result, the number of resources with equivalence relations in the state table storage unit can be increased and the efficiency with which redundant transfer instructions are deleted can be improved Here, the second writing unit may include: a second entry cell-register name detection unit for detecting, when a combination of a register name and an immediate value is identified by the operand identifying unit, a register name which is an index item of any cell into which an immediate value code corresponding to the identified immediate value has already been written; and a fifth writing sub-unit for copying all codes written in an entry cell which has a register name detected by the second entry cell-register name detection unit into an entry cell which has the register name identified by the operand identifying unit as an index item, for writing a register name detected by the second entry cell-register name detection unit into an entry cell which has the register name identified by the operand identifying unit as an index item, and by writing a register name identified by the operand identifying unit into an entry cell which has any or the register names detected by the second entry cell-register name detection unit as an index item.

With the optimization apparatus, if, for example, an immediate value is included in the operand codes, a number of equivalence relations can be expressed in the state table storage unit by tracing the equivalence relations of the immediate value. This increase in the number of resources with equivalence relations unit that the efficiency with which redundant transfer instructions are deleted can be improved.

Here, the second writing unit may further include: a third entry cell-register name detection unit for detecting, when a combination of a memory address and an immediate value is identified by the operand identifying unit, a register name which is an index item of a call into which one or an immediate value code corresponding to the identified immediate value and the memory address has already been written; and a sixth writing sub-unit for writing the identified immediate value code and the identified memory address into an entry cell which has any register name detected by the third entry cell-register name detection unit as an index item.

With the optimization apparatus, when, for example, a combination of an imediate value and a memory resource is indicated as operand codes, by tracing their equivalence relations a greater number of equivalence relations can be stored in the state table storage unit.

Here, the second writing unit may include: a fourth entry cell-register name detection unit for detecting, when a combination of a first memory address and a second memory address is identified by the operand identifying unit, a register name which is an index item of a cell into which one of the first memory address and the second memory address has already been written; and a seventh writing sub-unit for writing the first memory address and the second memory address into an entry cell which has any register name detected by the third entry cell-register name detection unit as an index item.

With the optimization apparatus, when, for example, a combination of memory resources is indicated as operand codes, by tracing their equivalence relations a greater number of equivalence relations can be stored in the state table storage unit. As a result, the efficiency with which redundant transfer instructions are deleted can be improved.

Here, any of the registers may be a broken register whose stored value is not saved and restored at a beginning and end of a subroutine call instruction, the second deletion unit may delete all codes written in entry cells which correspond to a register name of the broken register when the instruction extracted by the first extraction unit is a subroutine call instruction, and the third deletion unit may delete from the stored content of the state table storage unit, all incidences of a register name of the broken register from all codes written in entry cells which have a register name of a register aside from the broken register as an index item.

With the optimization apparatus of claim 16, the use if broken registers in taken into consideration when generating equivalence relations, so that code which is generated from a high-level programming language can be efficiently optimized.

The object of the present invention can also be achieved by an optimization apparatus which, for a program in which instructions are executed in a plurality of different execution orders due to conditional branches, analyzes hardware resources whose stored values are equal in every execution order and which deletes transfer instructions according to the analysis result, the optimization apparatus including: an execution order information generation unit for generating execution order information which includes branch origin-branch destination relations between a plurality of basic blocks, wherein a basic block is a small program unit which is divided from the program based on branch instructions and branch destination labels; a post-execution state analysis unit for analyzing which hardware resources are storing a same value in a state (hereinafter called the "post-execution state") after each instruction in a branch origin destination block has been executed by a processor, and for generating a post-execution equivalence set, made up of names of resources which store a same value in the post-execution state, for each branch origin basic block; a pre-execution state analysis unit for selecting common elements of the port-execution equivalence sets of all branch origin basic blocks which have a common branch destination basic block and for generating a pre-execution equivalence set for the common branch destination basic block, made up of names of resources which store a same value in a state (hereinafter called the "pre-execution state") when a first instruction in the branch destination basic block is about to be executed; a block internal analysis unit for analyzing, on receiving a pre-execution equivalence set of a basic block destination basic block, changes to composite elements of the equivalence group at every point after execution of an instruction included in the branch destination basic block, and for calculating an equivalence set after an execution of each instruction as a result of analysis of each instruction; a resource name judgment unit for judging, after receiving an equivalence set after execution of an instruction, whether a next instruction located immediately after the instruction indicates resource names as a transfer origin and a transfer destination which are included in the equivalence set; a predicting unit for predicting, when the resource name judging unit judges that an instruction located immediately after any of the instructions indicates resource names which are given in an equivalence set as one of a source code and a destination code, an instruction cost, shown by at least one of an execution time and a memory size, of a following instruction that is one or a calculation instruction and a transfer instruction when a resource name is replaced with each resource name in an equivalence relation set at the execution point of the following instruction; and a replacing unit for replacing, when the predicted instruction cost is reduced by a substitution of a resource name, one of a transfer origin and a transfer destination in the following instruction by the resource name.

With the optimization apparatus, operand codes in transfer instructions and calculation instructions can be replaced with operand codes which enable a reduction in instruction cost, thereby achieving a further reduction in program size.

The object of the present invention can also be achieved by an optimization apparatus which, for a program in which instructions are executed in a plurality of different execution orders due to conditional branches, analyzes hardware resources whose stored values are equal in every execution order and which deletes transfer instructions according to the analysis result, the optimization apparatus including: an execution order information generation unit for generating execution order information which includes branch origin-branch destination relations between a plurality of basic blocks, wherein a basic block is a small program unit which is divided from the program based on branch instructions and branch destination labels; a post-execution state analysis unit for analyzing which hardware resources are storing a same value in a state (hereinafter called the "post-execution state") after each instruction in a branch origin destination block has been executed by a processor, and for generating a post-execution equivalence set, made up of names of resources which store a same value in the post-execution state, for each branch origin basic block; a pre-execution state analysis unit for selecting common elements of the post-execution equivalence sets of all branch origin basic blocks which have a common branch destination basic block and for generating a pre-execution equivalence set for the common branch destination basic block, made up of names of resources which store a same value in a state (hereinafter called the "pre-execution state") when a first instruction in the branch destination basic block is about to be executed; a block internal analysis unit for analyzing, on receiving a pre-execution equivalence set of a basic block destination basic block, changes to composite elements of the equivalence group at every point after execution of an instruction included in the branch destination basic block, and for calculating an equivalence set after an execution of each instruction as a result of analysis of each instruction; a reference instruction detection unit for detecting, on receiving an equivalence set for an execution state of an instruction, transfer instructions and calculation instructions (hereinafter referred to as "reference instructions") which have resource names included in the equivalence set for the execution state of the instruction as a transfer origin and a transfer destination; a definition transfer instruction detection unit for detecting definition transfer instructions which set a value of a source code of an instruction detected by the reference instruction detection unit from all branch origin basic blocks; a replacement possibility judgment unit for judging whether the replacement of the source code of the instruction detected by the reference instruction detection unit with the source code of the definition transfer instruction detected by the definition transfer instruction detection unit is possible, based on the equivalence set for the execution state of the reference instruction; and a transfer instruction deletion unit for writing the reference instruction when the replacement possibility judgment unit judges that replacement is possible, and then deleting all of the definition transfer instructions in the branch origin basic blocks for the resource which was replaced.

With the optimization apparatus, instructions such as the transfer instructions mov D0, A0__(10) and the transfer instruction mov D0, A0__(15) in the branch origin basic blocks shown in FIG. 5 can be deleted together, so that a greater number of transfer instructions can be deleted.

BRIEF DESCRIPTION OF THE DRAWINGS

These and other objects, advantages and features of the invention will become apparent from the following description taken in conjunction with the accompanying drawings which illustrate a specific embodiment of the invention. In the drawings:

FIG. 1 shows the correspondence between calculations in a program written in a high-level programming language and machine language instructions using a "{" mark;

FIG. 6 shows the construction of the optimization apparatus of the first embodiment of the present invention;

FIG. 14 is a flowchart for the processing for the deletion of a deletable instruction in step g8 of the flowchart in FIGS. 13a and 13b;

FIG. 17 shows the changes in equivalence relations after the equivalence relation deletion process and the equivalence relation generation process for each instruction in the basic block;

FIG. 18 shows the universal set for each basic block, and the In set and Out sets for each basic block;

in FIGS. 7a and 7b;

FIG. 22 shows the In set and the Out set of the basic blocks which are finally generated;

FIG. 23(a) shows the detection of a transfer instruction with the same content as an updated equivalence set from a branch destination basic block, based on the In set shown in FIG. 22;

FIG. 23(b) shows the deletion of a transfer instruction with the same content as an updated equivalence set from a branch destination basic block, based on the In set shown in FIG. 22;

FIG. 24(a) shows an example of a source program in the second embodiment of the present invention;

FIG. 24(b) shows the instructional used in the program of FIG. 24(a);

FIG. 24(c) shows the example program of FIG. 24(a) after division into basic blocks;

FIG. 25 shows an example of an instruction cost table;

FIG. 27 shows the copy propagation process;

FIG. 28(a) shows an example program which is processed by the third embodiment of the present invention;

FIG. 28(b) shows the division of the example program of FIG. 28(a);

FIG. 30 shows the selection of a deletable instruction; and

FIG. 31 shows an example of a program after the copy propagation process.

DESCRIPTION OF THE PREFERRED EMBODIMENTS

The following is an explanation of several embodiments of the optimization apparatus of the present invention, with reference to the drawings. Before commencing the explanation, several of the terms to be used in these embodiments will be defined.

Basic Block

A basic block is a sequence of instructions whose order of execution is continuous, which is to say a continuous instruction sequence in the program, with no branches from the sequence or branches into the sequence midway. When the program is divided by subroutine call instructions, not all of these subroutines qualify as basic blocks. This is because, even if there is a jump to another subroutine call instruction, the execution order can still be continuous with a return being performed to an instruction following this subroutine call instruction. As a result, the present embodiment treats each subroutine as a separate program and divides each subroutine into basic blocks.

Preceding Block

This uses the concept of all of the paths which can be traced in the control flow to reach a present basic block. Here, all of the basic blocks which are located just before the present basic block on these paths are called preceding blocks. For the example in FIG. 2, the preceding block for basic blocks B2 and B3 is B1, while the preceding blocks for basic block B4 are basic blocks B2 and B3. It should be clear here that since basic block B1 is executed first, it does not have a preceding block.

Equivalence Transfer Instruction

An equivalence transfer instruction is a transfer instruction, such as a "mov" instruction, for which the code/size are equal.

Instruction Cost

The code size of an instruction and its execution time are collectively referred to as instruction cost. Instructions with low instruction costs are instructions with small codes sizes or with short execution times.

Equivalence Set

An equivalence relation set is a set which has all of the resources with an equivalence relation with an arbitrary resource as its elements. For the example in FIG. 2, at the point just before the execution of instruction 3. the equivalence relation set of the register D0 is the {immediate value 10, (_a)}.

In the present invention, equivalence relations are stored as pairings of each of the register resources with its equivalence relation set. Here, the equivalence set refers to a grouping of all of the equivalence relation sets for each register resource.

Figure 16:
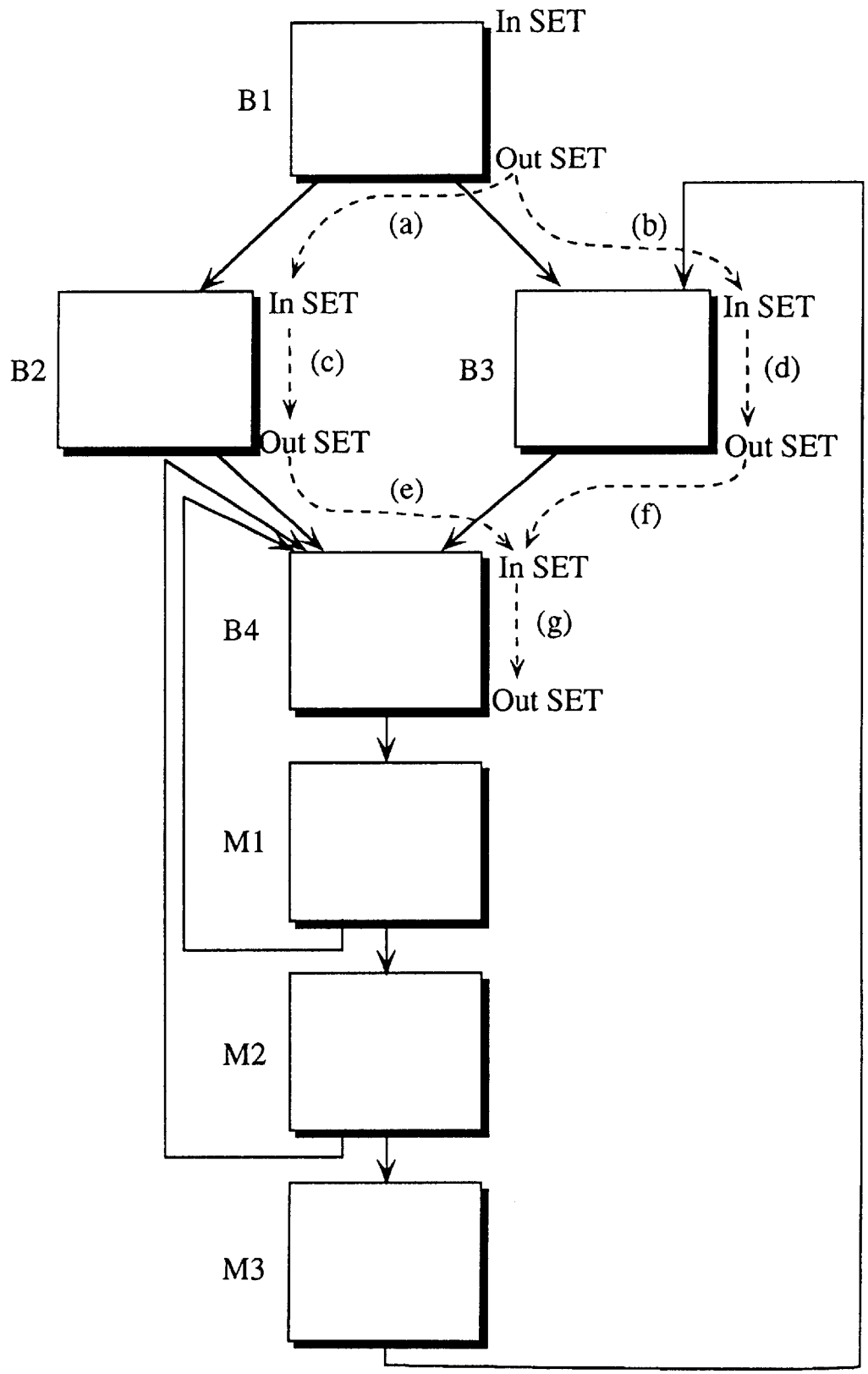
FIG. 16 is a drawing which shows the setting of equivalence relations between the basic blocks of FIG. 15 using arrows drawn as broken lines.

A set of all of the equivalence relations present at the exit point of a basic block, which is to say after all of the instructions in the basic block have been executed, is called the "Out" set. Similarly, the equivalence set provided by preceding basic blocks which is valid at the entry point of a basic block is called the "In" set. Here, FIG. 16 shows the control flow information between basic blocks as arrows drawn using solid lines. For the optimization of the prior art shown in FIG. 2, equivalence relations are repeatedly established and deleted by the instructions in the basic block between the transfer instruction "mov (2,SP), D1_(6)" and the branch instruction "bra L4_(11)". As a result, at the execution of the branch instruction "bra L4_(11)", equivalence relations are established as "data register D0=address register A0"data register D1-stack (2,SP)", and "address register A0=data register D0", These equivalence relations are present at the exit point of basic block B2 due to the execution of all the instructions in this basic block from start to finish.

When considering the existence of equivalence relations between basic blocks, it is important to consider what equivalence relations are present at the end of each basic block and how these equivalence relations are provided to a following basic block. The following is an explanation of how these equivalence relations affect following basic blocks, with reference to FIG. 16. In FIG. 16, the setting of the equivalence relations between basic blocks is shown by a broken line. When there is only one preceding basic block and there are no branches, the In set of the present basic block is simply the Out set of the preceding basic; block. On the other hand, some basic blocks have a plurality of preceding basic blocks, such as basic block B4 which has basic block B2, basic block B3, basic block M1, and basic block M2 as its preceding basic blocks. In this case, the In set of basic block B4 is made of the common elements in all of the Out sets of basic block B2, basic block B3, basic block M1, and basic block M2. Accordingly, such common elements are set as the In set of basic block B4.

As described above, when a basic block has a plurality of preceding basic blocks, the elements of the In set of the present basic block can be found as the set product of the Out sets of these preceding basic blocks.

In the present embodiment the set product of these equivalence sets is found by the global equivalence relation analysis unit 4. For the example shown in FIG. 2, equivalence relations are investigated for the registers D0, D1, and A0, so that set products are calculated for these registers.

Regarding the Source Program

The following is an explanation of the source program used in the present embodiment. In the source program shown in FIG. 2, the abbreviations D0, A0 respectively represent the data register D0 and the address register A0, with (xx, SP) representing the stack. Furthermore, "(_xx)" represents external memory and "#xx" an immediate value.

Figure 2:
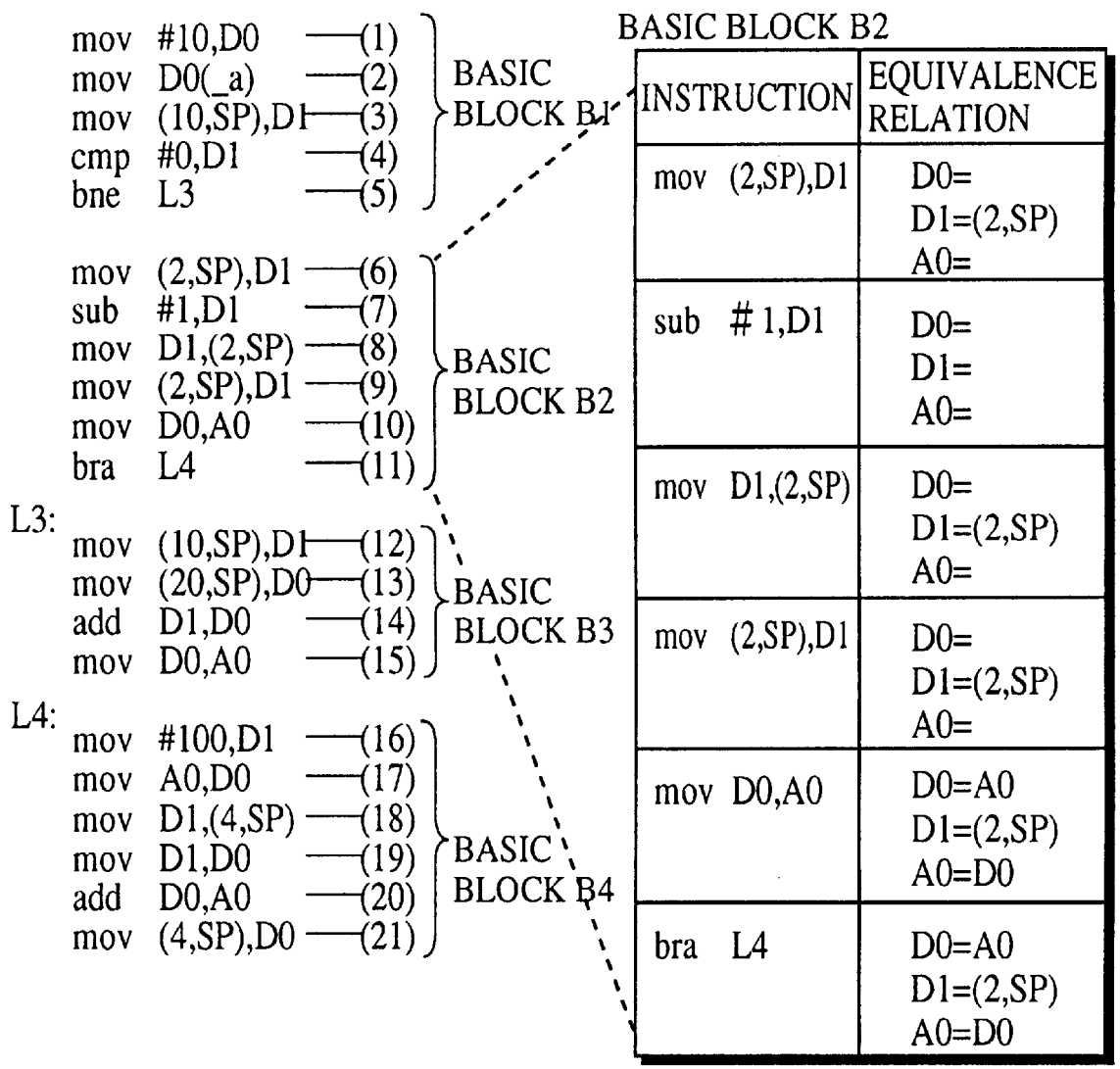
FIG. 2 shows the changes in equivalence relations due to the execution of each instruction in a basic block.
Figure 3:
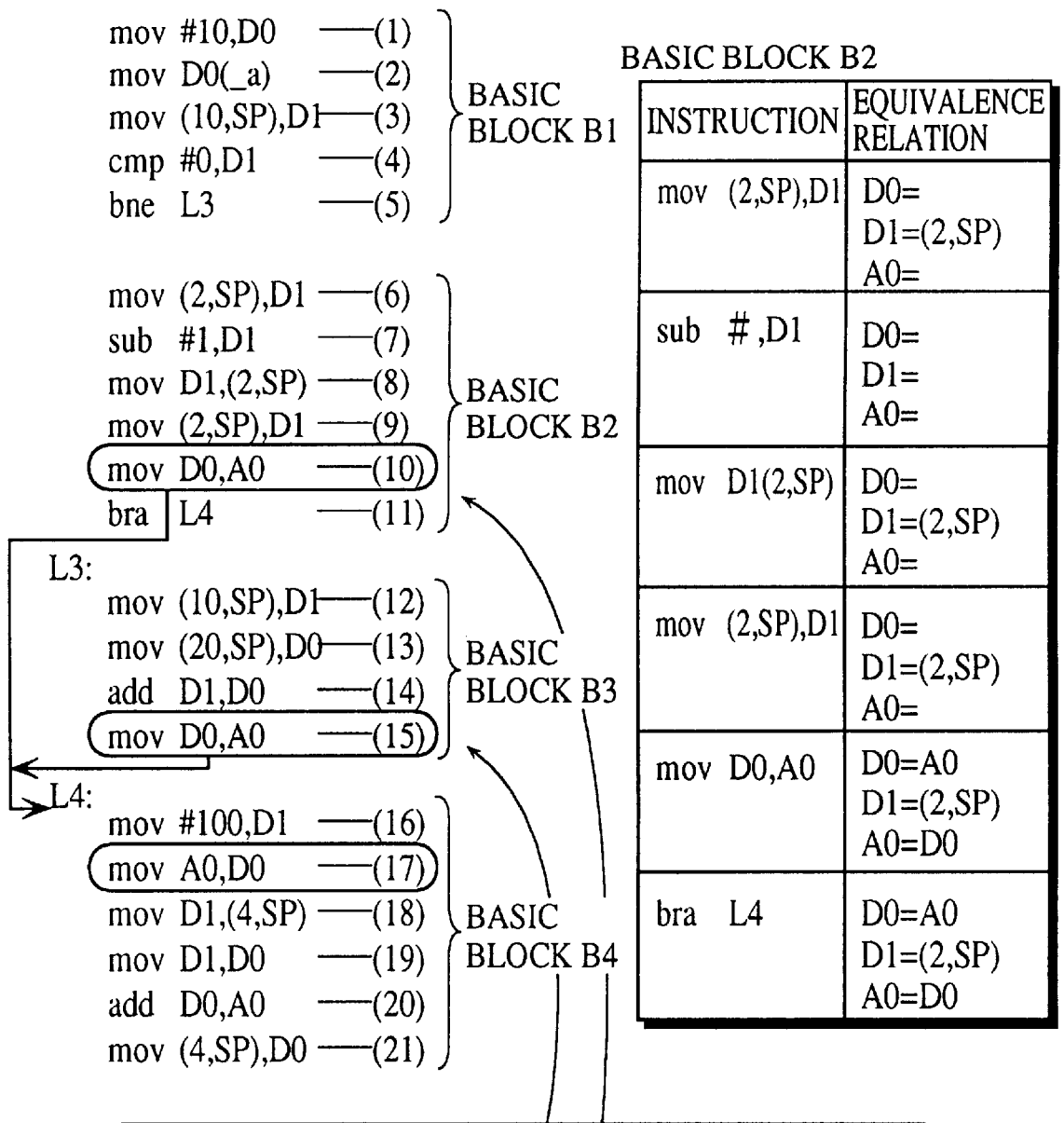
FIG. 3 shows an instruction in the example of FIG. 2 which will most probably not be deleted.

In the source program in FIG. 2, the operands A, B of each instruction respectively represent the source operand and the destination operand. For the example of a "Mov" instruction "mov (2,SP),D1_(6)", the source operand A is the Stack (2,SP) and the destination operand B is the register as D1. This "mov " instruction stores the content of the stack (2,SP) in the register D1. For the example of the "add" instruction "add D1, D0_(14)" the source operand A is the value stored by the register D1, while the destination operand B is the value stored by the register D0. When executed, this "add" instruction adds the value of the register D1 to the value of the register D0 and stores the result in the register D0. In the above "mov" instruction, the stack (2,SP) is a resource which is referred to and not changed, making it the reference resource, while the value of register D1 is altered, making it the defined resource. For the above "add" instruction, the register D1 is the reference resource and the register D0 is the defined resource.

The present embodiment also has the premise that the inputted code has been outputted by a compiler, so that registers (called "broken registers") whose values may differ before and after a subroutine call instruction (due to the execution of a subroutine), are the same as the broken registers used by the compiler.

Reference/Defined Resources

In the present specification, registers, the stack, external memory, and immediate values are all called resources. The stack and external memory are also collectively referred to as memory resources. In the following description, the expression "indirect reference" is used to describe an operand which is memory, so that the stack and external memory can be referred to using register names. There are also cases where a memory resource is expressed as a label name such as _a", but, for the most part, expressions such as (20, SP), (3, A0) which are combinations of a register name and an immediate value or the stack pointer and an immediate value are used in indirect referencing. In the present embodiment, in order to manage memory resources expressed as a combination of a register name and an immediate value or as a combination of the stack pointer and an immediate value, code which is written into the source operand (source code) and code which is written into the destination operand (destination code) is used to express equivalence relations.

With the exception of the case where an operand is a monadic operator, the use of a resource as a source operand in the present embodiment simply involves a reference of the value stored by the resource, so that the value in question is unchanged. Accordingly, such resources are referred to as "reference resources". Destination code, however, changes the stored values of resources according to instructions, so that these resources are called "defined resources". In the example of FIG. 2, the tenth instruction in the source program, "mov D0, A0" has the register D0 as the reference resource and the register A0 as the defined resource.

The following is an explanationof a first embodiment of the optimization apparatus of the present invention, with reference to the drawings. The construction of the optimization apparatus of the first embodiment is shown in FIG. 6. This optimization apparatus comprises an equivalence set storage unit 1, a basic block division unit 2, a control flow analysis unit 3, a global equivalence relations analysis unit 4, and an equivalence resource transfer instruction deletion unit 5. The present optimization apparatus performs its processing having read assembler source code which is stored as a file in an external storage apparatus.

The equivalence set storage unit 1 stores a correspondence table to assist in the calculation of the Out set and In set of each basic block. As shown in FIG. 6, this table has input rows for the In set of each basic block and the Out set of each basic block, while the columns in the table represent the registers in the target machine, branch origin basic blocks, and branch destination basic blocks. This table in updated whenever necessary by the global equivalence relations analysis unit 4, and reflects the control flow, the Out sets; and the In sets. The content of this table is written as shown below, with, for simplicity's sake, only the calculation of the In sets and Out sets of basic blocks B1–B4 being shown.

| B1: In | D0={} D1={} A0={} |
|---|---|
| : Out | D0={} D1={} A0={} |
| B2: In | D0={} D1={} A0={} |
| : Out | D0={} D1={} A0={} |
| B3: In | D0={} D1={} A0={} |
| : Out | D0={} D1={} A0={} |
| B4: In | D0={} D1={} A0={} |
| : Out | D0={} D1={} A0={} |

The basic block division unit 2 divides program into subroutine units, and divides each subroutine into basic blocks. After this, basic blocks are treated as the object of the following processes. When the source program shown in FIG. 2 is subjected to division by the basic block division unit 2, the resulting basic blocks are as shown in FIG. 15.

After dividing the program into basic blocks, the basic block division unit 2 extends the correspondence table stored in the equivalence set storage unit 1 in accordance with the results of the division, as shown by the arrow a1 in FIG. 6, so that correspondence is established between each heading in the correspondence table and the divided basic blocks . For the example in FIG. 6, rows are allocated to the In set and Out set of basic block B1, to the In set and Out set of basic block B2, to the In set and Out set of basic block B3, and to the In set and Out set of basic block B4.

The control flow analysis unit 3 analyzes the preceding basic blocks for each basic block and the control flow between basic blocks. The results of the analysis by the control flow analysis unit 3 of the program shown in FIG. 6 are shown in FIG. 15.

Figure 15:
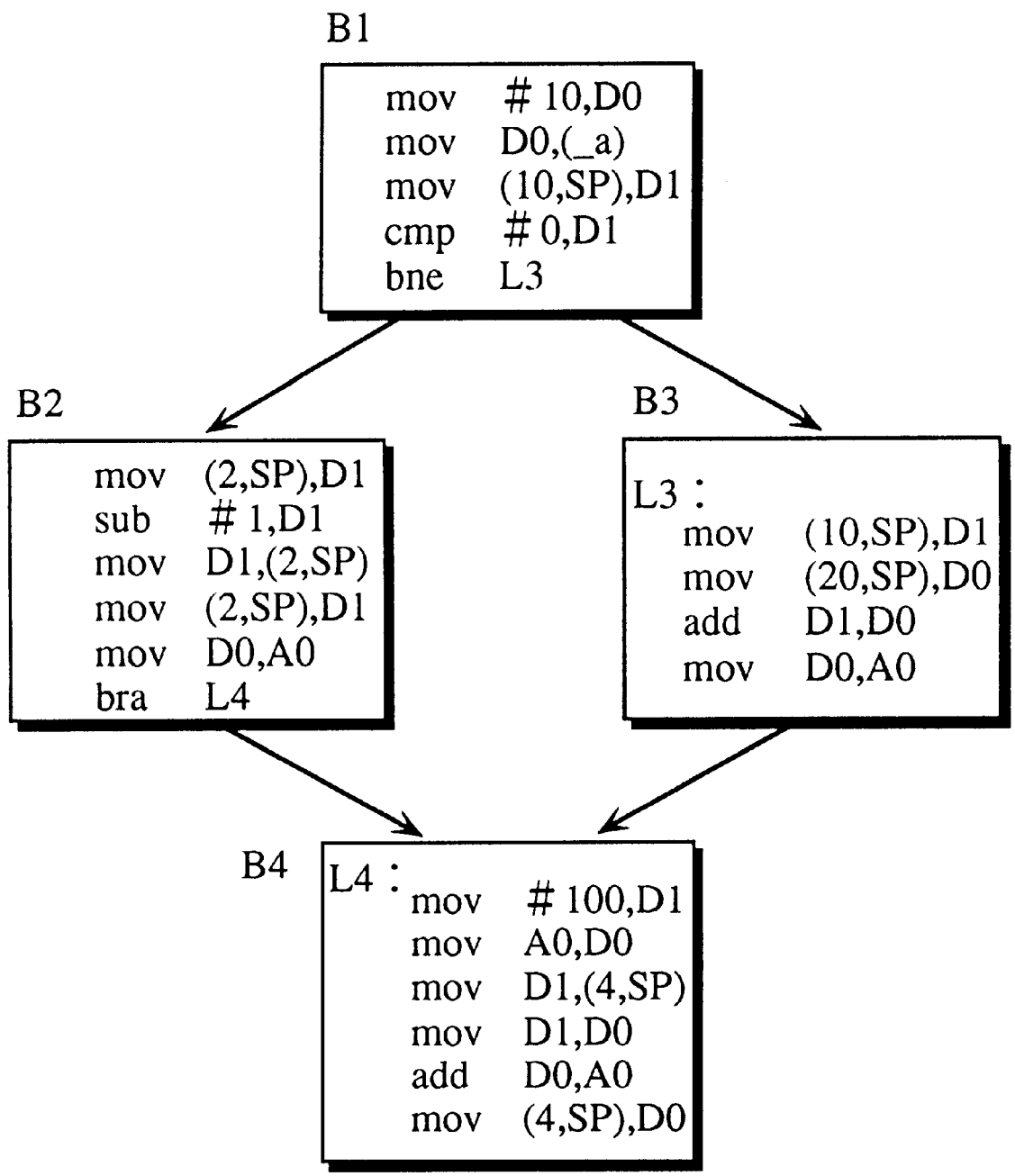
FIG. 15 is a drawing which shows the control flow between basic blocks using arrows drawn as solid lines.

In FIG. 15, reference numerals B1, B2, B3, B4 show respective basic blocks, with the arrows between basic blocks showing the control flow between them. As one example, an arrow pointing to basic blocks B2, B3 has been drawn from basic block B1. This indicates that the control flow moves to basic blocks B2, B3 from basic block B1.

The preceding block for basic block B2 is the basic block B1 which is situated immediately before it in the control flow. In the same way, the preceding blocks for basic block B4 art basic blocks B2, B3. The detailed procedure of the basic block division unit 2 and the control flow analysis unit 3 do not compose the gist of the present invention and are techniques which are widely known in the art, so that no further explanation will be given. Here, it should be sufficient to note that the preceding and following basic blocks are identified using analysis of the control flow. Control flow analysis unit 3 records the analysis results of the control flow in the branch origin basic block and the branch destination basic block columns of the correspondence table, as shown by the arrow a2 which has been drawn as a solid line in FIG. 6.

The global equivalence relation analysis unit 4 analyzes equivalence relations between the basic blocks by tracing the control flow between basic blocks which was detected by control flow analysis unit 3. This equivalence relation analysis unit 4 then writes the Out set and the In set of each basic block which are obtained as the result of its analysis into the appropriate columns in the table. This is shown in FIG. 6 by the arrow a3 which has been drawn using a broken line.

Figure 7A:
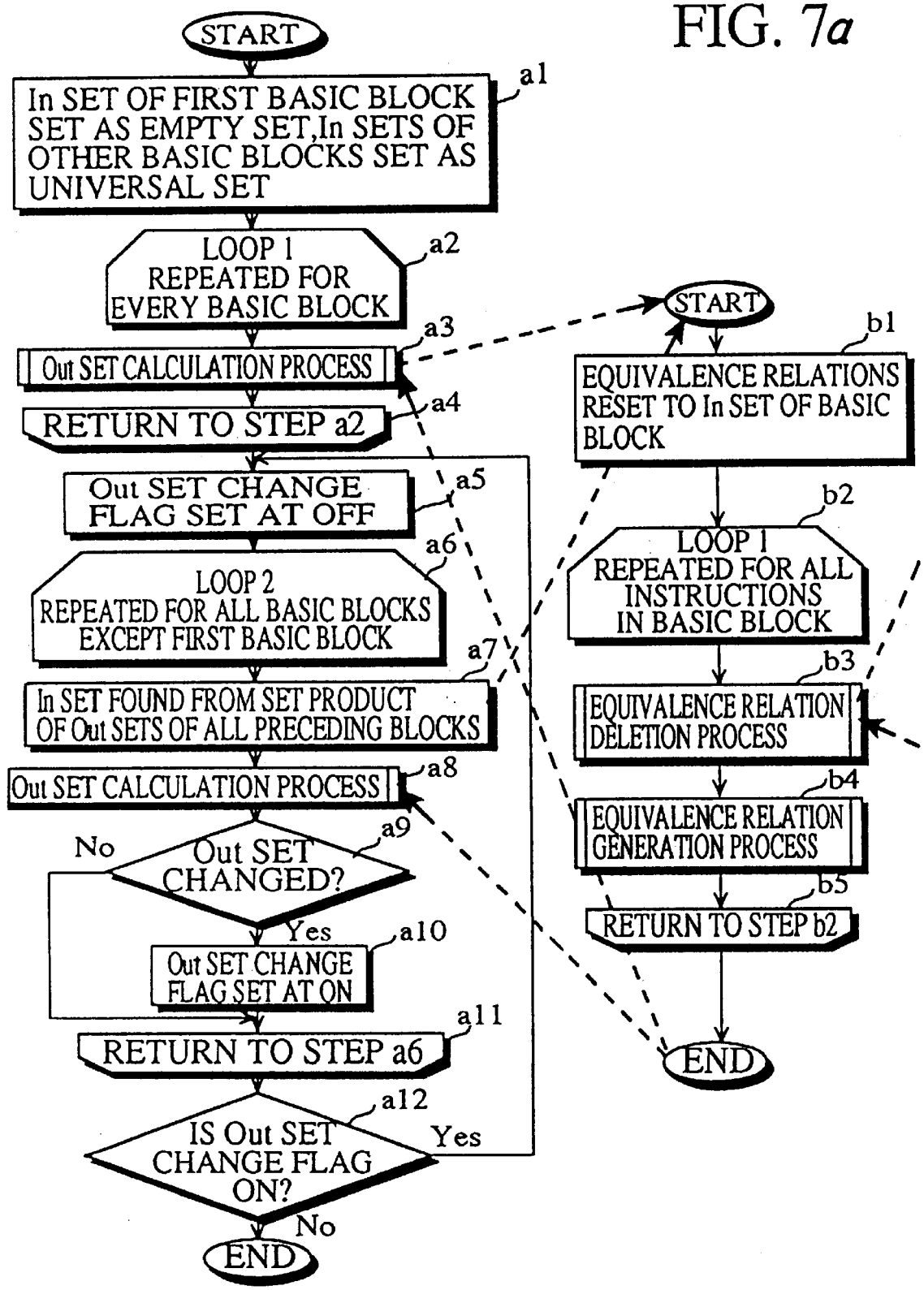
FIGS. 7a and 7b show the main flow of the global equivalence relation analysis, and the subflows in the Out set calculation process and the equivalence relation deletion process.
Figure 7B:
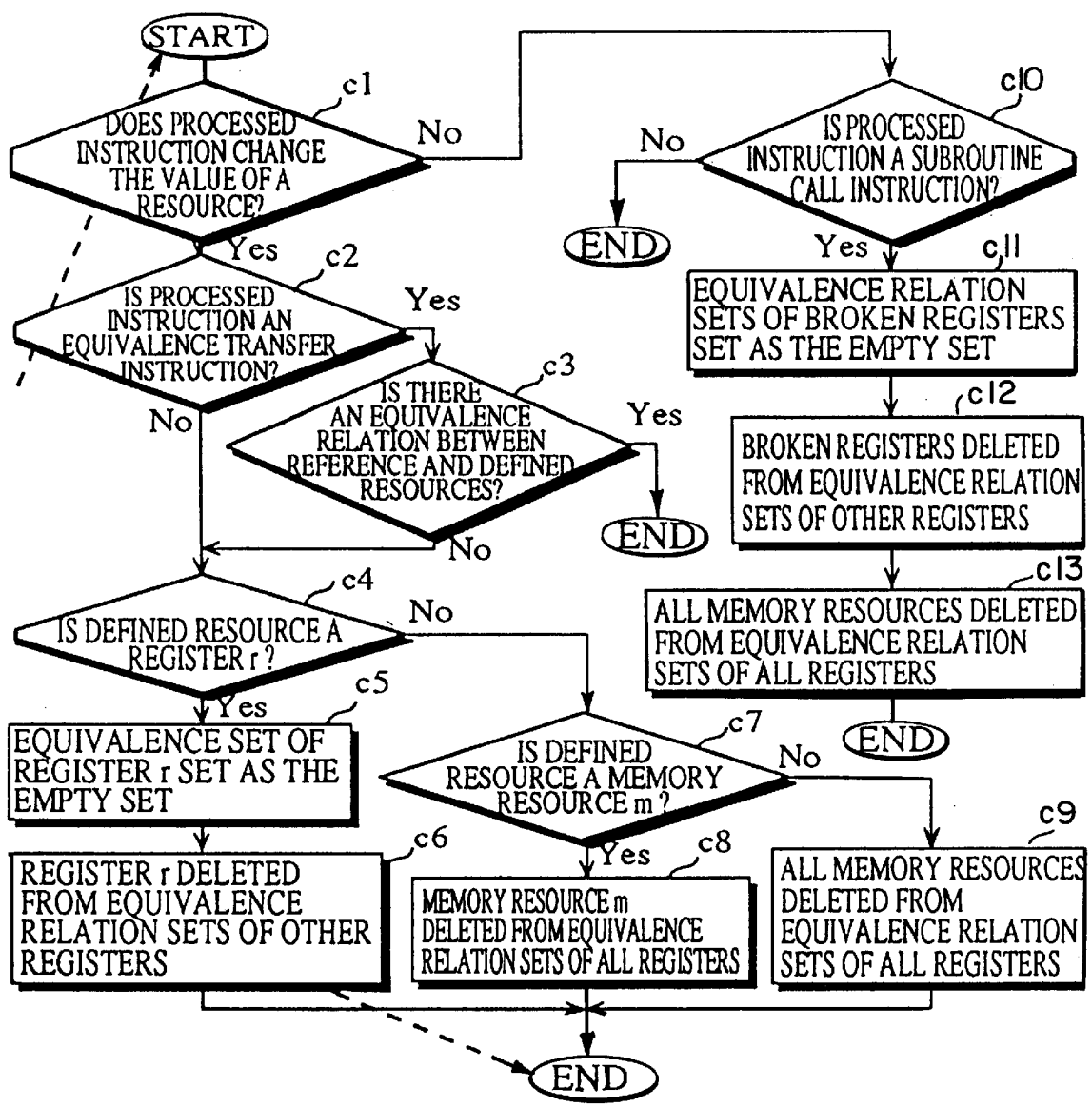

The processing steps of the global equivalence relation analysis unit 4 are explained below with reference to the flowchart of FIGS. 7a and 7b show the main flow which is the processing for the global equivalence relation analysis, and subflows which show the Out set calculation process and the equivalence relation deletion process. Here, steps a1–a12 in FIGS. 7a and 7b compose the main flow, with the flowchart including steps b1–b5 to the right of the main flow showing the Out set calculation process. To the right of this, the flowchart made up of steps c1–c13 shows the equivalence relation deletion process. The flowchart in FIGS. 8a, 8b, and 8c meanwhile, is the subflow for the equivalence relation generation process . For identification purposes, steps in the main flow of FIGS. 7a and 7b have been labeled with the letter "a", steps in the flowchart for the Out set calculation process have been labeled with the letter "b", and steps in the flowchart for the equivalence relation deletion process have been labeled with the letter "c".

The main flowchart for the global equivalence relation analysis unit 4 is composed so that step a2–step a4 are repeated as a loop, and step as step a11 are repeated as another loop. Here, step a2–step a4 form a loop which is executed to detect local equivalence relations and step a6–step a11 form a loop which is repeated to detect global equivalence relations. Local equivalence relations result from the instructions executed inside one basic block, while global equivalence relations depend on the branch origin of each basic block. The detection of local equivalence relations is performed by setting an In set in step a1 and calculating the Out set according to the processing in step a3. On the other hand, the detection of the global equivalence relations is performed by setting an In set in step a7 and calculating the Out set according to the processing in step a8. That is, local or global equivalence relation detection is performed depending on whether the In set was set in step a1 or in step a7.

The loop process between step a6 and step a11 is repeated to perform the detection of global equivalence relations, with the loop processing continuing until the OFF state of the Out set charge flag is detected in step a12. This is to say, so long as the Out set change flag is ON, steps a6–a11 are repeated as a loop process. This Out set change flag is a flag which is set only when a change in the Out set is detected during step a9, with the loop made up of steps a6–a11 being repeated until the judgment in step a9 becomes No.

The Out set calculation processes in steps a3 and a8 of the present flowchart are loop processes which execute the processing in steps b1–b5 for all of the instructions inside a basic block, with each iteration of this loop having the equivalence relation deletion process of the flowchart made up of steps c1–c13 and the equivalence relation generation process of the flowchart made up of steps d1–d22 executed.

By performing this equivalence relation deletion process and equivalence relation generation process, the global equivalence relation analysis unit 4 firstly deletes the equivalence relations which were hitherto valid for the defined resource and secondly generates equivalence relations which are valid after the execution of the instruction currently being processed.

In the flowchart on the right-hand side of FIG. 7a for the equivalence relation deletion process, a sequence of judgments in steps c1, c2, c3, c4, c7, and c10 decode. each instruction and, based on these judgments, steps c5, c6, c8, c9, c11, c12, and c13 are selectively executed to delete items in the equivalence sets.

Figure 8A:
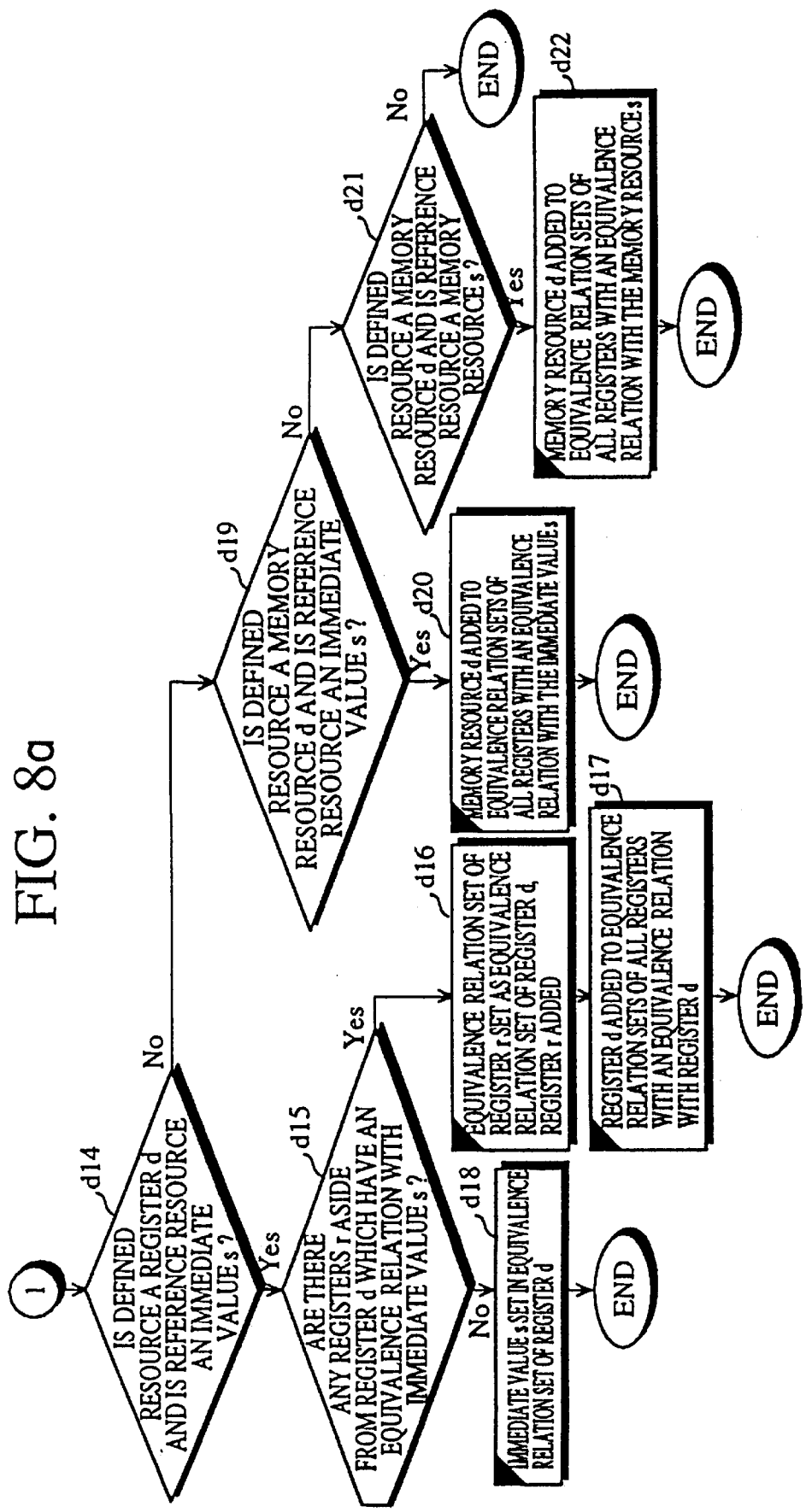
FIGS. 8a, 8b, and 8c show the subflow for the equivalence relation generation process step b4 of FIGS. 7a and 7b.
Figure 8B:
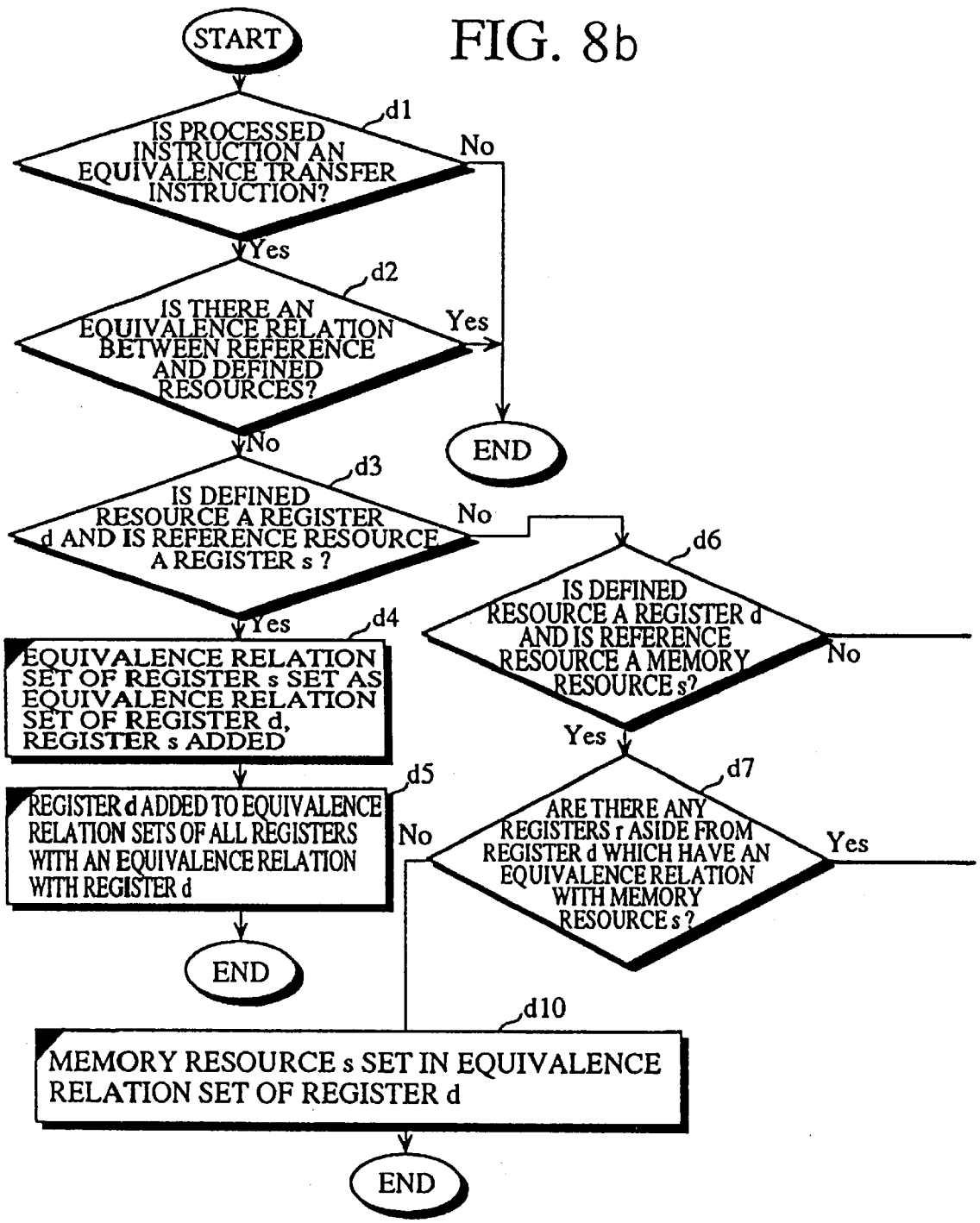
Figure 8C:
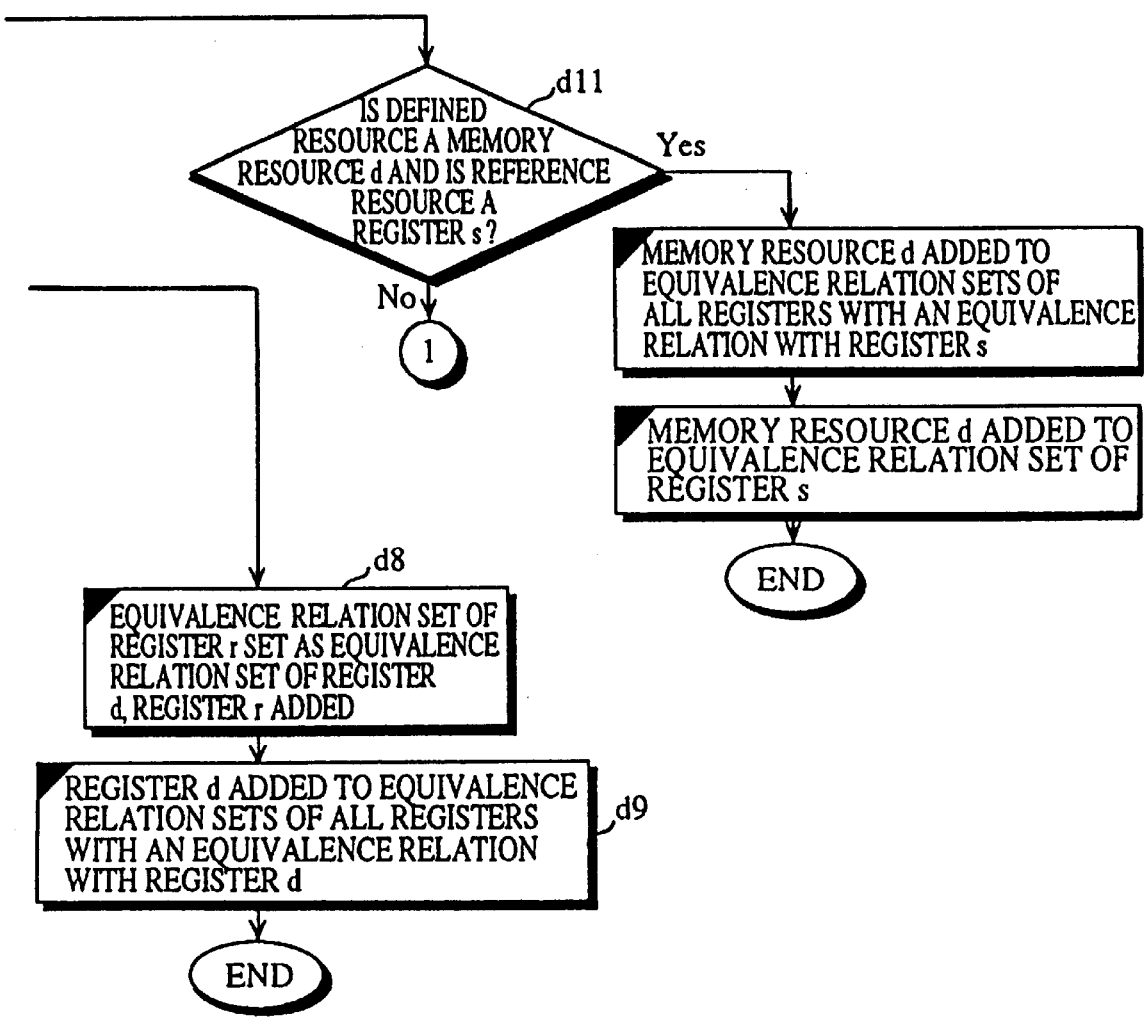

FIGS. 8a, 8b, and 8c are a flowchart showing the subflow of the equivalence relation generation process in step b4 of the flowchart in FIG. 7a. In FIGS. 8a, 8b, and 8c, steps d1, d2, d3, d6, d7, d11, d14, d15, d19, and d21 form a sequence of judgment steps which identify the operand code in each instruction, and, based on these judgments, steps d4, d5, d8–d10, d12–d13, d16–d18, d20, and d22 are selectively executed to generate equivalence relations.

The following is an explanation of each of the steps in these flowcharts in the order of their reference numerals Step a1 sets the In set of the first basic block as an empty set. If the In set is the empty set, the equivalence relations which result from the instructions inside one basic block can be generated by the execution of step a3 as described in the Prior Art section. Unlike the first basic block, the In sets of basic blocks which may be a branch destination of another basic block are each initially determined as the universal set in the present invention. This universal set is the set which is a list of all of the operand codes in the program. For the example program in FIG. 2, the universal set U is as follows.

U= {#10,D0,(_a),(10,SP),D1,#0,(2,SP),
    #1,A0,(20,SP),#100,(4,SP)}

Initialization using the universal set is described below. Each basic block, aside from the first basic block, has the potential to inherit the equivalence relations of a branch origin basic block. Since there is this possibility, basic blocks which can be a branch destination have the universal set written into their In set column.

As one example, suppose that equivalence relations are established immediately before the entry point of a basic block and that the values stored by these resources with equivalence relations are unchanged by this basic block. As the specific example of FIG. 2, since none of the values of data register D0, immediate value 10, and the external memory (_a) change in basic block B2, the equivalence relations for these resources are maintained until the exit point of the basic block.

When the In set of a basic block which has a branch origin is set as the empty set, these kinds of equivalence relations are not expressed in the In set column of the basic block. This is to say, it is no longer possible to detect equivalence relations which are inherited from the branch origin. As a result, basic blocks which have a branch origin initially have the universal set written into their In set columns to assist in the detection of the resources which may potentially be written in the In set column.

Incidentally, the calculation of this universal set U is performed by collecting the source code and destination code of all of the instructions which are included in the program which is being processed and by simply converting the collected information into a set.

In step a2–step a4, a switch is performed to the out set calculation process (described below) for each basic block.

In step a5, the Out set change flag, which shows whether the out set has changed, is set at OFF.

In steps a6, a7, a8, a9, a10, and a11, the calculation of an In set and an Out set is performed for all of the basic blocks, aside from the first basic block.

In particular, in step a7, the In set of a basic block is found as the set product of the Out sets of all of the preceding basic blocks. For the case of the basic block B4 in FIG. 5 which has four basic blocks (basic blocks B2, B3, M1, and M2), the set product is obtained by finding the common elements in the Out sets of each of basic blocks B2, B3, M1, and M2. In step a7, the calculation of this set product is performed so that these common elements can be written into the In set column.

In step a8, the In set which was calculated by step a7 is set as the initial value and the processing advances to the out set calculation process for the basic block.

In step a9, it is judged whether there has been a change in the members of the Out set from the previously calculated Out set. If there has been a change, the processing advances to step a10, or if not, the processing advances to step a11.

In step a10, the Out set change flag, which shows whether the Out set has changed, is set at ON.

In step a12, it is judged whether the Out set change flag which shows that Out set has changed is ON When it is ON, the processing returns to step a5, while when the flag is OFF, the processing is terminated.

Figure 19:
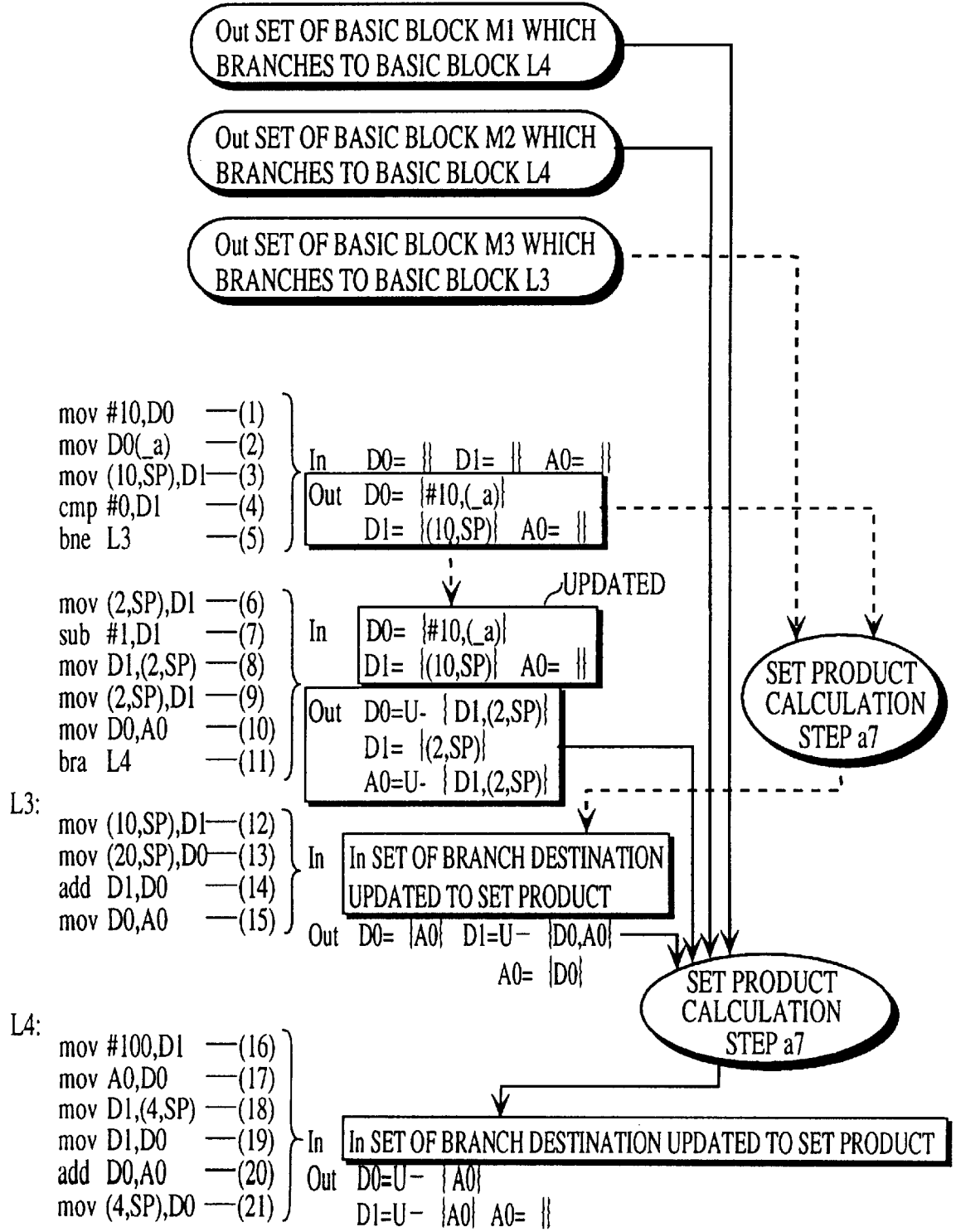
FIG. 19 shows the updating of the In set of each basic block in step a7 of a first iteration of the main flow of the global equivalence relation analysis process, the Out set calculation process, and the equivalence relation deletion process shown FIGS. 7a and 7b.
Figure 20:
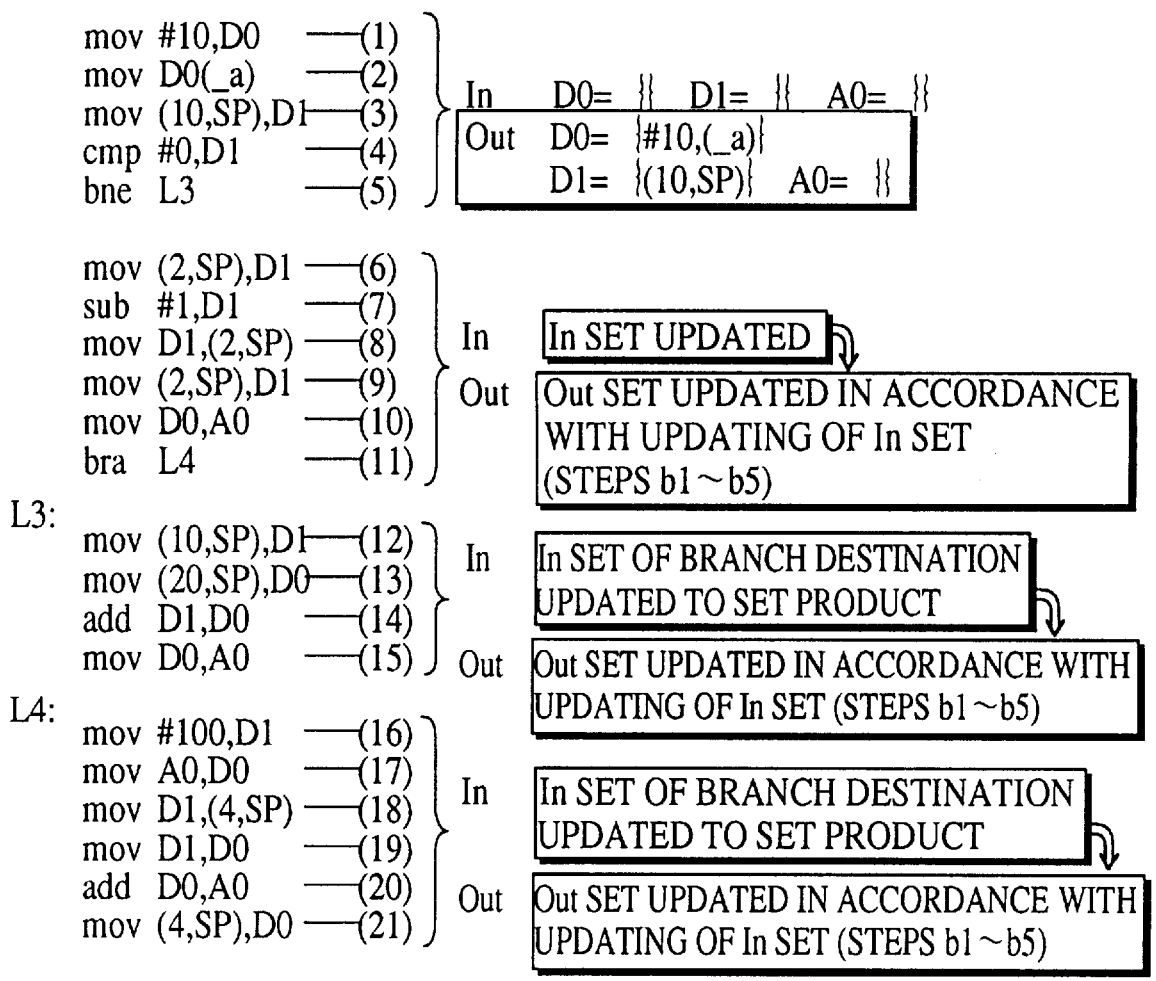
FIG. 20 shows the updating of the Out set of each basic block in step a8 of a first iteration of the main flow of the global equivalence relation analysis process, the Out set calculation process, and the equivalence relation deletion process showing.
Figure 21:
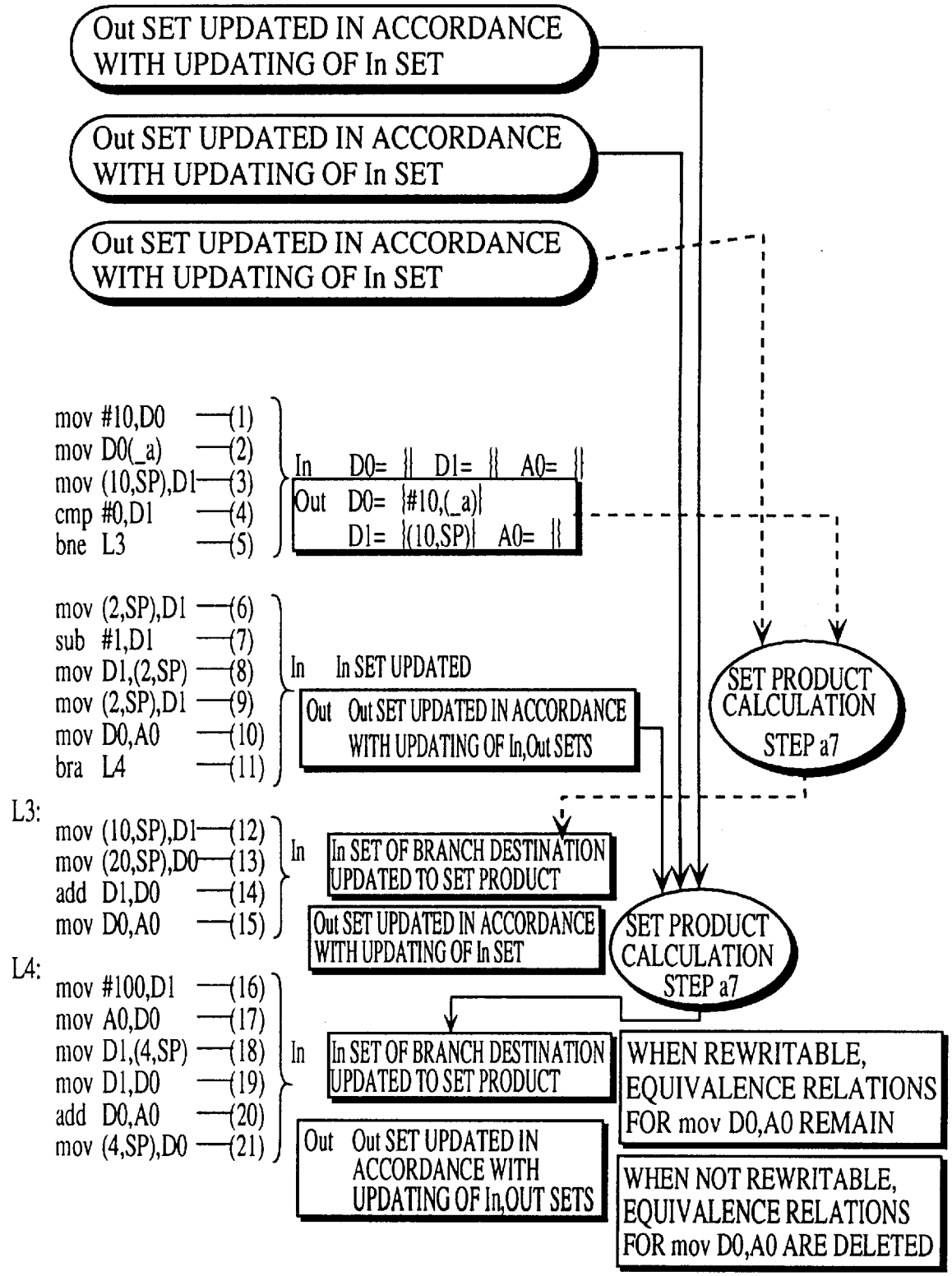
FIG. 21 shows the updating of the In set of each basic block in step a7 of a second iteration of the main flow of the global equivalence relation analysis process, the Out set calculation process, and the equivalence relation deletion process shown FIGS. 7a and 7b.

The following is an explanation of the processing in steps a1–a12 with reference to FIGS. 19 through 21. FIG. 19 shows the updating of the In set of each basic block due to the processing in step a7 during a first iteration of the main flow shown in FIGS. 7a and 7b, FIG. 20, meanwhile, shows the updating of the Out set of each basic block due to the processing in step a8 during a first iteration of the main flow shown in FIGS. 7a and 7b. FIG. 21 shows the updating of the In set of each basic block due to the processing in step a7 during a second iteration of the main flow shown in FIGS. 7a and 7b. These figures shown representations of the calculation process for the set products and the updating process for the In sets.

In FIG. 19, the lines which have been labeled with the character strings "In"}, "Out" show the In set and out set Of each basic block, while the curved line which surrounds the character string "set product calculation a7" shows the set product calculation process in step a7. Here, branch blocks with the same branch destination have a same kind of arrow drawn from their Out set. This is to say, the arrows in this drawing show correspondence between In sets and Out sets. In this drawing, arrows have been drawn as solid lines extending front basic blocks B2, M1, and M2 to the set production calculation process, which shows that in FIG. 19, a set product is calculated for these basic blocks since they have the same branch destination. The arrows drawn with a broken line which originate from the basic blocks B1 and M3 to a different execution of the set product calculation process show that a set product is calculated for these basic blocks since they also share a branch destination.

The arrows drawn with a broken line from the set product calculation processes to the basic blocks B3, B4 show that the In sets of basic blocks B3 and B4 are updated as a result of these respective executions of the set product calculation process.

FIG. 20 shows the recalculation of the Out set in step a8, after the In set has been calculated in FIG. 19. Here, FIG. 21 shows the second iteration of the set product calculation process and the process setting the In set Unlike FIG. 19, FIG. 21 shows the recalculation of the In set as a set product using the Out set has been recalculated in FIG. 20.

Here, by repeating the processing of step a1–step a12, the set products are calculated and the In sets is updated as shown in FIGS. 19–21.

Regarding the convergence of the loop process made up of step a6 to a11

In the following example, the program to be processed is made up of basic blocks B1, B2, B3, B4 and B5, with the final basic block B5 branching to the first basic block B1 to form a loop process. In this case, the Out sets of basic blocks B1 to B4 are successively calculated and, once the Out set of basic block B4 has been calculated, the In set or the basic B1 needs to be recalculated. In the processing in steps a6 to a11, the equivalence relation deletion process is repeated until there are no tore changes to the In sets, although when the program to be processed is a loop process, there is the problem of how the convergence will occur for the loop process between step a6 and step a11.

In the repeated processing, the In set and Out set of each basic block aside from the first basic block are calculated. For blocks which follows immediately after the ad first basic block (followings block), however, the In set is found as a set product which is calculated using the Out set of the first basic block, so that the equivalence relations included in its In set column cannot exceed the equivalence relations in this Out set column of the first basic block. As a result, the number of sets of equivalence relations obtained by the calculation of a set product can definitely be reduced. By repeating this set product calculation process and the setting of the In sets, the number of equivalence relations will definitely converge, so that the processing in this flowchart can be completed in a finite time. Even when the program to be processed is a loop process which features a branch from the final basic block to the first basic block, equivalence relations between branch origins and branch destinations car be properly obtained by repeating the calculation of Out sets and In sets in the loop process between step a6 and a11 many times.

In the Out set calculation process, the In set at the entry point into the present basic block is set as the base, with equivalence relations being successively deleted and generated for each of the instructions in the basic block from the start to the end, before the processing advances to the calculation of the Out set at the exit point of the basic block.

The steps in the out set calculation process are explained below with reference to the flowchart in FIG. 7a and 7b. In step b1, the calculated In set is set for the corresponding basic block.

In steps b2 to b5, the equivalence relation deletion process and equivalence relation generation process are repeated for all instructions, and, after the last Instruction has been processed, the processing in these steps is terminated.

The steps in the equivalence relation deletion process are explained below, with reference to the flowchart of FIG. 7a and 7b.

Steps c1 to c3, c10 . . . Instruction Identification Process

In step c1, it is determined whether the instruction presently being processed (called the "processed instruction") is an instruction which changes the value of a resource. If so, the processing advances to step c2, or if not, the processing advances to step c10.

In step c2, it is determined whether the instruction being processed is an equivalence transfer instruction. If so, the processing advances to step c3, or if not, the processing advances to step c4.

In step c3, it is determined whether the defined resource of the processed instruction exhibits an equivalence relation with the reference resource. If so, the processing is terminated, or if not, the processing advances to step c4.

In step c10, it is determined whether the processed instruction is a subroutine call instruction. If so, the processing advances to step c11, or if not, the processing is terminated.

By performing the sequence of judgments in steps c1, c2, and c10, the processed instruction can be identified as one of several types. If the processed instruction is an instruction, such as comparison instruction, which does not affect the value of resources, the judgment "No" will be given in both step c1 and step c10 and the processing will be terminated. However, it the instruction is not an equivalence transfer instruction, or if the resource defined by the equivalence transfer instruction does not exhibit an equivalence relation with the reference resource, the judgment "Yes" is given in step c1, the judgment "No" is given in step c2, and the processing advances to step c4. When the processed instruction is an equivalence transfer instruction and the defined resource exhibits an equivalence relation with the reference resource, the judgments "Yes" in step c1, "Yes" in step c2, and "Yes" in step c3 are given and the processing is terminated. When the processed instruction is a subroutine call instruction, the judgments "No" in step c1 and "Yes" in step c10 are given and the processing advances to step c11. Step c4–c9.

Equivalence Relation Deletion Process in accordance with Combination of Source Code and Destination code In step c4, it is determined whether the resource defined by the processed instruction is a register. If so, the processing advances to step c5, or if not, the processing advances to step c7.

In step c7, it is determined whether the resource defined by the processed instruction is a memory resource. If so, the processing advances to step c8, or if not, the processing advances to step c9.

When the processed instruction has been determined as an eqivalence transfer instruction and the processing has advanced to c4 where it is determined that the defined resource is a register ("Yes"), equivalence relations are deleted in steps c5 and c6. If the detained resource is determined as a memory resource in step c7 ("Yes"), equivalence relations are deleted in steps c8.

In step c5, the equivalence relations set of register r is set as the empty set. This deletion of the equivalence relations for the register r is performed on the assumption that the equivalence relations of the register r which were established in the equivalence set column have collapsed.

In step c6, register r is deleted from the equivalence relation sets of all other registers.

The following is detailed description of a specific example of the processing in steps c5 and c6 for the transfer instruction "mov (2,SP), D1" in basic block B2. The equivalence set of each register when step c4 is executed is set by step a1, with these sets being shown below in {Numerical Formula 1}.

{Numerical Formula 1}
  register D0=U
  register D1=U
  register A0=U

The processing in step c5 changes the equivalence relation set of register r (register D1) to the empty set, as shown by {Numerical Formula 2}.

{Numerical Formula 2}
  register D0=U
  register D1=φ
  register A0=U (·X·φ is the empty set, sometimes written as "{ }")

When the processing in step c6 is perforated, data register D1 is deleted from the equivalence relation set for all registers except register r, so that these equivalence relation sets become as shown in {Numerical Formula 3}.

{Numerical Formula 3}
  register D0=U-{D1}
  register D1=φ
  register A0=U-{D1}

In step c8, memory m is deleted from the equivalence relations sets of each of the registers.

In step c9, all of the memory resources m is deleted from the equivalence relations sets of all of the registers.

The following is a detailed explanation of the processing in step c8 for the specific example of the transfer instruction "mov D1, (2,SP)" in basic block B2. After the execution of step c7, the equivalence set of each register is set as shown in {Numerical Formula 4}

{Numerical Formula 4}
  register D0=U-{D1}
  register D1=φ
  register A0=U-{D1}

When the processing of step c8 is performed, stack (2,SP) is deleted from the equivalence relation sets for all of the registers, so that the equivalence relation set a change to those shown in {Numerical Formula 5}.

{Numerical Formula 5}
  register D0=U-{D1, (2,SP)}
  register D1=φ
  register A0=U-{D1, (2,SP)}

In steps c11, c12, and c13, a subroutine call instruction is executed which sets the equivalence relation sets of the broken registers as the empty set and which deletes all instances of the broken registers from the equivalence relation sets of all other registers.

Figure 9:
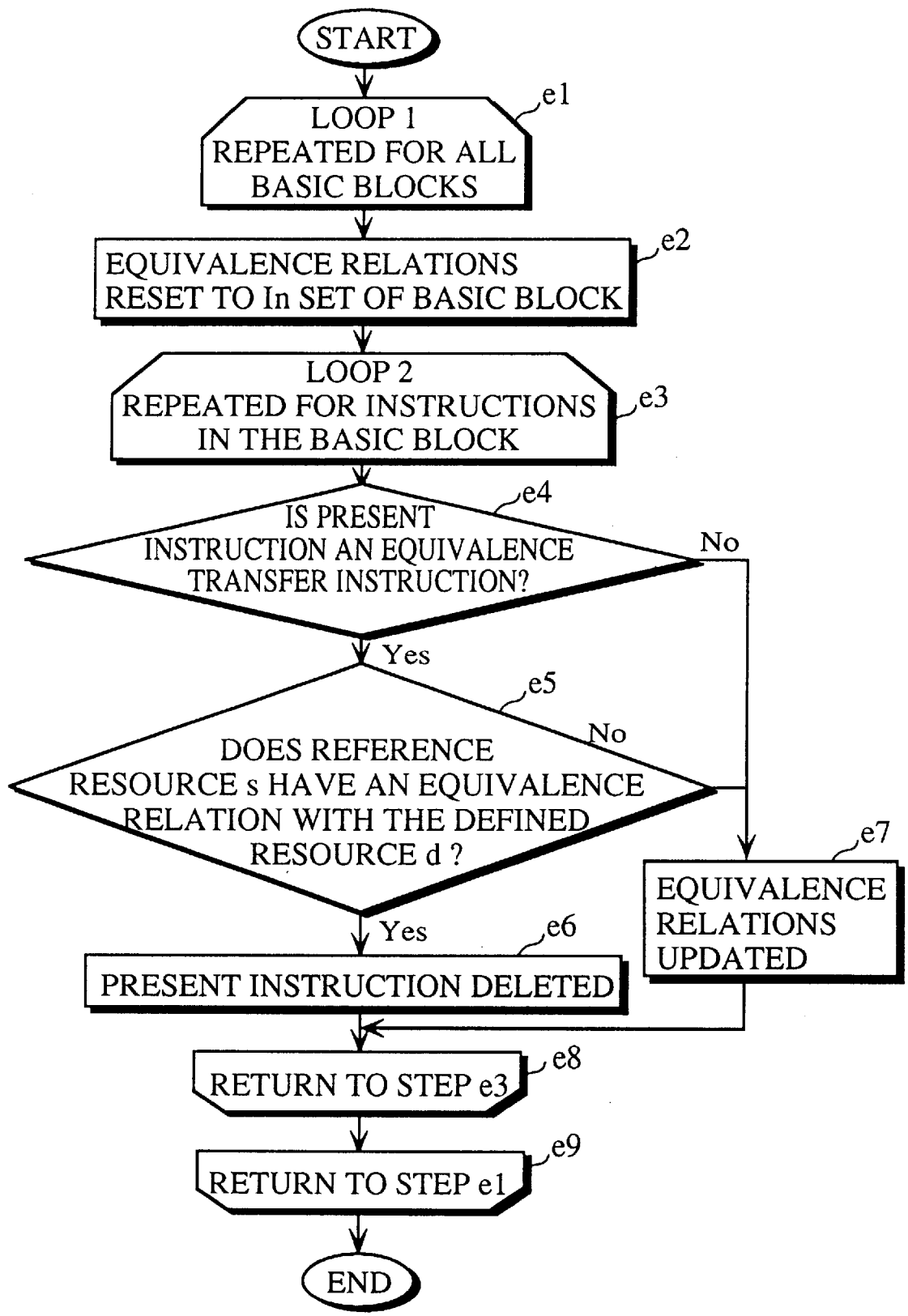
FIG. 9 is a flowchart for the process of the equivalence resource transfer instruction deletion unit 5 shown in FIG. 6.

The following is an explanation of the steps in the equivalence relation generation process, with reference to the flowchart in FIG. 9.

Steps d1, d2 Instruction Decoding Process

In step d1, it is judged whether the processed instruction is an equivalence transfer instruction. If so, the processing advances to step d2, or if not, the processing is terminated.

In step d2, it is judged whether the definition and reference resources of the processed instruction exhibit an equivalence relation with each other, If not, the processing advances to step d3, or if so, the processing is terminated.

In the sequence of judgment steps made up of steps d1 and d2, a judgment is made as to what type of instruction is presently being processed. If the processed instruction is an instruction, such as a comparison instruction, which does not affect resources, the judgment "No" is given in step d1 and the processing is terminated. When this is not the case, or when the resource defined by an equivalence transfer instruction does not have an equivalence relation with the referred resource, the judgment "Yes" is given in step d1, the judgment "No" is given in step d2, and the processing advances to step d3. When the resource defined by an equivalence transfer instruction does have an equivalence relation with the referred resource, the judgment "Yes" is given in step d1, the judgment "Yes" is given in step d2, and the processing is terminated.

Steps d3, d6, d11, d14, d19, and d21 Identification of combination of Source Code and Destination Code In step d3, it is judged whether both the resource defined by the processed instruction and the resource referred to by the processed instruction are registers. If so, the processing advances to step d4, or if not, the processing advances to step d6.

In step d6, it is judged whether the resource defined by the processed instruction is a register and the resource referred to by the processed instruction in a memory resource. If so, the processing advances to step d7, or it not, the processing advances to step d11.

In step d11, it is judged whether the resource defined by the processed instruction is a memory resource and the resource referred to by the processed instruction is register. If so, the processing advances to step d12, or if not, the processing advances to step d14.

In step d14, it is judged whether the resource defined by the processed instruction is a register and the resource referred to by the processed instruction is an immediate value. If so, the processing advances to step d15, or if not, the processing advances to step d19.

In step d19, it is judged whether the resource defined by the processed instruction is a memory resource and the resource referred to by the processed instruction is an immediate value. If so, the processing advances to step d20, or if not, the processing advances to so step d21.

In step d21, it is judged whether the resource defined by the processed instruction is a memory resource and the resource referred to by the processed instruction is a memory resource. If so, the processing advances to step d22, or if not, the processing is terminated.

By executing the sequence of judgment steps made up of steps d3, d6, d11, d14, d19, and d21, the combination of source code and destination code can be determined. For a combination where both the source code and the destination code are registers, the judgment "Yes" is given in step d3 and equivalence relations are generated in steps d4 and d5. If the destination code is a register, but the source code is a memory resource, the judgment "Yes" is given in step d6 and equivalence relations are generated in steps d7 to d10. If the destination code is a memory resource and the source code is a register, the judgment "Yes" is given in step d11, and equivalence relation are generated in steps d12 and d13.

When the destination code is a register, but the source code is an immediate value, the judgment "Yes" is given in step d14 and equivalence relations are generated in steps d15 to d18. When the destination code is a memory resource, but the source code is an immediate value, the judgment "Yes" is given in step d19 and equivalence relations are generated in step d20. Finally, when the destination code and the source code are memory resources, the judgment "Yes" is given in step d21 and equivalence relations are generated in step d22.

1. Case when the destination code and the source code are both registers

When the both the destination code and the source code are registers, equivalence relations are generated in step d4 and d5. In step d4, all of the members which have been written into the equivalence relation set of the reference register a are copied into the equivalence set column of the definition register d. Here, register s is also written into the equivalence set column of the definition register d. In step d5, the equivalence set columns of all registers with an equivalence relation with register d are found, register d is written into these equivalence set columns and the processing is terminated.

The following is a detailed explanation of a specific example of the processing in steps d4 and d5 for the transfer instruction "mov D0, A0__(10)" when the equivalence relations have been set as shown below in {Numerical Formula 7}. Here, the equivalence set for the register A0 is the empty set due to the processing in step c5, while the equivalence sets of registers D0 and D1 do not contain register A0 due to the processing in step c6.

{Numerical Formula 7}
    register D0={#10, (2,SP), D1}
    register D1={#10, (2,SP), D0}
    register A0=φ

When the processing of step d4 is performed, the members of the equivalence set of register s (data register D0) are copied into the equivalence set column or register d (address register A0), so that the equivalence sets become as shown in {Numerical Formula 8}. By doing so, address register A0 can inherit all resources which have an equivalence relation with data register D0. In this way, the members of the equivalence set of address register A0 can be increased using the data register D0.

{Numerical Formula 8}
    register D0={#10, (2,SP), D1}
    register D1={#10, (2,SP), D0}
    register A0={#10, (2,SP), D1}←Note change here Next, after register s (data register D0) is added to the equivalence set column of register d (address register A0) by the processing of step d4, the equivalence sets change as shown by {Numerical Formula 9}.

{Numerical Formula 9}
    register D0={#10, (2,SP), D1}
    register D1={#10, (2,SP), D0}
    register A0={#10, (2,SP), D1D0}←Note change here Next, when the processing in step d5 is performed, the register s (address register0) is set in the equivalence set column of each register (data register D0, data register D1) which has an equivalence relation with register d (address register A0), so that the equivalence sets change to those shown in {Numerical Formula 10}. since an equivalence relation is established between data register D0 and address register A0, data register D1, which already had an equivalence relation with data register D0, is given an equivalence relation with address register A0 through data register D0, Since address register A0 was added to the equivalence set of data register D1, the number of members in the equivalence set of data register D1 have been increased using data register D0.

By the above processing in steps d4 and d5, an indirect equivalence relation is established between address register A0 and data register D0 by the transfer instruction.

{Numerical Formula 10}
    register D0={#10, (2,SP), D1, A0}←Note change here
    register D1={#10, (2,SP), D0, A0}←Note change here
    register A0={#10, (2,SP), D1, D0}

2. Case when the destination code is a register and the source code is a memory resource}

When it is determined that the destination code is a register and the source code is a memory resource, equivalence relations are generated in the process between step d7 and d10.

In step d7, it is judged whether any register r, out of all of the registers aside from the register d which is defined by the processed instruction, has an equivalence relation with the memory resource s which is referred to by the processed instruction. If such a register exists, the processing advances to step d8, or if not, the processing advances to step d10.

In steps d8 and a d9, all of the members of the equivalence set column of register r are copied into the equivalence set column of the register d. After this, register r is also added to the equivalence set column of the register d. After this, the equivalence set columns of all of registers which have an equivalence relation with register d are found, register d is added to these columns, and the processing is terminated.

In step d10, the reference resource memory s is written into the equivalence set column of the defined resource register d and the processing is terminated.

The following is a detailed description of the processing in steps d7–d9 for the specific example of the transfer instruction "mov (2,SP), D1__(9)", when equivalence relations are set as shown in {Numerical Formula 11}

{Numerical Formula 11}
    register D0={#10, (2,SP),A0}
    register D1=φ
    register A0={#10, (2,SP),D0}

By executing the processing in step d7, data register D0 is judged as the register r which, aside from the register d (data register D1), has an equivalence relation with stack (2,SP).

Next, the processing of step dg ia performed and all members of the equivalence set of register r (data register D0) are written into the equivalence set column of register d (data register D1). As a result, the equivalence sets become as shown in {Numerical Formula 12}. As shown in {Numerical Formula 12}, the number of members in the equivalence set of data register D1 can be increased using the stack (2, SP). The processing of the above steps d6–d8 increases the number of equivalence set members of data register D0, data register D1, and address register A0 by way of the stack (2, SP).

{Numerical Formula 12}
    register D0={#10, (2,SP),A0}
    register D1={#10, (2,SP),A0}
    register A0={#10, (2,SP),D0}

By the processing of step d8, register r (data register D0) is added to the equivalence set column of register d (data register D1). As a result, the equivalence sets become as shown in {Numerical Formula 13}.

{Numerical Formula 13}.
    register D0={#10, (2,SP),A0}
    register D1={#10, (2,SP),A0,D0}
    register A0={#10, (2,SP),D0}

By means of the processing in step d9, register d (data register D1) is added to the equivalence sets of all registers (data register D0 address register A0) which have an equivalence relation with register d (data register D1) As a result, the equivalence sets become as shown in {Numerical Formula 14}. Here, using the data register D0 which was set as having an equivalence relation though the stack (2,SP), an equivalence relation is established between address register A0 and data register D1. The processing of the above steps d6–d9 increases the number of members in the equivalence sets of data register D0, data register D1, and address register A0 by way of the stack (2,SP). This increase in the number of members in the equivalence sets improves the probability that redundant transfer instructions are deleted.

{Numerical Formula 14}
    register D0={#10, (2,SP),A0,D1}
    register D1={#10, (2,SP),A0,D0}
    register A0={#10, (2,SP),D0,D1}

3. Case when the destination code is a memory resource and the source code is a register When it is determined that the destination code is a memory resource and the source code is a register, a equivalence relations are generated in the process in steps d12 and d13.

In step d12 and d13, the equivalence set columns of all registers with an equivalence relation with register s of the processed instruction are found, and memory d is written as into these equivalence set columns. After this, memory d is added to the equivalence set column of register s, and the processing is terminated.

4. Case when the destination code is a register and the source code is an immediate value When it is determined that the destination code is a register and the source code is an immediate value, equivalence relations are generated in the process in steps d15 to d18.

In step d15, it is determined whether there are any registers r, aside from the register d which is the defined resource of the processed instruction, which have an equivalence relation with the immediate value s which is the reference resource. If such a register exist, the processing advances to step d16, or if not, the processing advances to step d18.

In step d16 and d17, all of the members of the equivalence set column of register r which has an equivalence relation with the immediate value s are copied into the equivalence set column of the register d. After this, register r is also added to the equivalence set column of the register d. After this, the equivalence set columns of all of registers which have an equivalence relation with register d are found, register d is added to these columns, and the processing is terminated.

In step d18, the reference resource immediate value s is written into the equivalence set column of the defined resource register d, and the processing is terminated.

The following is a detailed description of the processing in steps d16–d18 for the specific example of the transfer instruction "mov #100, D1", when equivalence relations are set as shown in {Numerical Formula 15}.

{Numerical Formula 15}
    register D0={#100, (2,SP)}
    register D1=φ
    register A0=φ

By executing the processing in step d15, data register D0 is judged as a register r which, aside from the register d (data register D1), has an equivalence relation with immediate value #100.

Next, the processing of step d16 is performed and all of the codes in the equivalence set of register r (data register D0) are written into the equivalence set column of register d (data register D1). As a result, the equivalence sets become as shown in {Numerical Formula 16}. As shown in {Numerical Formula 16}, the number of members in the equivalence set of data register D1 can be increased using the stack (2,SP) via the immediate value #100.

{Numerical Formula 16}
    register D0={#100, (2,SP)}
    register D1={#100, (2,SP)}
    register A0=φ

By the processing of step d16, register r (data register D0) is added to the equivalence set column of register d (data register D1). As a result, the equivalence sets become as shown in {Numerical Formula 17}.

{Numerical Formula 17}
    register D0={#100, (2,SP)}
    register D1={#100, (2,SP)}←Note change here
    register A0=φ

In step d17, register d (data register D1) is added to the equivalence sets of all registers (data register D0) which have an equivalence relation with register d (data register D1). As a result, the equivalence sets become as shown in {Numerical Formula 18}. Here, an equivalence relation is established between data register D0 and data register D1 by way of the immediate value #100. The processing of the above steps d15–d17 increases the number of members in the equivalence sets of data register D0 and data register D1 by way of the immediate value #100. This increase in the number of members in the equivalence sets improves the probability that redundant transfer instructions are deleted.

{Numerical Formula 18}
    register D0={#100, (2,SP), D1}←Note change here
    register D1={#100, (2,SP), D0}
    register A0=φ

5. Case when the destination code is a memory resource and the source code is an immediate value When it is determined that the destination code is a memory resource and the source code is an immediate value, equivalence relations are generated in the process in step d20.

In step d20, the equivalence set columns of all registers with an equivalence relation with immediate value s which is the reference resource of the processed instruction are found, and memory d, which is the definition resource of the processed instruction, is written into these equivalence set columns. After this, the processing is terminated.

6. Case when both the destination code and the source code are memory resources

In step d22, the equivalence set columns of all registers with an equivalence relation with the memory resource s which is the reference resource of the processed instruction are found, and memory resource d which is the definition resource of the processed instruction is written into these equivalence set columns. After this, the processing is terminated.

The following is a description of the processing of the global equivalence relations analysis unit 4 for an example which uses the source program shown in FIG. 2.

In step a1, U={#10,D0, (_a), (10,SP),D1,#0, (2,SP), #1,A0, (20,SP),#100, (4,SP)} is found, and the In set of each basic block is set as shown in {Numerical Formula 19}.

| {Numerical Formula 19} | |
|---|---|
| B1: In | D0= {} D1= {} A0= {} |
| Out | D0= {} D1= {} A0= {} |
| B2: In | D0= U D1= U A0= U |
| Out | D0= {} D1= {} A0= {} |
| B3: In | D0= U D1= U A0= U |
| Out | D0= {} D1= {} A0= {} |
| B4: In | D0= U D1= U A0= U |
| Out | D0= {} D1= {} A0= {} |

Next, the out set is calculated for each basic: block (step a3). In the Out sat calculation process, the equivalence relation deletion process (step b3) and the equivalence relation generation process (step b4) are repeated for each instruction. Here, the steps in the Out set calculation process for basic block B1 will be used as an example of this process.

First, the processing switches to the equivalence relation deletion process shown in FIG. 7. In step c1, it is judged whether the transfer instruction "mov #10,D0_(1)" is an instruction which changes the value of a resource. Here, since transfer instruction "mov #10,D0_(1)" is such an instruction, the processes advances to step c2. In step c2 it is judged that the transfer instruction "mov #10,D0_(1)" is an equivalence transfer instruction, so that the processing advances to step c3. In step c3, it is judged that the equivalence relation set of the register D0 which is the definition resource of the transfer instruction "mov#10,D0_(1)" has not been set, so that the processing advances to step c4. In step c4, the resource defined by transfer instruction "mov#10D0_(1)" is judged to be a register, so that the processing advances to step c5. In steps c5 and c6, the equivalence relation set of register D0 is set as the empty set, and register D0 is deleted from the equivalence relation sets of all registers except register D0, before the equivalence relation deletion process is terminated. Here, the equivalence sets after this equivalence relation deletion process are shown by the arrow a in FIG. 17.

Next, the processing switches to the equivalence relation generation process shown in FIGS. 8a, 8b, and 8c. In step d1, it is judged whether transfer instruction "mov #10D0_(1)" is an equivalence transfer instruction. Since transfer instruction "mov#10D0_(1)" is such an equivalence transfer instruction, the processing advances to step d2. In step d2, the equivalence relation set of register D0 which is the definition resource of transfer instruction "mov #10D0_(1)" is found to have not been set, so that the processing switches to step d3. Since in transfer instruction "mov#10D0_(1)", the reference resource is an immediate value and the defined resource is a register, the judgment "No" is given in steps d3, d6, and d11, and the judgment "Yes" is given in step d14, so that the processing advances to step d15. In Step d15, no register aside from register D0 is found to have an equivalence relation with the immediate value 10, so that the processing moves to step d18. In step d18, immediate value 10 is written into the equivalence set column of register D0 and the equivalence relation generation process is terminated. Here, the equivalence sets after this equivalence relation generation process are shown by the arrow b in FIG. 17.

After the above equivalence relation deletion process and equivalence relation generation process has been performed for transfer instruction "mov D0, (_a)_(2)", transfer instruction "mov (10,SP),D1_(3)", comparison instruction "cmp #0, D1_(4)", conditional branch instruction "bneL3_(5)", the equivalence relation sets for each of these instructions become as shown in FIG. 17.

As a result of the execution of the above instructions, the Out set of basic block B1 becomes as shown in FIG. 18. Following this, the Out set calculation process is performed for basic block B2, basic block B3, and basic block B4, repeating the equivalence relation deletion process and equivalence relation generation process. Accordingly, the equivalence relation deletion process and equivalence relation generation process shown in FIGS. 7a, 7b, 8a, 8b, and 8c are performed for the instructions from transfer instruction "mov (2,SP),D1_(6)" to transfer instruction "mov (4,SP), D0_(21)", which results in the equivalence relations for registers D0, D1, and A0 which are described below.
Basic block B2: transfer instruction "mov (2,SP),D1_(6) "branch instruction "bra L4_(11)"}

Since the equivalence relations D0=U, D1=U, and A0=U are set for the transfer instruction "mov (2₁SP),D1_(6)", data register D1 and stack (2,SP) exhibit an equivalence relation with each other. As a result, the judgment "Yes" is given in step c3 and no deletion of equivalence relations is performed, so that the equivalence relations of registers D0, D1, A0 are as follows.

| D0=U | D1=U | A0=U |
| --- | --- | --- |

Since the equivalence relations D0=U, D1=U, and A0=U are set for the transfer instruction "mov (2,SP),D1_(6)", data register D1 and stack (2,SP) exhibit an equivalence relation with each other. As a result, the judgment "Yes" is given in step d2 and no generation of equivalence relations is performed, so that the equivalence relations of registers D0, D1, A0 are as follows.

| D0=U | D1=U | A0=U |
| --- | --- | --- |

Since the equivalence relations D0=U, D1=U, and A0=U are set for the subtraction instruction "sub #1, D1_(7)", the equivalence relation deletion process is performed in steps c5, c6 and the processing is terminated. As a result, the equivalence relations of registers D0, D1, A0 are as follows.

| D0=U-{D1} | D1={} | A0=U -{D1} |
| --- | --- | --- |

Since the source code for the transfer instruction "mov D1, (2,SP)_(8)" is a register and the destination code is a memory resource, the equivalence relation deletion process in step c8 is performed, which results in the equivalence relations for registers D0, D1, and A0 which are shown below.

| D0=U-{D1, (2,SP)} | D1={} | A0=U-{D1, (2,SP)} |
| --- | --- | --- |

Since the source code for the transfer instruction "mov D1, (2,SP)_(8)" is a register and the destination code is a memory resource, the equivalence relation generation process in steps d12 and d13 is performed, which results in the equivalence relations for registers D0, D1, and A0 which are shown below.

| D0=U-{D1, (2,SP)} | D1={(2,SP)} | A0=U-{D1, (2,SP)} |
| --- | --- | --- |

Since the equivalence relations for the transfer instruction "mov (2,SP), D1_(9)" are D0=U-{D1, (2,SP)}, D1={(2, SP)}, and A0=U-{D1,(2,SP)}, the register D1 and the stack (2,SP) have an equivalence relation with each other. As a result, the judgment "Yes" is given in step c3 and no deletion of equivalence relations is performed, so that the equivalence relations of registers D0, D1, A0 are as follows.

| D0=U-{D1, (2,SP)} | D1={(2,SP)} | A0=U-{D1, (2,SP)} |
| --- | --- | --- |

Since the equivalence relations for the transfer instruction "mov (2,SP), D1_(9)" are D0=U-{D1, (2,SP)}, D1={(2, SP)}, and A0=U-{D1,(2,SP)}, the register D1 and the stack (2, SP) have an equivalence relation with each other and the judgment "Yes" is given in step d2, so that no generation of equivalence relations is performed. As a result, the equivalence relations of registers D0, D1, A0 are as follows.

| D0=U-{D1, (2,SP)} | D1={(2,SP)} | A0=U-{D1, (2,SP)} |

The equivalence relations or the transfer instruction "mov D0, A0_( 10)" are D0=U-{D1, (2,SP)}, D1={(2,SP)}, and A0=U-{D1, (2,SP)}, so that the registers D0 and A0 have an equivalence radiation with each other. As a result, the judgment "Yes" is given in step c3 and no deletion of equivalence relations is performed, so that the equivalence relations of registers D0, D1, A0 are as follows.

| D0=U-{D1, (2,SP)} | D1={(2,SP)} | A0=U-{D1, (2,SP)} |

The equivalence relations for the transfer instruction "mov D0, A0_(10)," are D0=U-{D1, (2,SP)}, D1={(2, SP)}, and A0=U-{D1, (2,SP)}, so that the registers D0 and A0 have an equivalence relation with each other. As a result, the judgment "Yes" is given instep d2 and no generation of equivalence relations is performed, so that the equivalence relations of registers D0, D1, A0 are as follows.

| D0=U-{D1, (2,SP)} | D1={(2,SP)} | A0=U-{D1, (2,SP)} |

Basic block B3: transfer instruction "mov (10,SP), D1_(12)" transfer instruction "mov D0,A0_(15)"}
Since the equivalence relations D0=U, D1=U, and A0=U are set for the transfer instruction "mov (10, SP), D1_(12)", data register D1 and stack (10,SP) exhibit an equivalence relation with each other. As a result, the judgment "Yes" is given in step c3, no deletion of equivalence relations is performed, and the equivalence relations of registers D0, D1, A0 are as follows.

| D0=U | D1=U | A0=U |

Since the equivalence relations D0=U, D1=U, and A0=U are set for the transfer instruction "mov (10,SP),D1_(12)", data register D1 and stack (10,SP) exhibit an equivalence relation with each other. As a result, the judgment "Yes" is given in step d2 and no generation of equivalence relations is performed, so that the equivalence relations of registers D0, D1, A0 are as follows.

| D0=U | D1=U | A0=U |

Since the equivalence relations D0=U, D1=U, and A0=U are set for the transfer instruction "mov (20, SP), D0_(13)", data register D0 and stack (20,SP) exhibit an equivalence relation with each other. As a result, the judgment "Yes" is given in step c3 and no deletion of equivalence relations is performed. The equivalence relations of registers D0, D1, A0 are as follows.

| D0=U | D1=U | A0=U |

Since the equivalence relations D0=U, D1=U, and A0=U are set for the transfer instruction "mov (20, SP), D0_(13)", data register D0 and stack (20,SP) exhibit an equivalence relation with each other. As a result, the judgment "Yes" is given in step d2, no generation of equivalence relations is performed, and the equivalence relations of registers D0, D1, A0 are as follows.

| D0=U | D1=U | A0=U |

The next instruction is the addition instruction "add D1, D0_(14)", so that only the deletion of equivalence relations is performed. As a result, the eqivalence relations of registers D0, D1, A0 are as follows.

| D0={} | D1=U-{D0} | A0=U -{D0} |

Since the equivalence relations D0{ }, D1=U-{D0}, and A0=U-{D0} are set for the transfer instruction "mov D0, A0_(15)" and both the source code and destination codes are registers, the equivalence relation deletion process is performed according to steps c5 and c6, so that the equivalence relations of registers D0, D1, A0 are set as follows.

| D0={} | D1=U-{D0,A0} | A0={} |

Since both the source code and destination codes for the transfer instruction "mov D0, A0_(15)" are registers, the equivalence relation generation process is performed according to steps d4 and d5, so that the equivalence relations of registers D0, D1, A0 are set as follows.

| D0={A0} | D1=U-{D0,A0} | A0={D0} |

Basic block B4; transfer instruction "mov #100, D1_(16)" transfer instruction "mov (4,SP), D0_(21)"}
Since the equivalence relations D0=U, D1=U, and A0=U are set for the transfer instruction "mov #100, D1_(16)", data register D1 and immediate value #100 exhibit an equivalence relation with each other. As a result, the judgment "Yes" is given in step c3 and no deletion of equivalence relations is performed, so that the equivalence relations of registers D0, D1, A0 are as follows.

| D0=U | D1=U | A0=U |

Since the equivalence relations D0=U, D1=U, and A0=U are set for the transfer instruction "mov #100, D1_(16)", data register D1 and immediate value #100 exhibit an equivalence relation with each other. As a result, the judgment "Yes" is given in step d2 and no generation of equivalence relations is performed, so that the equivalence relations of registers D0, D1, A0 are as follows,

| D0=U | D1=U | A0=U |

Since the equivalence relations D0=U, D1=U, and A0=U are set for the transfer instruction "mov #100, D1_(16)", data register D1 and immediate value #100 exhibit an equivalence relation with each other. As a result, the judgment "Yes" is given in step c3 and no deletion of equivalence relations is performed, so that the equivalence relations of registers D0, D1, A0 are as follows.

| D0=U | D1=U | A0=U |
|------|------|------|

Since the equivalence relations D0=U, D1=U, and A0=U are set for the transfer instruction "mov A0, D0__(17)", data register D0 and address register A0 exhibit an equivalence relation with each other. As a result, the judgment "Yes" is given in step d2 and no deletion of equivalence relations is performed, so that the equivalence relations of registers D0, D1, A0 are as follows.

| D0=U | D1=U | A0=U |
|------|------|------|

Since the equivalence relations D0=U, D1=U, and A0=U are set for the transfer instruction "mov A0, D0__$(_{17})$", data register D0 and address register A0 exhibit an equivalence relation with each other. As a result, the judgment "Yes" is given in step d2 and no generation of equivalence relations is performed, so that the equivalence relations of registers D0, D1, A0 are as follows.

| D0=U | D1=U | A0=U |
|------|------|------|

Since the equivalence relations D0=U, D1=U, and A0=U are set for the transfer instruction "mov D1, (4,SP)__(18)", data register D1 and stack (4,SP) exhibit an equivalence relation with each other. As a result, the judgment "Yes" is given in step c3 and no deletion of equivalence relations is performed, so that the equivalence relations of registers D0, D1, A0 are as follows.

| D0=U | D1=U | A0=U |
|------|------|------|

Since the equivalence relations D0=U, D1=U, and A0=U are set for the transfer instruction "mov D1, (4,SP)__(18)", data register D1 and stack (4,SP) exhibit an equivalence relation with each other. As a result, the judgment "Yes" is given in step d2 and no generation of equivalence relations is performed, so that the equivalence relations of registers D0, D1, A0 are as follows.

| D0=U | D1=U | A0=U |
|------|------|------|

Since the equivalence relations D0=U, D1=U, and A0=U are set for the transfer instruction "mov D1, D0__(19)", data registers D1 and D0 exhibit an equivalence relation with each other. As a result, the judgment "Yes" is given in step c3 and no deletion of equivalence relations is performed, so that the equivalence relations of registers D0, D1, A0 are as follows.

| D0=U | D1=U | A0=U |
|------|------|------|

Since the equivalence relations D0=U, D1=U and A0=U are set for the transfer instruction "mov D1, D0__(19)", data registers D1 and D0 exhibit an equivalence relation with each other. As a result, the judgment "Yes" is given in step d2 and no generation of equivalence relations is performed, so that the equivalence relations of registers D0, D1, A0 are follows.

| D0=U | D1=U | A0=U |
|------|------|------|

Since the next instruction "add D0, A0__(20)" is an addition, only the equivalence relation deletion process is performed. As a result, the equivalence relations of registers D0, D1, A0 are as follows.

| D0=U-{A0} | D1=U-{A0} | A0={} |
|-----------|-----------|-------|

Since the equivalence relations D0=U-{A0}, D1=U-{A0, and A0={ } are set for the transfer instruction "mov (4,SP), D0__(21)", stack (4,SP) and data register D0 exhibit an equivalence relation with each other. As a result, the judgment "Yes" is given in step c3 and no deletion of equivalence relations is performed, so that the equivalence relations of registers D0, D1, A0 are as follows.

| D0=U-{A0} | D1=U-{A0} | A0={} |
|-----------|-----------|-------|

Since the equivalence relations D0=U-{A0}, D1=U-{A0, and A0={ } are set for the transfer instruction "mov (4,SP), D0__(21)", stack (4,SP) and data register D0 exhibit an equivalence relation with each other. As a result, the judgment "Yes" is given in step d2 and no generation of equivalence relations is performed, so that the equivalence relations of registers D0, D1, A0 are as follows.

| D0=U-{A0} | D1=U-{A0} | A0={} |
|-----------|-----------|-------|

By means of the local Out let calculation process in step a3 which is described above, the In set and Out set of each basic block becomes as follows.

```
B1:  In   D0 = {} D1 = {} A0 = {}
     Out  D0 = {#10,{_a)} D1 = {(D1 = {(10,SP)} A10 = {}
B2:  In   D0 = U D1 = U D1 = U A0 = U
     Out  D0 = U - {D1,(2,SP)} D1 = {(2,SP)}
          A0 = U - {D1,(2,SP)}
B3:  In   D0 = U D1 = U A0 = U
     Out  D0 = {A0} D1 = U - {D0,A0} A0 = {D0}
B4:  In   D0 = U D1 = U A0 = U
     Out  D0 = U - {A0} D1 = U - {A0} A0 = {}
```

Global Equivalence Relation Detection Process

The following is an explanation of the transfer to the calculation of equivalence relations between basic blocks using the control flow information, with reference to FIGS. 19 and 20.

In step a5, the global equivalence relations analysis unit 4 sets the Out set change flag at OFF, and the processing advances to loop 2 in step a6. In loop 2, the In set of the present basic block is found as the set product of the Out sets of all of the preceding basic blocks for this basic block. As can be seen in FIG. 15, basic blocks B2 and B3 have only one preceding basic block which is basic block B1. As a result, the In sets of basic blocks B2 and B3 are set as the Out set of basic block B1. Basic block B4, on the other hand, has two preceding basic blocks made up of basic blocks B2 and B3, so that the In set of basic block B4 is the set product of these basic blocks.

As can be seen above, the Out set of basic block B2 is D0=U-{D1, (2,SP)}, D1=(2,SP)}, A0=U-{D1, (2,SF)} and the Out set of basic block B3 is D0={A0}, D1=U-{D0,A0}, A0={D0 }. The set product of these Out sets is D0={A0}, D1={(2,SP)}, A0={D0}, which is set in the In set column of basic block 34. After this processing in step a7, the In sets of each block become as shown below.

| | |
|---|---|
| B1: In | D0={} D1={} A0={} |
| Out | D0={#10,(_a)} D1={(10,SP)} A0={} |
| B2: In | D0={#10,(_a)} D1={(10,SP)} A0={}←In set decided |
| Out | D0=U-{D1,(2,SP)} D1={(2,SP)} A0=U-{D1,(2,SP)} |
| B3: In | D0={#10,(_a)} D1={(10,SP)} A0={}←In set decided |
| Out | D0={A0} D1=U-{D0,A0} A0={D0} |
| B4: In | D0={A0} D1={(2,SP)} A0={D0}←In set decided |
| Out | D0=U-{A0} D1=U-{A0} A0={} |

The In sets decided in step a7 are then used in the Out set calculation process in step a8.

For the transfer instruction "mov (2,SP), D1_(6)", the deletion of equivalence relations is performed for the combination of source code which is a memory resource and the destination code which is a register. As a result, the equivalence relations of registers D0, D1, A0 are as follows.

| D0={#10,(_a)} | D1={} | A0={} |
|---|---|---|

Following this, the generation of equivalence relations is performed for the combination of source code which is a memory resource and the destination code which is a register. As a result, the equivalence relations of registers D0, D1, A0 are as follows.

| D0={#10,(_a)} | D1={(2,SP)} | A0={} |
|---|---|---|

The next instruction, "sub #1, D1_(7)" is a subtraction, so that only the deletion of equivalence relations is performed. As a result, the equivalence relations of registers D0, D1, A0 are as follows.

| D0={#10,(_a)} | D1={} | A0={} |
|---|---|---|

For the transfer instruction "mov D1, (2,SP)_(8)", the deletion of equivalence relations is performed for the combination of source code which is a register and destination code which is a memory resource. As a result, the equivalence relations of registers D0, D1, A0 are as follows.

| D0={#10,(_a)} | D1={} | A0={} |
|---|---|---|

Next, for the transfer instruction "mov D1, (2,SP)_(8)", the generation of equivalence relations is performed for the combination of source code which is a register and destination code which is a memory resource. As a result, the equivalence relations of registers D0, D1, A0 are as follows.

| D0={#10,(_a)} | D1={(2,SP)} | A0={} |
|---|---|---|

In the next instruction "mov (2,SP)D1_(9)", the stack (2,SP) and the data register D1 exhibit an equivalence relation with each other, so that the judgments "Yes" are given in steps c3 and d2 and neither the deletion nor the generation of equivalence relations is performed. As a result, the equivalence relations of registers D0, D1, A0 are as follows

| D0={#10,(_a)} | D1={(2,SP)} | A0={} |
|---|---|---|

For transfer instruction "mov D0,A0_(10)", the equivalence relation deletion process is performed for the combination of a register as source code and a register as destination code. As a result, the equivalence relations of registers D0, D1, A0 are as follows.

| D0={#10,(_a)} | D1={(2,SP)} | A0={} |
|---|---|---|

For transfer instruction "mov D0,A0_(10)", the equivalence relation generation process is performed for the combination of a register as source code and a register as destination code. As a result, the equivalence relations of registers D0, D1, A0 are as follows

| D0={#10,(_a,)A0} | D1={(2,SP)} | A0={#10,(_a),D0} |
|---|---|---|

For transfer instruction "mov (10,SP), D1_(12)", the equivalence relations are established according to the In set of basic block B3, which is to say, D0={#10, (_a), A0}, D1={(10,SP)}, A0={ }, so that neither the equivalence relation deletion process nor the equivalence relation generation process is performed. As a result, the equivalence relations of registers D0, D1, A0 are as follows.

| D0={#10,(_a), A0} | D1={(10,SP)} | A0={} |
|---|---|---|

For transfer instruction "mov (20,SP), D0_(13)", the equivalence relation deletion process is performed for the combination of a memory resource as source code and a register as destination code, As a result, the equivalence relations of registers D0, D1, A0 are as follows.

| D0={} | D1={(10,SP)} | A0={} |
|---|---|---|

For this transfer instruction "mov (20,SP), D0_(13)", the equivalence relation generation process is perfozied for the combination of a memory resource as source code and a register as destination code. As a result, the equivalence relations of registers D0, D1, A0 are as follows.

| D0={(20,SP)} | D1={(10,SP)} | A0={} |
|---|---|---|

The next instruction, "add D1, D0_(14)" is an addition, so that only the equivalence relation deletion process is performed. As a result, the equivalence relations of registers D0, D1, A0 are as follows.

| D0={} | D1={(10,SP)} | A0={} |
|---|---|---|

For transfer instruction "mov D0, A0_(15)", the equivalence relation deletion process and the equivalence relation generation process are performed for the combination of a memory resource as source code and a register as destination code. As a result, the equivalence relations of registers D0, D1, A0 are as follows.

| | | |
|---|---|---|
| D0={A0} | D1={(10,SP)} | A0={D0} |

For the transfer instruction "mov #100, D1_(16)", the equivalence relation deletion process is performed for source code which is an immediate value and the destination code which is a register, As a result, the equivalence relations of registers D0, D1, A0 are as follows.

| | | |
|---|---|---|
| D0={A0} | D1={} | A0={D0} |

For this transfer instruction "mov #100, D1_(16)", the equivalence relation generation process is performed for source code which is an immediate value and the destination code which is a register, As a result, the equivalence relations of registers D0, D1, A0 are as follows.

| | | |
|---|---|---|
| D0={A0} | D1={#100} | A0={D0} |

For the transfer instruction "mov A0,D0_(17)", the equivalence relations of registers D0, D1, and A0 are D0={A0}, D1={#100}, A0={D0}, so that an equivalence relation is established between the registers A0 and D0. As a result, the judgment "Yes" is made in steps c3 and d2 and neither the deletion nor the generation of equivalence relations is performed. As a result, the equivalence relations of registers D0, D1, A0 are as follows.

| | | |
|---|---|---|
| D0={A0} | D1={#100} | A0={D0} |

For the transfer instruction "mov D1, (4,SP)_(18)", the equivalence relation deletion process is performed for the combination of source code which is a register and destination code which is a memory resource, As a result, the equivalence relations of registers D0, D1, A0 are as follows.

| | | |
|---|---|---|
| D0={A0} | D1={#100} | A0={D0} |

For this transfer instruction "mov D1, (4,SP)_(18)", the equivalence relation generation process is performed for the combination of source code which is a register and destination code which is a memory resource. As a result, the equivalence relations of registers D0, D1, A0 are as follows.

| | | |
|---|---|---|
| D0={A0} | D1={#100, (4,SP)} | A0={D0} |

For the transfer instruction "mov D1, D0_(19)", the equivalence relation deletion process is performed for the combination of source code which is a register and destination code which is a register. As a result, the equivalence relations of registers D0, D1, A0 are as follows.

| | | |
|---|---|---|
| D0={} | D1={#100, (4,SP)} | A0={} |

For this transfer instruction "mov D1, D0_(18)", the equivalence relation generation process is performed for the combination of source code which is a register and destination code which is a register. As a result, the equivalence relations of registers D0, D1, A0 are as follows.

| | | |
|---|---|---|
| D0={A0} | D1={(10,SP)} | A0={D0} |

For the transfer instruction "mov #100, D1_(16)", the equivalence relation deletion process is performed for source code which is an immediate value and the destination code which is a register, As a result, the equivalence relations of registers D0, D1, A0 are as follows.

| | | |
|---|---|---|
| D0={D1, #100,(4,SP)} | D1={D0, #100, (4,SP)} | A0={} |

The next instruction, "add D0, A0_(20)" is an addition, so that only the equivalence relation deletion process is performed. As a result, the equivalence relations of registers D0, D1, A0 are as follows.

| | | |
|---|---|---|
| D0={D1, #100,(4,SP)} | D1={D0, #100, (4,SP)} | A0={} |

For the transfer instruction "mov (4,SP),D0_(21)", an equivalence relation is established between the stack (4,SP) and the register D0. As a result, the judgment "Yes" made in steps c3 and d2 and neither the deletion nor the generation of equivalence relations is performed. As a result, the equivalence relations of registers D0, D1, A0 are as follows.

| | | |
|---|---|---|
| D0={D1, #100,(4,SP)} | D1={D0, #100, (4,SP)} | A0={} |

When the Out set before the calculation in step a9 is changed by the calculation, the processing advances to step a10 where the Out set change flag is set at ON and loop 2 is repeated. Once loop 2 has been performed, the equivalence sets are as shown below.

| | |
|---|---|
| B1: In | D0={} D1={} A0={} |
| Out | D0={#10,(_a)} D1={(10,SP)} A0={} |
| B2: In | D0={#10,(_a)} D1={(10,SP)} A0={} |
| Out | D0={#10,(_a), A0} D1={(2,SP)} A0={#10,(_a), A0} |
| B3: In | D0={#10,(_a)} D1={(10,SP)} A0={} |
| Out | D0={A0} D1={(10,SP)} A0={D0} |
| B4: In | D0={A0} D1={(2,SP)} A0={D0} |
| Out | D0=U-{A0} D1=U-{A0} A0={} |

Here, while there will be convergence regardless of the order in which the basic blocks are processed, the number of iterations can be minimized if the processing is performed using an order known as depth priority order.

After the processing in loop 3 has been completed, it is judged in step a12 whether the Out set change flag is ON, in which case the processing returns to step a5, or whether it is OFF, in which case the processing or the global equivalence relations analysis unit 4 is terminated. In the above example, the Out set has changed from the set before calculation, so that the processing in loop 3 is performed once again. However, after this next iteration, there are no changes in the Out sets of any of the basic blocks, so that the processing of the global equivalence relations analyzis unit 4 is terminated.

Optimization of the Code, including the Deletion of Transfer Instructions

When resource referred to by a transfer instruction and the resource defined by the transfer instruction exhibit an equivalence relation with each other, the equivalence resource transfer instruction deletion unit 5 judges that the transfer instruction in question is redundant and, as shown by the white arrow a4 in FIG. 6, deletes the transfer instruction. The following is an explanation of the processing steps of the equivalence resource transfer instruction deletion unit 5, with reference to the flowchart in FIG. 9.

In steps e1, e2, and e9, the equivalence resource transfer instruction deletion unit 5 resets the equivalence set column of each basic block to the In set column of each corresponding basic block, and then performs the loop process in steps e3 to e8. When this processing has been completed for all basic blocks, the equivalence resource transfer instruction deletion unit 5 ends its processing. The following is an explanation of the processing in step e2 with reference to the diagram in FIG. 23 (a). FIG. 23 (a) shows the equivalence sets which were found front the In set shown in FIG. 22 and the detection of transfer instructions of a same content from a branch destination basic block. FIG. 23 (b) shows the equivalence sets which were found from the In set which was shown in FIG. 22 and the deletion of transfer instructions a same content from the branch destination basic block.

In FIG. 23 (a), the In set of basic block 52 which has been circled is shown linked to the entry point of basic block B2, with this circled In set being the In set which was obtained by the processing by the global equivalence relations analysis unit 4. Similarly, the In set of basic block B3 which has been circled in shown linked to the entry point of basic block B3, with this circled In set being the In set which was obtained by the processing by the global equivalence relations analysis unit 4.

The following is an explanation of the flowchart in FIG. 9 which will trace the steps in order of their reference numerals, In this flowchart, the processing between step e3 and step e8 is repeated for each instruction from the start of a basic block to the end.

In step e4, it is judged whether the processed instruction is an equivalence transfer instruction. If so, the processing advances to step e5, or if not, the processing advances to step e7.

In step e5, the equivalence resource transfer instruction deletion unit 5 judges whether the resource referred to by the processed instruction has an equivalence relation with the resource defined by the processed instruction. If so, the processing advances to step e6, or if not, the processing advances to step e7.

In step e6, the equivalence resource transfer instruction deletion unit 5 deletes the processed instruction and the processing advances to step e8.

The processing in step eG will be explained with reference to FIG. 23(b). This figure shows the deletion of the transfer instruction "mov (10,SP),D1__(12)" as a transfer instruction which transfers the same content as the In set of basic block B3. More specifically, the equivalence relation column of basic block B3 shows that the equivalence set of register D1 is {(10,SP)}, so that the transfer instruction "mov (10,SP),D1__(12)" can be seen to be transferring a value from its source code, (10,SP), that is already stored by its destination code, register D1. This means that the transfer instruction "mov (10,SP),D1__(12)" is redundant, so that it is deleted by the equivalence resource transfer instruction deletion unit 5 in step e6.

In the same diagram, it can be seen that the transfer instruction "mov A0, D0__(17)" is deleted as a transfer instruction which transfers a same content as the In set of the basic block B4. More specifically, the equivalence relation D0={A0} is written in the equivalence relation column of the In set of basic block B4. Here, it is clear that an equivalence relation is established between the data register D0 and the address register A0, so that the transfer instruction "mov A0, D0__(17)" can be seen to be transferring a value from its source code, register A0, that is already stored by its destination code, register D0. This means that the transfer instruction "mov A0, D0__(17)" is redundant, so that it is deleted by the equivalence resource transfer instruction deletion unit 5 in step e6.

In step e7, the equivalence relations are updated, in accordance with the changes in the equivalence relations due to the processed instruction when the judgment "No" has been given in step e4 or e5. It should be noted here that this equivalence relation updating process is merely a combination of the equivalence relation deletion process and the equivalence relation generation process described earlier. The steps in this process are described in more detail below using the example of the source program shown in FIG. 2.

First, the basic block division unit 2 divides the course program into basic blocks, with the results of this division being shown in FIG. 18. Next, the control flow analysis unit 3 analyzes the control flow between the basic blocks. The results of this,analysis for the divided blocks in FIG. 18 are shown in FIG. 15.

The global equivalence relations analysis unit 4 then analyzes the global equivalence relations which cross basic blocks. The results of the analysis of the global equivalence relations analysis unit 4 for the source program shown in FIG. 2 are shown in FIG. 22 as the In set and Out set which have been calculated of each basic block. These sets of global equivalence relations are then used by the equivalence resource transfer Instruction deletion unit 5 in its processing.

First, in step e2, the equivalence resource transfer instruction deletion unit 5 resets the equivalence set of each basic block to the In set of the basic block, as shown by the arrow c in FIG. 22 for the basic block B3. Following this, the equivalence resource transfer instruction deletion unit 5 executes the processing in loop 2 which starts from step e3.

In step e4, the equivalence resource transfer instruction deletion unit 5 judges that the transfer instruction "mov (10,SP), D1__(12)" is an equivalence transfer instruction, so that the processing moves to step e5, where the equivalence resource transfer instruction deletion unit 5 judges that the defined resource, register D1, has an equivalence relation with the reference resource, stack (10, SP). As a result, the processing advances to step e6, where the equivalence resource transfer instruction deletion unit 5 deletes the transfer instruction "mov (10,SP) D1__(12)". Following this, the processing advances to step e8, before returning to step e3 for another iteration of loop 2.

The same processing is then performed for the transfer instruction "mov (20,SP), D0__(13)". Since the transfer instruction "mov (20,SP), D0__(13)" is an equivalence transfer instruction whose reference resource, stack (20,SP), does not have an equivalence relation with the defined resource, register D0, equivalence relations are updated in step e7 and loop 2 is repeated.

The equivalence resource transfer instruction deletion unit 5 then processes the addition instruction "add D1, D0__(14)" which is not an equivalence transfer instruction, so that the judgment "No" is given in step e4, the equivalence relations are updated in step e7, and loop 2 is repeated.

Next, the equivalence resource transfer instruction deletion unit 5 determines that the transfer instruction "mov D0, A0__(15)" is an equivalence transfer instruction, but that the reference resource, register D0, of the transfer instruction "mov D0, A0__(15)" does not have an equivalence relation with the defined resource, register A0. As a result, the equivalence relations are updated in step e7. Here, the transfer instruction "mov D0, A0__(15)" is the final instruction in basic block B3, so that the processing in loop 2 is completed, the processing advances to step e9, and a next iteration of loop 1 is indicated.

By performing the same processing for the remaining basic blocks, the transfer instruction "mov (2,SP), D1__(19)" in basic block B2, the transfer instruction "mov A0, D0__(17)" in basic block B4, and the transfer instruction "mov (4,SP), D0__(21)" are detected as transfer instructions between equivalence resources and are deleted.

As described above, the global equivalence relations of the source program in FIG. 2 are detected by the global equivalence relations analysis unit 4 and are used by the equivalence resource transfer instruction deletion unit 5 in the deletion of equivalence resource transfer instructions. As a result, the transfer instruction "mov (2,SP), D1__(9)", the transfer instruction "mov (10,SP), D1__(12)", the transfer instruction "mov A0, D0__(17)", and the transfer instruction "mov (4,SP), D0__(21)" are detected as transfer instructions between equivalence resources and are deleted.

By calculating a set product between basic blocks which have the same branch destination in the present embodiment described above, the equivalence relations between registers, memory, and immediate values can be determined regardless of the execution order of the basic blocks.

Figure 4:
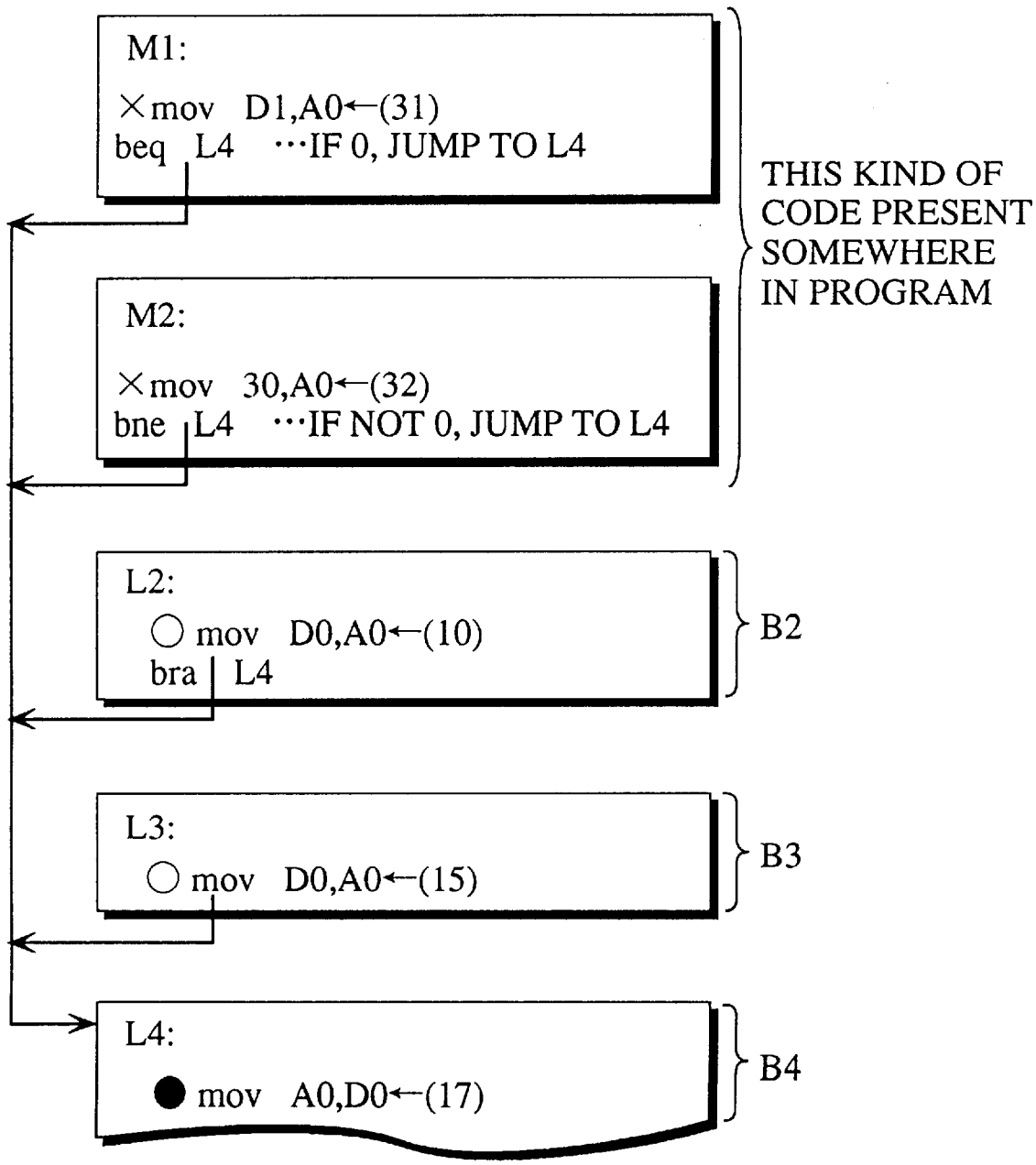
FIG. 4 shows the pattern (deletion prohibited pattern) which prevents the transfer instruction "mov A0, D0__(17)" from being deleted.
Figure 5:
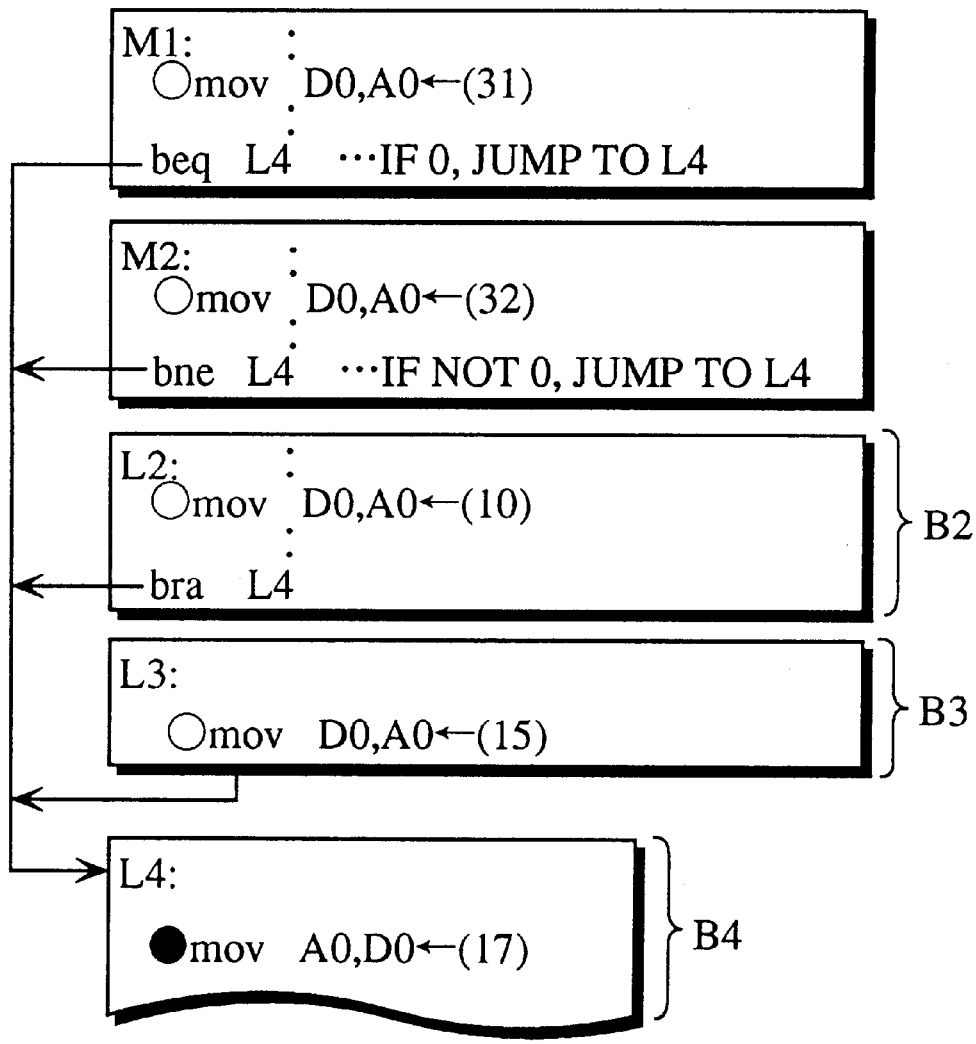
FIG. 5 shows the pattern (deletion possible pattern) which allows the deletion of the transfer instruction "mov A0, D0__(17)"

In the example or the deletion-possible pattern of FIG. 5, the equivalence relation between address register A0 and data register D0 across basic blocks will remain in the reault of the set product of In sets. For deletion impossible pattern of FIG. 4, no equivalence relation between address register A0 and data register D0 remains after the set product has been found. As a result, equivalence relations which are independent of the route of conditional branches can be ascertained. Since transfer instructions are deleted with this degree of certainty, a thorough optimization of a program can be achieved by the present embodiment.

Second Embodiment

Figure 10:
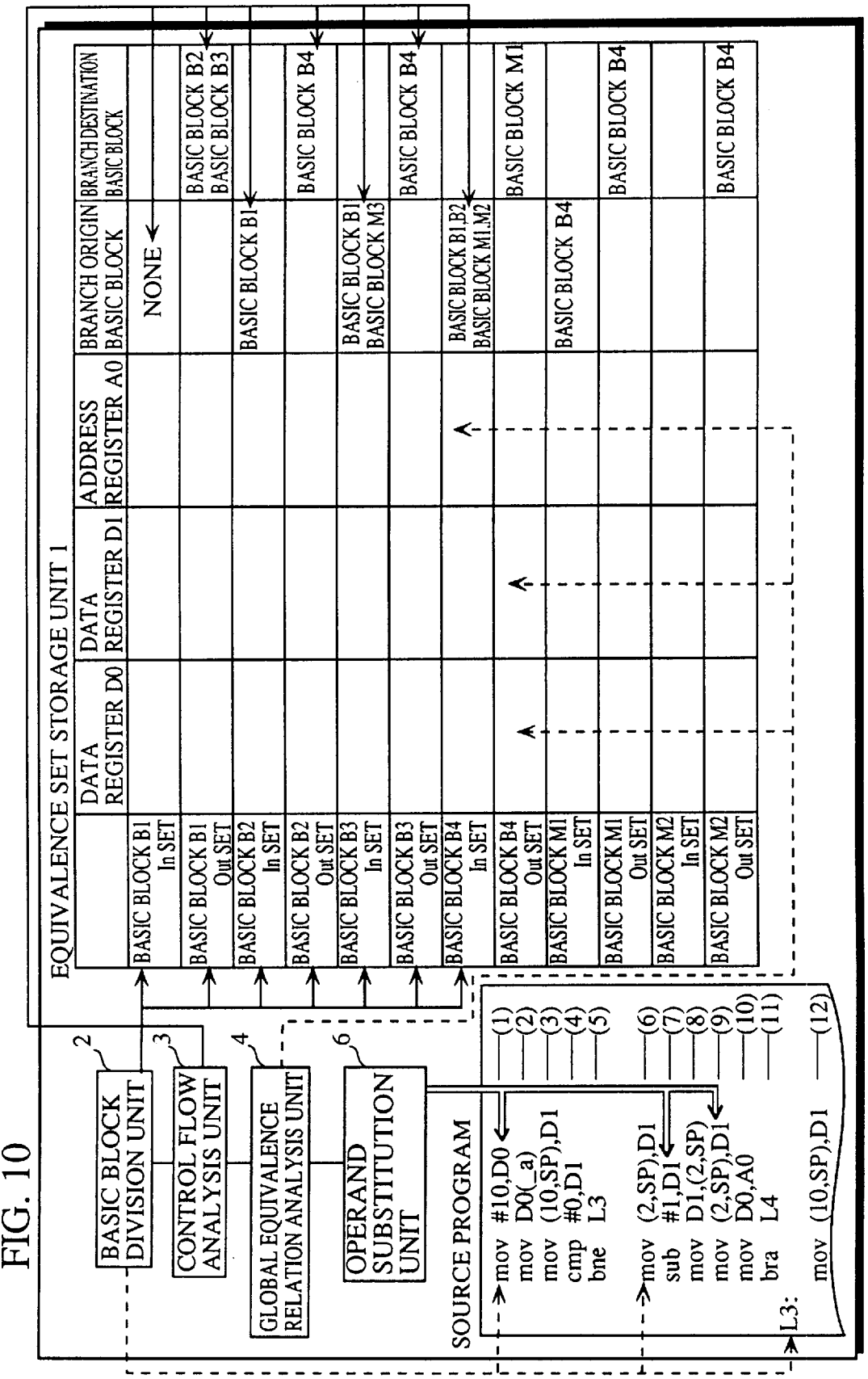
FIG. 10 shows the construction of the optimization apparatus of the second embodiment of the present invention.

This second embodiment aims to improve the cost of the program by replacing operands using equivalence relations among basic blocks. Here, the replacement of an operand refers to the substitution of a lower-cost resource, which is a register or memory resource with an equivalence relation, into the source code or the destination code of an instruction. The construction of the optimization apparatus of the second embodiment is shown in FIG. 10. In this diagram, components which are the same as the optimization apparatus of the first embodiment have been given the same reference numerals and their explanation has been omitted. The following explanation will instead deal with the differences with the first embodiment.

The operand substitution unit 6 stores the instruction costs in table format, an example of which is shown in FIG. 25. This example table shows that when both the source operand and destination operand of a MOV instruction, for example, are registers, the code size is "1" and the execution time is "1".

Figure 11:
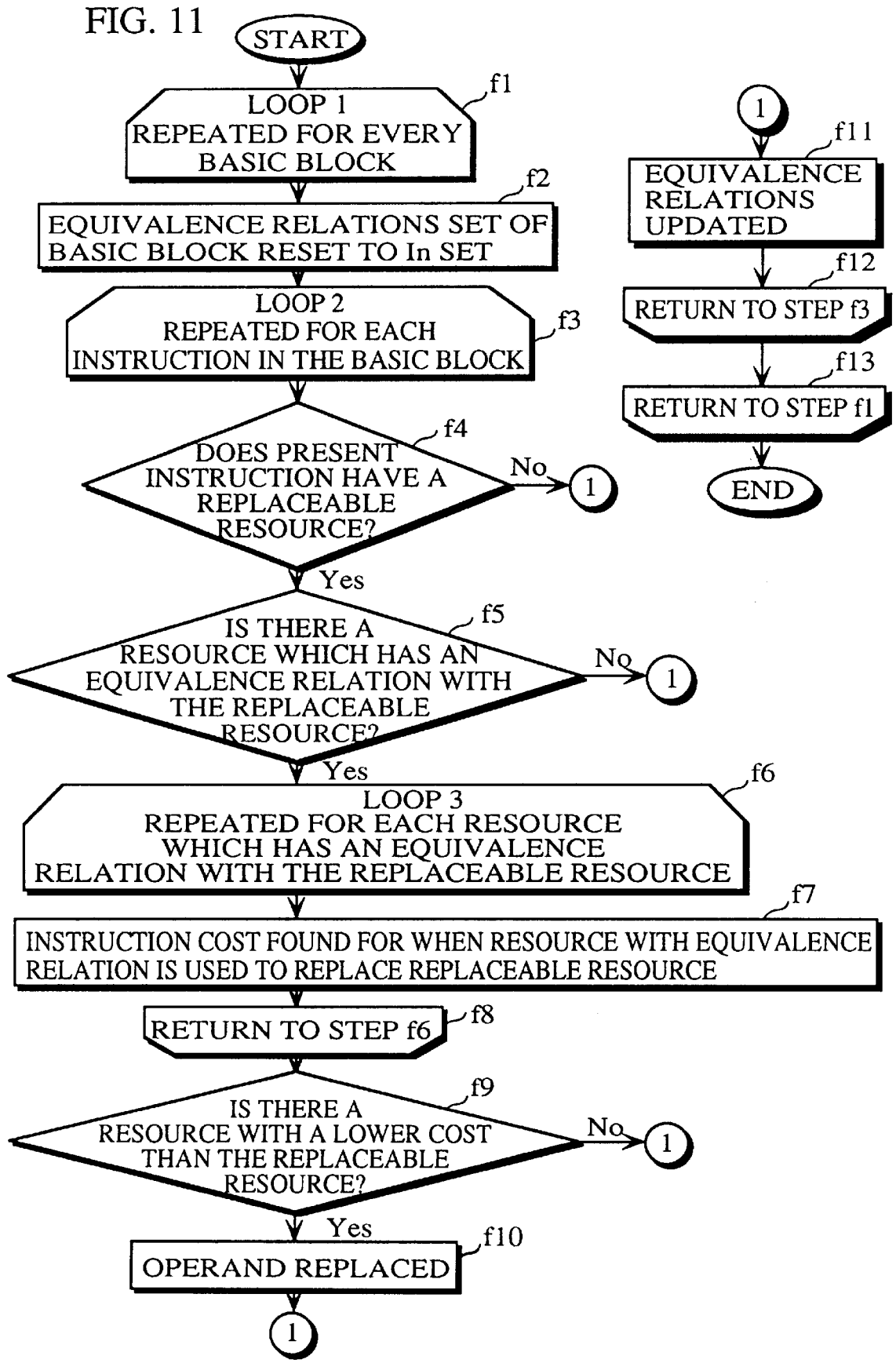
FIG. 11 is a flowchart for the processing of the operand substitution unit 6 shown in FIG. 10.

First, the processing of the operand substitution unit 6 will explained with reference to the flowchart of FIG. 11. Here, FIG. 11 is flowchart which shows the processing of the operand substitution unit 6 shown in FIG. 10. This flowchart is composed of a loop process from step f1 to f13 which is performed for each basic block. Steps f3 to f13 form a further loop inside the loop of steps f1 to f13 which is performed for each instruction in the present basic block. This is to say, the present flowchart is made up of a double loop which repeats the processing in step f4 to step f11 for every instruction in every basic block.

In steps f4 and f5, the suitability of substitution is determined, with instructions for which the judgment "No" is given being excluded from the substitution process.

Instructions which are determined to be suited to substitution in steps f4 and f5 are then subjected to an instruction cost comparison in step f7. This step f7, as part of a loop composed of step f6 to f8, is repeated for all of the resources which exhibit equivalence relations. Following this loop process, it is determined in step f9 whether there is a resource whose use will reduce the instruction cost. The operand substitution in step f10 is then performed or not depending an this determination.

The following is an explanation of the steps in this flowchart in the order of their reference numerals. In step f2, the operand substitution unit 6 sets the equivalence relations in the basic block as the In set calculated by the global equivalence relations analysis unit 4 using the branch origin-branch destination relations, and performs the loop process in steps f3 to f12. When this processing has been performed for all basic blocks, the operand substitution unit 6 terminates its processing.

The loop process in steps f3 to f12 is repeated for every instruction in a basic block in order from start to end.

In step f4, it is determined whether the processed instruction has a reference resource which can be replaced (hereinafter called a "replaceable resource"). If this is the case, the processing advances to step f5, or if not, the processing advances to step f11.

In step f5, it is determined from the In set established in step f2 whether there are any resources with an equivalence relation (called "equivalence relation resources") with the replaceable resource. If so, the processing advances to step f6, or if not, the processing advances to step f11.

In steps f6, f7, and f8, the instruction costs when each of the equivalence relation resources is substituted into the instruction are found using the instruction cost tables In step f9, it is judged whether it is possible to reduce the instruction cost of the processed instruction by substituting one of the equivalence relation resources into the substitution-possible resource. It this is the case, the processing advances to step f10, or if not, the processing advances to step f11.

In step f10, the operand of the processed instruction is replaced with a resource which lowers the instruction cost.

In step f11, the changes in the equivalence relations due to the execution of the processed instruction are recalculated by way of the equivalence relation deletion process and the equivalence relation generation process.

The following is an explanation of the steps in the above process for the example source program which is given in FIG. 24(a). FIG. 24(a) shows the example source program which is used in this second embodiment, while FIG. 24 (b) gives an explanation of the instructions used in the program in FIG. 24(a). FIG. 24(c) shows the program in FIG. 24(a) once it has been divided into basic blocks.

Figure 26:
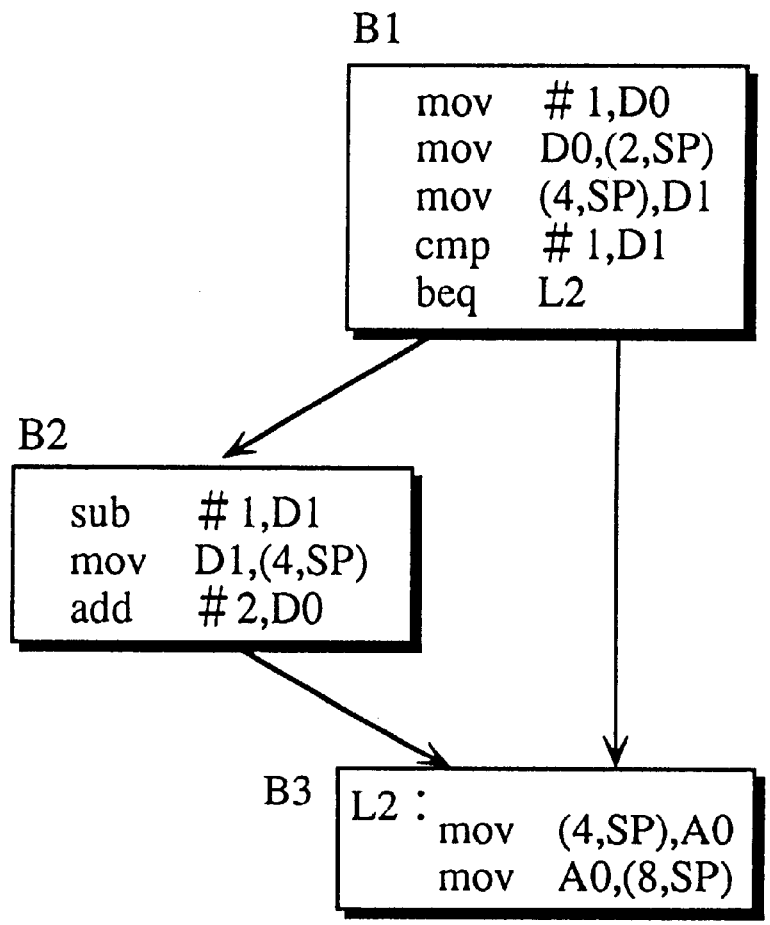
FIGS. 26a and 26b show the control flow information between the basic blocks of the program processed in the second embodiment, and the In sets and Out sets of each basic block.

The present source program is first divided into basic blocks by the basic block division unit 2, with the result being shown in FIG. 24(c). After this, the control flow between these basic blocks is analyzed by the control flow analysis unit 3. The results of this analysis for the present program are shown in FIG. 26(a).

The global equivalence relations between the basic blocks, which result from the division by the basic block division unit 2, are detected by the global equivalence relation analysis unit 4 using the control flow analyzed by the control flow analysis unit 3. The processing of the global equivalence relations analysis unit 4 for the source program shown in FIG. 24(a) calculates the In sets and Out sets for each basic block which are shown in FIG. 26(b). Those sets are then used by the operand substitution unit 6 as the global equivalence relations.

The following is an explanation of the processing of the operand substitution unit 6 for the example of the basic block B2.

First, in step f2, thee equivalence set in the basic block is reset to the In set column of basic block B2, and the processing advances to the process in loop 2 which starts at step f3.

In step f4, it is judged whether the subtraction instruction "sub #1,D1__(66)" has a replaceable operand. Here, the reference resource, immediate value #1, of the instruction "sub 1,D1__(66)" is a replaceable resource, so that the judgment "Yes" is given in step f4 and the processing advances to step f5.

In step f5, it is judged whether there are any resources which have an equivalence relation which the immediate value 1 which is the replaceable resource of the instruction "sub #1,D1__(66)". Since register D0 has an equivalence relation with the immediate value 1, the judgment "Yes" is given in step f5 and the processing moves to step f6.

In steps f6, f7, and f8, the instruction costs of the instruction "sub #1,D1__(66)" when the replaceable resource is replaced by each of resources with a equivalence relation with the immediate value 1 are found from the instruction cost table.

In step f9, it is determined whether there is a resource whose use results in a lower instruction cost than the immediate value 1. The instruction cost of the instruction "sub #1,D1__(66)", which is a subtraction operation with the immediate value 1 as its source operand and register D1 as its destination operand, is expressed as the code size "2" and the execution time "1". On the other hand, when the immediate value 1 is replaced by the register D0, the code size is "1" and the execution time is "1", so that there is a reduction in code size. Accordingly, the judgment "Yes" is given in step f9, and in step f10, the immediate value 1 in the instruction "sub #1,D1__(66)" is replaced with the register D0.

Finally, in step f11, the processing advances to the updating of equivalence relations where the equivalence set of register D1 is set as the empty set as a result of the execution of the instruction "sub #1,d1__(66)". Following this, the processing advances to step f12 and a next iteration of loop 2 is indicated.

The same processing as above is next performed for the transfer instruction "mov D1, (4,SP)__(67)" and the addition instruction "add #2,D0__(68)".

The transfer instruction "mov D1, (4,SP)__(67)" has a replaceable resource, register D1, but since the equivalence relations of this resource were reset as the empty set in the processing of the instruction "sub #1,D1__(66)", there are no resources with an equivalence relation with register D1. As a result, the judgment "No" is given in step f5 and the processing advances to the updating of equivalence relations in step f11, before a next iteration of loop 2 is indicated.

The addition instruction "add #2,D0__(68)" has a replaceable resource, immediate value 2, but there are no resources which have an equivalence relation with this immediate value, so that the judgment "No" is given in step f5, and the processing advances to the updating of equivalence relations in step full. This addition instruction "add #2, D0__(68)" is the final instruction in basic block B2, so that the processing in loop 2 is completed, the processing moves to step f13, and the next iteration of loop 1 is indicated.

When the processing described above is repeated for the remaining basic blocks, the comparison instruction "cmp #1,D1__(64)" in basic block B1 is found to have an instruction cost expressed as the code size "2" and the execution time "1", while the replacement of the immediate value 1 with the register D0 results in a code size of "1" and an execution time of "1", so that the immediate value 1 in the comparison instruction "cmp #1,D1__(64)" is replaced with the register D0. In the same way, the transfer instruction "mov (4,SP), A0__(89)" in basic block B3 has an instruction cost which is expressed as the code size "2" and the execution time "1", while the replacement of the stack (4,SP) with the register D1 results in a code size of "1" and an execution time of "1", so that the stack (4,SP) in the transfer instruction "mov (4,SP), A0__(69)" is replaced with the register D1.

As a result, when the source program shown in FIG. 24(a) has had the equivalence relations between basic blocks analyzed by the global equivalence relations analysis unit 4 and the operand substitution process performed by the operand substitution unit 6, operands are substituted into the comparison instruction "cmp #1,D1__(64)", the subtraction instruction "sub #1,D1__(66)" and the transfer instruction "mov (4,SP),A0__(69)" to reduce the instruction costs of these instructions, thereby achieving a reduction in program size.

Third Embodiment

In this third embodiment, copy propagation is performed using the global equivalence relations between branch origin basic blocks and branch destination basic blocks which are detected by the global equivalence relation analysis unit 4. This copy propagation process is shown in FIG. 27. As shown in FIG. 27, the value of register D1 which is set by the transfer instruction "mov D0, D1__(81)" is not changed before the transfer instruction "mov D1,D2__(82)", so that if register D1 of the transfer instruction "mov D0,D1__(81)" is only used in the transfer instruction "mov D1, D2__(82)", then register D1 in the transfer instruction "mov D1,D2__(82)" can be replaced with the register D0, making the transfer instruction "mov D0,D1__(81)" unnecessary. As a result, the transfer instruction "mov D0, D1__(81)" may be deleted, as shown in FIG. 27(b). This process is called copy propagation.

Figure 12:
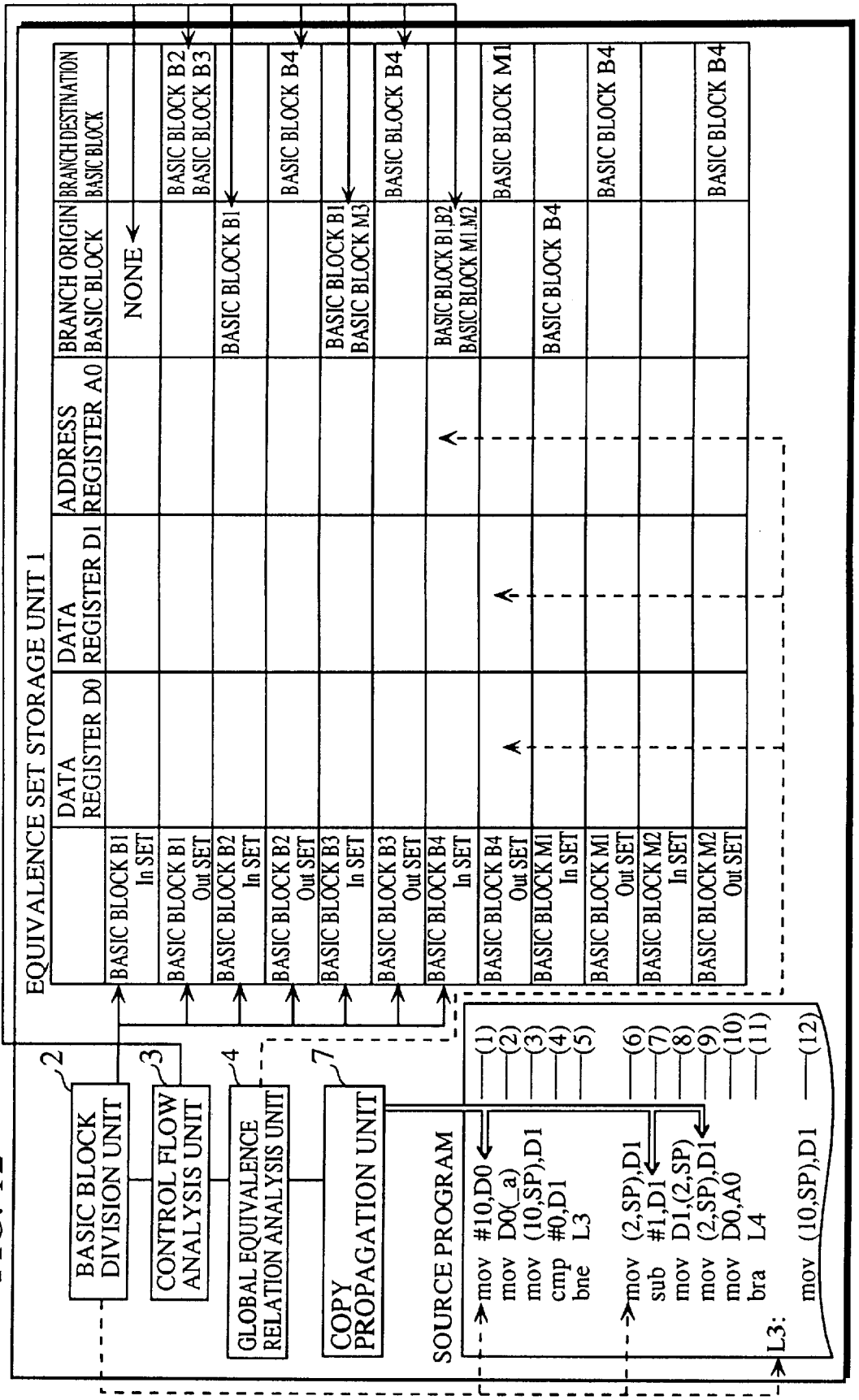
FIG. 12 shows the construction of the optimization apparatus of the third embodiment of the present invention.

The construction of the optimization apparatus of the third embodiment of the present invention is shown in FIG. 12. In this figure, components which are the same as in the first embodiment have been given the same reference numerals and their explanation has been omitted. The following explanation will instead deal only with the differences between the present embodiment and the first embodiment.

Figure 13A:
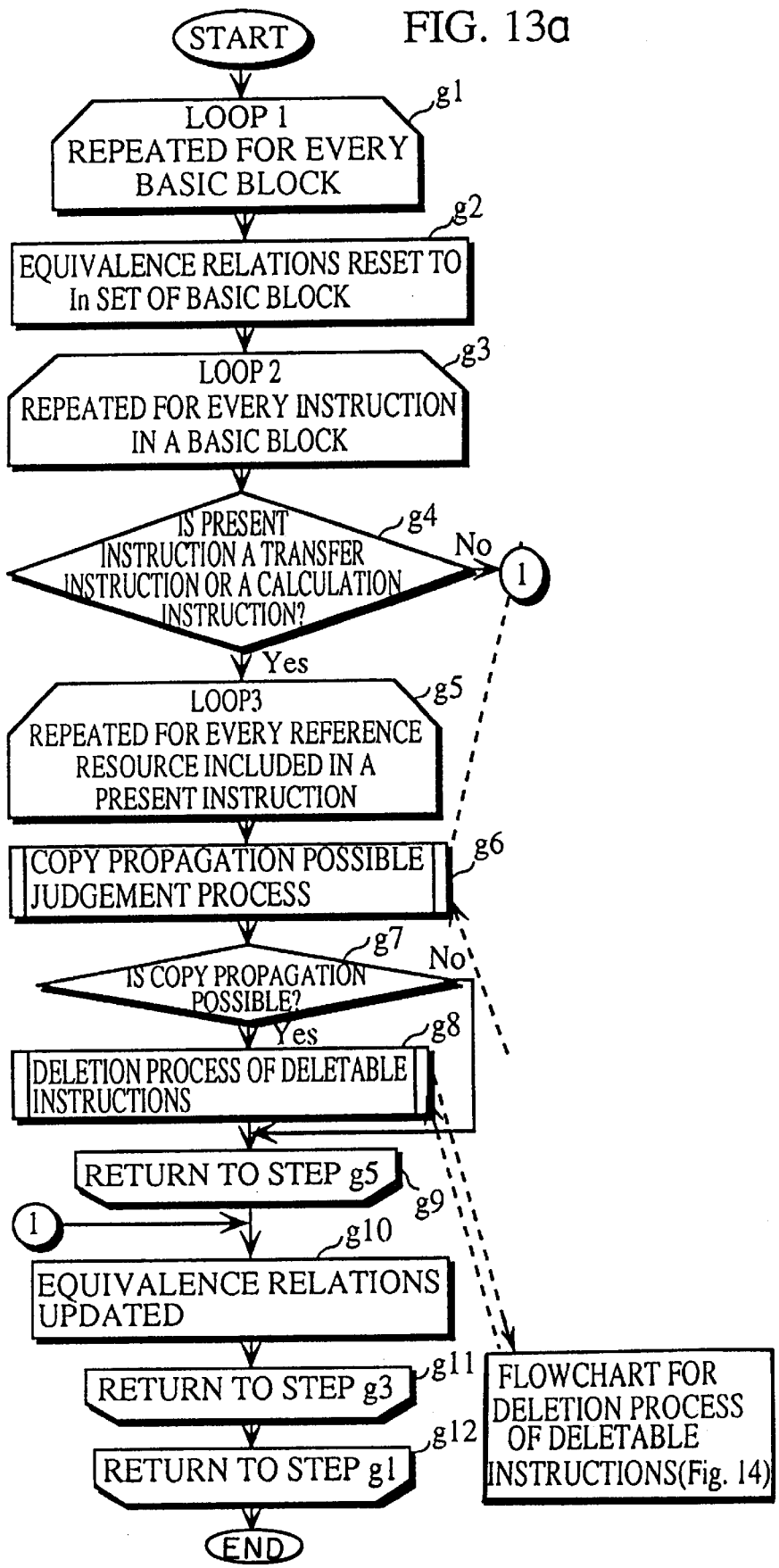
FIG. 13a and 13b show a flowchart for the copy propagation unit 7 shown in FIG. 12.
Figure 13B:
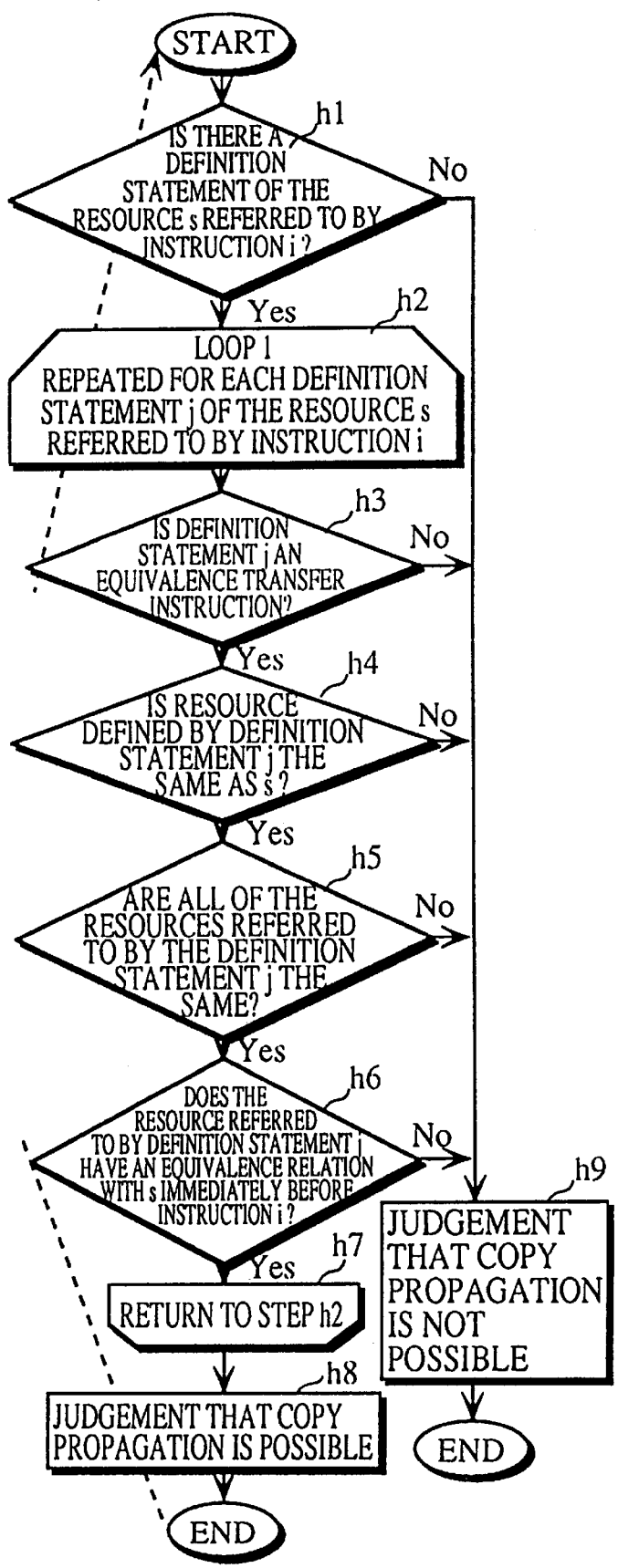

The following is an explanation of the processing of the copy propagation unit 7 with reference to the flowcharts in FIG. 13 and 14. FIGS. 13a and 13b are a flowchart for the copy propagation unit 7 shown in FIG. 12 and FIG. 14 is a flowchart for the deletion process for deletable instructions of step g8 of the flowchart in FIGS. 13a and 13b. In these flowcharts, steps g1 to g12 comprise the main flow, while steps h1 to h9 comprise the copy propagation possibility judgment process. Steps j1 to j13 show the deletion process for deletable instructions. In this way, different letters have been used to distinguish the steps in these different processes.

The processing in steps g1 to g12 form a loop process which is executed for each basic block, with steps g3 to g11 forming a further loop process on the inside of this loop process which is executed for each instruction in a basic block. As a result, the processing in steps g4 to g10 is performed for every instruction in every basic block. Before commencing the inside loop process made up of steps g3 to g11, the In set of each basic block is set in step g2. Whenever an iteration of the loop process in step g5 to g9 is completed, equivalence relations are updated in step g10 which is made up of the equivalence relation deletion process in FIGS. 7a and 7b the equivalence relation updating process in FIGS. 8a, 8b, and 8c.

Step g4 is performed to judge whether substitution is appropriate for an instruction. Instructions which are given the judgment "No" are then excluded front the substitution process.

Instructions which are judged to be suited to substitution in step g4 are then subjected to the copy propagation possibility judgment process in step g6 and g7. In steps g5 and g7, it is judged whether instructions are suited to copy propagation, with step g6 being skipped for instructions judged to be unsuitable ("No" in step g7) and step g6 only being performed for instructions given a "Yes" judgment in step g7.

The following is an explanation all of the steps in the loop process from g1 to g12 in order of their numerals. Once this process has been performed for every basic block, the operation of the copy propagation unit 8 is terminated. In step g2, the equivalence set in the basic block is reset to the In set column written by the global equivalence relation analysis unit 4 using the branch origin-branch destination relations.

In step g3 to step g11, the following processes are performed for each instruction from the start of a basic block to the end.

In step g4, it is judged whether the processed instruction is a transfer instruction or a calculation instruction. If so, the processing advances to step g5, or if not, the processing advances to step g10.

Steps g5 to g9 form a loop process, loop 3, which is performnd for every reference resource included in the present instruction.

In step g6, the processing switches to the copy propagation possibility judgment process which is described below.

In step g7, it is judged whether copy propagation is possible. If so, the processing advances to step g8, or if not, the processing advances to step g9 where the next iteration of loop 3 is indicated.

In step g8, the processing switches to the deletion process for deletable instructions which is described later. After this, the processing advances to step g9 and a next iteration of loop 3 is indicated.

In step g10, the processing switches to the equivalence relation updating process for the processed instruction, since equivalence relations will have changed due to the processed instruction. Following this, the processing returns to step g11 and a next iteration of loop 2 is indicated.

In step h1 or the copy propagation possibility judgment process, it is judged whether copy propagation is possible based on existence of a definition instruction, with steps h2–h8 being selectively executed depending on this possibility. Of these steps, steps h3 to h6 form a loop process which is repeated for each definition statement. For the example shown in FIG. 5, the definition statements of transfer instruction "mov A0,D0_(17)" are the transfer instruction "mov D0,A0_(10)", the transfer instruction "mov D0,A0_(15)" . . . in each of the branch origin basic blocks B2, B3, M1, and M2, so that by repeating the processing in steps h2 to h8 for each of these definition statements, the judgments in steps h3 to h6 of the conditions for copy S propagation can be made for each pair of definition statement and instruction.

The necessary conditions for enabling copy propagation are as given below. The judgments of whether a pair of definition statement and instruction satisfy those conditions are made in steps h3–h6.

(1) All definition statements are equivalence transfer instructions.

(2) Reference resources of all definition statements are equal.

(3) Immediately before the processed instruction, the reference resource of the definition statement and the reference resource of the processed instruction have an equivalence relation.

The following is an explanation of the processing steps in the copy propagation possibility judgment process, with reference to the flowcharts in FIGS. 13a and 13b and 14.

In step h1 of the copy propagation possibility judgment process, it is judged whether there is a definition statement of the reference resource s of the processed instruction i. If so, the processing advances to step h2, or if not, the processing advances to step h9.

In steps h2 to h7, the processing in loop 1 is performed for all of the definition statements j of the reference resource 5 of the processed instruction i.

In step h3, it is judged whether definition statement j is an equivalence transfer instruction. If so, the processing advances to step h4, or if not, the processing advances to step h9.

In step h4, it is judged whether the resource referred to by the definition statement j is equal to the resource referred to by the processed instruction i. If so, the processing advances to step h5, or if not, the processing advances to step h9.

In step h5, it is judged whether the resources referred to by all the definition statements j are equal. If so, the processing advances to step h6, or if not, the processing advances to step h9.

In step h6, it is judged whether the resource referred to by definition statement j has an equivalence relation with the resource s referred to by the instruction i just before the instruction i. If so, the processing advances to step h7 and a next iteration of loop 1 is indicated. If not, the processing advances to step h9, This judgment in step h6 is intended to verify that there is no change in the stored value of the source code, data register D0, between the transfer instruction "mov D0, A0_(15)" and the transfer instruction "mov A0, D0_(17)" or between the transfer instruction "mov D0, A0_(10)" and the transfer instruction "mov A0, D0_(17)". Here, if there is a change in the value of data register D0 between "mov D0, A0_(15)" and the transfer instruction "mov A0, D0_(17)" or between the transfer instruction "mov D0, A0_(10)" and the transfer instruction "mov A0, D0_(17)", rewriting the source code will result in the value of the address register A0 going astray. To prevent such defective rewriting of the program, verification in step h6 is performed based on equivalence relations.

In step h8, copy propagation is judged possible and the processing is terminated.

In step h9, copy propagation is judged not possible and the processing is terminated.

The deletion process for deletable instructions switches the processing to the deletion of the deletable transfer instruction by a copy propagation process. Step g7 determines whether the deletable instruction deletion process shown in FIG. 14 is executed, depending on whether copy propagation has been judged as possible. Here, FIG. 14 is a flowchart for the deletable instruction deletion process of step g8 in FIGS. 13a and 13b.

The first half of the processing in the flowchart of FIG. 14 features a loop process that comprises steps j2 to j5. Step j4 is the process for grouping the deletable definition statements, this grouping being called the deletable definition statement set. Here, the resources which can be members of this set are only the resources which pass the judgment in step j3.

The following it an explanation in order of reference numerals of steps j2 to j5 that compose loop 1 which is performed for every definition statement j of a resource referred to by the processed instruction.

In step j3, it is judged whether for every reference k of the definition statement j, the resource referred to by the reference k has an equivalence relation with the resource referred to by the definition statement j. If so, the processing advances to step j4, or if not, the processing advances to step j5 and a next iteration of loop 1 is indicated.

In step j4, definition statement j is added to the deletable definition statement set.

Following step j5, in step j6 the processing from step j7 onwards is skipped when no deletable definition statement set has been obtained. In steps j8 to j13, copy propagation is performed for the deletable definition statement set obtained in steps j2 to j5.

In step j6, it is judged whether the deletable definition statement net is the empty set. If so, the processing is terminated, or if not, the processing advances to step j7.

In step j7, the combination of instructions, out of the deletable definition statement set, which cause the greatest reduction in instruction cost when deleted are found from the instruction cost table in FIG. 25 and are selected.

Step j8 to j13 form a loop process which is performed for all of the selected members of the deletable definition statement grouping. Here, loop 3 made up of steps j9 to j11 inside loop 2 is a loop process executed for each reference of a deletable instruction,. This is to say, a double loop is formed where the outer loop is performed for all of the selected deletable instructions and the inner loop of step j10 is performed for every reference of a selected deletable instruction. In step j12, the deletable instruction is deleted after the loop process in steps j9 to j11 has been performed for the deletable instruction.

In loop 2, steps j8 and j13 repeat the processing in the loop for the selected deletable instructions.

In steps j9, j10, and j11, the resource referred to by each of the references of the deletable instruction is replaced by the resource referred to by the deletable instruction. After this replacement, the deletable instruction is deleted in step j12. By executing this replacement/deletion process, the duplicated transfer instructions "mov D0,A0_(10)", "moV D0,A0_(15)" . . . in the branch origin basic blocks in the example program of FIG. 5 can be deleted together.

Figure 29:
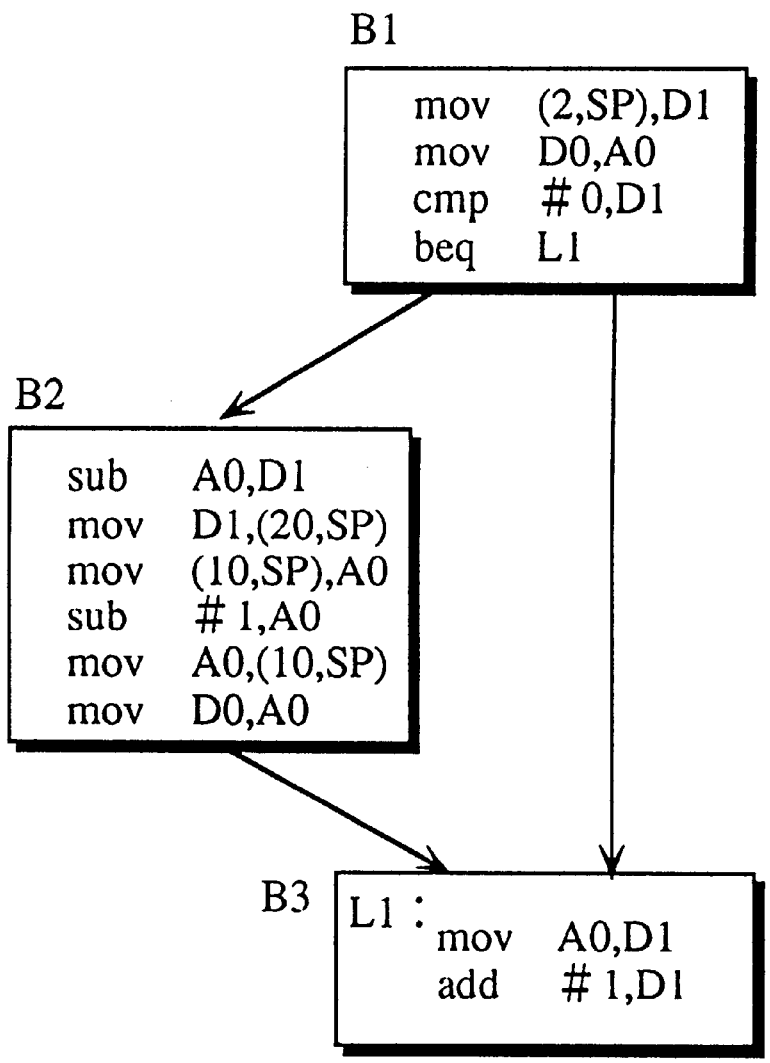
FIGS. 29a and 29b show the control flow information between basic blocks for the example program of FIG. 28(a), as well as the In set and Out set of each basic block.

The following is an explanation of the above processes for the example source program shown in FIG. 28(a). This source program is first divided into basic blocks by the basic block division unit 2. The results of this division are shown in FIG. 28(b). The control flow analysis unit 3 then analyzes the control flow between these basic blocks, with the results for this program being shown in FIG. 29(a). This control flow information between basic blocks is then used by the global equivalence relation analysis unit 4 to analyze the equivalence relations which extend between basic blocks. The In sets and Out sets calculated by the global equivalence relation analysis unit 4 for the source program shown in FIG. 28(a) are shown in FIG. 29(b). These sets are used by the copy propagation unit 7 as global equivalence relations.

The following is an explanation of the processing of the copy propagation unit 7 for the basic block B3 shown in FIG. 29(b).

First, in step g2, the copy propagation unit 7 resets the equivalence set of the basic block to the In set column of basic block B3, and commences the processing in loop 2 from step g3 onwards. In step g4, the transfer instruction "mov A0, D1_(51)" is judged as being one of a transfer instruction or calculation instruction, so that the judgment"Yes" is given in step g4 and the processing advances to step g5.

In step g5, register A0 is found as the only resource which is referred to by the transfer instruction "mov A0, D1_(51)", so that the processing in step g6 onwards in performed for register A0 only.

In step g6, the processing switches to the copy propagation possibility judgment process.

In step h1 of the copy propagation possibility judgment process, the judgment "Yes" is given since a definition statement of the register A0 referred to by the transfer instruction "mov A0,D1_(51)" exists, and the processing advances to step h2.

In step h2, loop 1 is repeated for all of the definition statements of the register A0 which is the reference resource of instruction 51. A definition statement of register A0 is an instruction which sets the value of register A0, so that in the source program of FIG. 28(a), the definition statements of the register A0 are the transfer instruction "mov D0, A0_ (42)" and the transfer instruction "mov D0, A0_(50)".

First, the processing in step h3 is performed for the transfer instruction "mov D0, A0_(42)". Since transfer instruction "mov D0, A0_(42)" is an equivalence transfer instruction, the judgment "Yes" is given in step h3 and the processing advances to step h4.

In step h4, the resource defined by transfer instruction "mov D0, A0_(42)" is the register A0, which is the same as the resource referred to by the transfer instruction "mov A0, D1_(51)", so that the judgment "Yes" is given and the processing advances to step h5.

In step h5, the resource referred to by the transfer instruction "mov D0, A0_(42)" is found to be the same as the resource referred to by the transfer instruction "mov D0, A0_(50)", so that the judgment "Yes" is given and the processing advances to step h6.

In step h6, the resource referred to by the transfer instruction "mov D0, A0_(42),", register D0, is found to have an equivalence relation with the resource, register A0, which is referred to by the transfer instruction "mov A0, D1_(51)" immediately before instruction 51 (shown in FIG. 29(b) by the arrow e), so that the judgment "Yes" is made, step h7 is not performed and a next iteration of loop 1 is indicated.

The processing then advances to the execution of step h3 for the transfer instruction "mov D0, A0_(50)". Here, transfer instruction "mov D0, A0_(50)" is an equivalence transfer instruction, so that the judgment "Yes" is given and the processing advances to step h4.

In step h4, the resource defined by the transfer instruction "mov D0, A0_(50)", register A0, is found to be the same as the resource referred to by the transfer instruction "mov A0, D1_(51)", so that the judgment "Yes" is given and the processing advance;s to step h5.

In step h5, the resource, register D0, referred to by the transfer instruction "mov D0, A0_(50)" is found to be the same as the resource referred to by the transfer instruction "mov D0, A0_(42)", so that the judgment "Yes" is given and the processing advances to step h6.

In step h6, the resource referred to by the transfer instruction "mov D0, A0_(50)", register D0, is found to have an equivalence relation with the resource, register A0, which is referred to by the transfer instruction "mov A0, D1_(51)" immediately before instruction 51 (shown in FIG. 29(b) by the arrow e), so that the judgment "Yes" is made, step h7 is not performed and a next iteration of loop 1 is indicated.

In step h2, the processing in loop 1 has been performed for all of the definition statement, so that the processing advances to step h8 where copy propagation is judged as possible, before the processing in this flowchart is terminated.

Since copy propagation is judged as possible in step h8, the judgment "Yes" is given in step g7 and the processing advances to the deletion of deletable instructions process in step g8.

In step j1 of the deletion of deletable instructions process, the deletable instruction set column is reset to the empty set. In step j2, loop 1, starting at step j3, is performed for all of the references of the resource, register A0, referred Toby the transfer instruction"mov A0, D1__(51)", which is to say, transfer instruction "mov D0, A0__(42)" and transfer instruction "mov D0, A0__(50".

In step j3, all of the references of the transfer instruction "mov D0, A0__(42)", which is to say all instructions which refer to register A0 which is defined by the transfer instruction "mov D0, A0__(42)" are found and it is judged whether the resource referred to in these references has an equivalence relation with the resource referred to by the transfer instruction "mov D0, A0__(42)" In this case, the references of the transfer instruction "mov D0, A0__(42)" are the subtraction instruction "sub A0, D1__(45)" and the transfer instruction "mov A0, D1__(51)". The resource, register D0, referred to by the transfer instruction "mov D0, A0__(42)" can be seen to have an equivalence relation with the resources register A0, which is referred to by the subtraction instruction "sub A0, D1__(45)" (as shown by the arrow d in FIG. 29(b)), and an equivalence relation with the resource, register A0, referred to by the transfer instruction "mov A0, D1__(51)" (shown by the arrow e in FIG. 29(b)), so that the Judgment "Yes" is given in step j3 and the processing advances to step j4.

In step j4, the transfer instruction "mov D0, A0__(42)" is added to the deletable instruction set column, step j5 is not performed, and a next iteration of loop 1 is indicated. Step j3 is next executed for the transfer instruction "mov D0, A0__(50)". In step j3, the transfer instruction "mov A0, D1__(51)" it found to be the only reference of the resource, register A0, defined by the trans for instruction "mov D0, A0__(50)", and, since the reference resource, register A0, of this transfer instruction "mov A0,D1__(51)" has an equivalence relation with the reference resource, register D0, of this transfer instruction "mov D0, A0__(50)" (shown by the arrow e in FIG. 29(b)), the judgment "Yes" is given and the processing advances to step j4.

In step j4, the transfer instruction "mov D0, A0__(50)" is added to the deletable instruction set column, step j5 is not performed, and a next iteration of loop 1 is indicated. However, since loop 1 has been executed for all of the definition statements, the processing instead advances to step j6. In step j6, the transfer instruction "mov D0, A0__(42)" and the transfer instruction "mov D0, A0__(50)" are found to be included in the deletable instruction set column, so that the judgment "No" is given, and the processing advances to step j7.

In step j7, the instruction cost is found to be lowest when both transfer instruction "mor D0, A0__(42)" and transfer instruction "mov D0, A0__(50)" are deleted, as shown in FIG. 30, so both transfer instruction "mov D0, A0__(42)" and transfer instruction "mov D0, A0__(50)" are selected as a combination.

In step j8, the processing in loop 2 is performed for the instructions selected in step j7, which is to say, the transfer instruction "mov D0, A0__(42)" and the transfer instruction "mov D0, A0__(50)". Here, the processing in loop 3 of step j9 is first performed for the transfer instruction "mov D0, A0__(42)".

In steps j9, j10, and j11, the resource, register A0, which is referred to by the subtraction instruction "sub A0, D1__(45)" and the transfer instruction "mov A0, D1__(51)" which comprise all of the reference of the transfer instruction "mov D0, A0__(42)" is replaced with the resource$_1$ register D0, which is referred to by the transfer instruction "mov D0, A0__(42)", and the processing advances to step j12.

In step j12, the transfer instruction "mov D0, A0__(42)" is deleted as a deletable instruction and the processing advances to step j13 where a next iteration of loop 2 is indicated.

The processing in loop 3 of step j9 is then performed for the transfer instruction "mov D0, A0__(50)". In steps 19, 110, and S11, the resource, register A0, referred to by the transfer instruction "mov A0, D0__(51)" which is the only reference of the transfer instruction "mov D0, A0__(50)" is replaced with the resource, register D0, which is the reference resource of the transfer instruction "mov D0, A0__(50)". After this, the processing advances to step j12.

In step j12, the transfer instruction "mov D0, A0__(50)" is deleted as a deletable instruction and the processing advances to step j13 where a next iteration of loop 2 is indicated.

In step j8, loop 2 has been performed for all of the selected deletable instructions, so that the processing in this flowchart is terminated.

After the completion of the deletion process for deletable instructions, the copy propagation unit 7 switches its processing to step g9 where a next iteration of loop 3 is indicated.

In step g5, there are no reference resources of the transfer instruction "mov A0, D1__(51)" aside front register A0, so that loop 3 is skipped by having the processing adyance to step g10. In step g10, the processing switches to the equivalence relation updating process, before the process advances to step g11, indicating a next iteration of loop 2.

The same processing is next performed for the addition instruction "add #1, D1__(52)". since this is an addition instruction, the judgment "Yes" is given in step g4, but since there is no definition statement for the reference resource, the immediate value 1, the judgment "No" is given in step h1, so that copy propagation is deemed not possible in step h9. The addition instruction "add #1, D1__(52)" has no other reference resource, so that in step g10, the processing switches to the equivalence relation updating process. Since addition instruction "add #1, D1__(52)" is the final instruction in basic block B3, loop 2 of the copy propagation unit 7 is completed and a next iteration of loop 1 is indicated.

The above processing is repeated for all of the remaining basic blocks aside from basic block B3, but none of these other basic blocks contains an instruction for which copy propagation is possible, so that in the final version of the source program of FIG. 20(a), the operands of instructions 45 and 51 are replaced and the transfer instructions "mov D0, AD (42)" and "mov D0, A0__(50)" are deleted by the processing of the global equivalence relation analysis unit 4 and the copy propagation unit 7. As a result, the program becomes as shown in FIG. 31 with a reduced code size.

By performing copy propagation using the equivalence relations between branch origin and branch destination basic blocks as described above in the present embodiment, the transfer instructions "mov D0, A0__(10)" and "mov D0, A0__(15)" in the branch origin basic blocks in the source program shown in FIG. 5 can be deleted together, so that a greater reduction in transfer instruction than in the first embodiment can be achieved.

The present embodiment has been described with reference to the above embodiments, although it should be understood several modifications to these are possible. Three examples of such are listed below as (a) to (c).

(a) In the present embodiment, equivalence transfer instructions were described as being "mov" instructions where the code size is equal, although, instructions which clear register values to zero may also be used by regarding such instructions as a transfer instructions which transfer the value 0 into the register.

sub D0, D0 (subtraction instruction of D0 from D0)

and #0, D0 (logical AND instruction of register D0 and immediate value 0)

xor D0, D0 (logical EXOR instruction of register D0 and register D0)

clr D0 (clear instruction for register D0)

(b) In the second embodiment, the optimization by the operation substitution unit 6 was described using an example where the operands of each instruction are composed of only one resource, although when the operands are composed of a plurality of replaceable resources, such as in an indirect reference, optimization may be performed by operand substitution of (D1, A0), (D0, A0), or the like.

(c) In the first to third embodiments, when the definition side of a processed instruction is an indirect reference which uses an address register, such as "mov 10, (disp,A0)" or "mov 10, (a1)", the judgment "No" wil be given in step c4 in the flowchart of FIGS. 7a and 7b, before the judgment "No" is made in step c7. If the judgment "No" is given in step c7, in step c9 all of the memory resources will be deleted from the equivalence relation sets of all of the registers. This deletion of all memory resources is due to the possibility of an indirect reference instruction accessing a position in the stack memory space or in external memory space, with it no being possible to detect which from the operands of the indirect reference. If a state where there is no interference between the external memory space and the stack memory space can be maintained, it will be no longer necessary to delete all memory addresses in step c9, with a partial deletion of memory addresses being sufficient.

This is to say, if an indirect reference only represents external memory, there will be no definition of the stack memory space by such indirect reference. As a result, only members which are external memory addresses need to be deleted from the equivalence relation sets, so that the members which relate to the stack memory may be left as they are.

On the other hand, if an indirect reference only represents stack memory, there will be no definition of the external memory space by such indirect reference. As a result, only meters which are stack memory addresses need to be deleted front the equivalence relation sets, so that the members which relate to the external memory may be left as they are.

Here, the interpretation or whether an indirect reference is an instruction which defines the stack memory space or an instruction which defines the external memory space is made by referring to the equivalence relation sets for the address registers, out of the equivalence relation sets generated for all registers, and investigating whether these address registers have an equivalence relation with the labels in the program or with the stack pointer.

Address register A0=_Label 1

Address register A1=SP

Address register A2=_Label 2

By analyzing these equivalence relations, when, for example, the processed instruction is the indirect reference "mov 5, (10,A0)", the present optimization apparatus can know that in the present instruction "(10, A0)" refers to address which is "_Label 1+10". Since this "_Label 1" is an address in the external memory space, the present optimization apparatus can know that the indirect reference "mov 5 (10,A0)" is a definition of the external memory space. As a result, all code with addresses in the external memory space are deleted from the equivalence relation sets of each register and the address codes in the stack memory can be maintained.

When the processed instruction is the indirect reference "mov 3, (10,A1)",the present optimization apparatus can know that in the present .instruction "(10,A1)" refers to an address which is "SP+1". From this, the present optimization apparatus can know that the Indirect reference "mov 3 (1,A1)" is a definition of the stack memory space. As a result, all code with addresses in the stack memory space are deleted from the equivalence relation sets of each register and the address codes in the external memory can be maintained.

In this way, the deletion of memory addresses can be distinguished into the stack memory space and the external memory space, which allows a greater amount of information to be maintained in the equivalence relation sets.

The above explanation has been made with reference to the examination of equivalence sets of address registers, although the amount of information in the equivalence sets can be similarly increased by examining the equivalence relations between register indirect references of general registers.

Although the present invention has been fully described by way of examples with reference to accompanying drawings, it is to be noted that various changes and modifications will be apparent to those skilled in the art. Therefore, unless such changes and modifications depart from the scope of the present invention, they should be construed as being included therein.

What is claimed is:

1. An optimization apparatus which, for a program in which instructions are executed in a plurality of different execution orders due to conditional branches, analyzes hardware resources whose stored values are equal in every execution order and which deletes transfer instructions according to the analysis result, said optimization apparatus comprising:

execution order information generation means for generating execution order information which includes branch origin-branch destination relations between a plurality of basic blocks, wherein a basic block is a small program unit which is divided from the program based on branch instructions and branch destination labels;

post-execution state analysis means for analyzing which hardware resources are storing a same value in a state (hereinafter called the "post-execution state") after each instruction in a branch origin destination block has been executed by a processor, and for generating a post-execution equivalence set, made up of names of resources which store a same value in the post-execution state, for each branch origin basic block;

pre-execution state analysis means for selecting common elements of the post-execution equivalence sets of all branch origin basic blocks which have a common branch destination basic block and for generating a pre-execution equivalence set for said common branch destination basic block, made up of names of resource which store a same value in a state (hereinafter called the "pre-execution state") when a first instruction in said branch destination basic block is about to be executed;

block internal analysis means for analyzing, on receiving a pre-execution equivalence set of a basic block destination basic block, changes to composite elements of the equivalence group at every point after execution of an instruction included in said branch destination basic block, and for calculating an equivalence set after an execution of each instruction as a result of analysis of each instruction;

resource name judgment means for judging, after receiving an equivalence set after execution of an instruction, whether a next instruction located immediately after said instruction indicates resource names as a transfer origin and a transfer destination which are included in said equivalence set; and transfer instruction deletion means for deleting the following instruction when the resource name judgment means judges that the resource names indicated by the following instruction as the transfer origin and the transfer destination are resource names which are included in the equivalence set.

2. The optimization apparatus of claim 1, wherein the pre-execution state analysis means includes:

detection means for detecting a plurality of basic blocks which have a same basic block as a branch destination; and set product calculation means for calculating elements in a pre-execution equivalence set of the branch destination basic block by finding a set product of the post-execution equivalence sets generated by the post-execution state analysis means of the basic blocks detected by the detection means.

3. The optimization apparatus of claim 2, further including:

state table storage means for storing a correspondence table, which has a plurality of resource names as index items and an entry cell corresponding to each index item, for each basic block; and initialization means for detecting all codes showing a transfer origin resource (hereinafter called source code ) and all codes showing a transfer destination resource (hereinafter called destination code ) from the entire program, and for initializing entry cells by writing all the detected codes into an entry cell of each branch destination basic block in the correspondence tables, wherein the post-execution state analysis means includes:

first extraction means for extracting, once the detected codes have been written by the initialization means, one instruction at a time from a present basic block in order from a start of the basic block to an end;

instruction identifying means for identifying the extracted instruction;

first deletion means for deleting, when the extracted instruction has been identified as one of a transfer instruction and a calculation instruction, all of the codes written into an entry cell of the state table storage means which has a resource name of a destination code of the extracted instruction as an index item;

operand identifying means for identifying, when the extracted instruction has been identified as a transfer instruction and deletion has been performed by the first deletion means, resource names which are a source code and a destination code of said transfer instruction;

first writing means for writing the resource name identified as the destination code into a cell which has the resource name identified as the source code as an index item and for writing the resource name identified as the source code into a cell which has the resource name identified as the destination code as an index item;

indicating means for indicating a next extraction of an instruction to the first extracting means when writing by the first writing means has been performed; and setting means for setting, after a final instruction has been extracted due to repetition of the indicating by the indicating means, a stored content of state table storage means as the post-execution equivalence set of the present basic block.

4. The optimization apparatus of claim 3, wherein the pre-execution state analysis means includes establishing means for establishing a post-execution equivalence set in an entry cell corresponding to a branch destination basic block in a correspondence table stored by the state table storage means, wherein the optimization apparatus further comprises:

reserve storage means for storing, once the establishing means has established the post-execution equivalence set, a copy of the post-execution equivalence set obtained from the state table storage means as a reserve;

first activating means for reactivating the post-execution state analysis means after the post-execution equivalence set has been established in an entry cell by the establishing means;

collating means for collating a new equivalence set achieved in the state table storage means due to a reactivation of the post-execution state analysis means with the reserve stored in the reserve storage means, and for judging whether there has been any change to the reserve; and second reactivation means for reactivating the post-execution state analysis means and the set product calculation means when the collating means judges that there is a change in a number of codes in the new equivalence set, and wherein when the collating means judges that there is no change in a number of codes, the block internal analysis means sets a result of a most recent set product calculation as a pre-execution equivalence relation set before commencing analysis of equivalence relations for each instruction.

5. The optimization apparatus of claim 4, wherein the post-execution state analysis means further includes:

second writing means for expressing, in the state table storage means, register names and memory addresses which have a same stored value due to a transfer instruction identified by the instruction identifying means, by copying, when the operand identifying means identifies a register name as the source code and a register name as the destination code, all codes written into a entry cell which has the register name of the source code as an index item into an entry cell which has the register name of the destination code as an index item, and copying all codes written in an entry cell which has the register name of the destination code as an index item into an entry cell which has the register name of the source code as an index item.

6. The optimization apparatus of claim 5, wherein the first writing means includes a first writing unit for writing, when a combination of a register name and a memory address is identified by the operand identifying mean, the memory address into an entry cell in the state table storage means which has the register name as an index item, and wherein the second writing means further includes a second writing unit for expressing, in the state table storage means, memory addresses which have a same stared value due to a transfer instruction identified by the instruction identifying means, by determining register names which are written in an entry cell which has the register names identified by the operand identifying means as an index item and by writing the identified memory address into entry cells which have any of the determined register names as an index item.

7. The optimization apparatus of claim 6, wherein the second writing means further includes:

a first entry cell-register name detection unit for detecting, when a combination of a register name and a memory address is identified by the operand identifying means, a register name which is an index item or any cell into which the identified memory address has already bean written; and a third writing unit for expressing, in the state table storage means, register names and memory addresses which have a same stored value due to a transfer instruction identified by the instruction identifying means, by copying all codes written in an entry cell which has the register name detected by the first entry cell-register name detection unit into an entry cell which has the identified register name as an index item, by writing a register name detected by the first entry cell-register name detection unit into an entry cell which has the register name identified by the operand identifying means as an index item, and by writing a register name identified by the operand identifying means into an entry cell which has any of the register names detected by the first entry call-register name detection unit as an index item.

8. The optimization apparatus of claim 7, wherein the first writing means further includes a fourth writing unit for writing, when a combination of a register name and an irradiate value is identified by the operand identifying means, an immediate value code into an entry cell with the register name as an index item.

9. The optimization apparatus of claim 8, wherein the second writing means includes:

a second entry cell-register name detection unit for detecting, when a combination of a register name and an immediate value is identified by the operand identifying means, a register name which is an index item of any cell into which an immediate value code corresponding to the identified immediate value has already been written; and a fifth writing unit for copying all codes written in an entry cell which has a register name detected by the second entry cell-register name detection unit into an entry cell which has the register name identified by the operand identifying means as an index item, for writing a register name detected by the secondentrycell-registername detection unit into an entry cell which has the register name identified by the operand identifying means as an index item, and by writing a register name identified by the operand identifying means into an entry cell which has any of the register names detected by the second entry cell-register name detection unit as an index item.

10. The optimization apparatus of claim 9, wherein the second writing means further includes:

a third entry cell-register name detection unit for detecting, when a combination of a memory address and an immediate value is identified by the operand identifying means, a register name which is an index item of a cell into which one of an immediate value code corresponding to the identified immediate value and the memory address has already been written; and a sixth writing unit for writing the identified immediate value code and the identified memory address into an entry cell which has any register name detected by the third entry cell-register name detection unit as an index item.

11. The optimization apparatus of claim 10, wherein the second writing means includes:

a fourth entry cell-register name detection unit for detecting, when a combination of a first memory address and a second memory address is identified by the operand identifying means, a register name which is an index item of a cell into which one of the first memory address and the second memory address has already been written; and a seventh writing unit for writing the first memory address and the second memory address into an entry cell which has any register name detected by the third entry cell-registor name detection unit as an index item.

12. The optimization apparatus of claim 5, wherein the post-execution state analysis means further includes:

second deletion means for deleting, when the destination code of a transfer instruction is identified by the operand identifying means as a register name, all codes which have been written into an entry cell which has the identified register name as an index item; and third deletion means for deleting, when the destination code of a transfer instruction is identified by the operand identifying means as a register name, all instances of the identified register name from codes written into entry cells of the state table storage means which have a register name which is not the identified register name as an index item, wherein the first and second writing means perform writing after deletion has been performed by the second and third deletion means.

13. The optimtzation apparatus of claim 12, wherein the post-execution state analysis means further includes:

fourth deletion means for deleting, when the destination code of a transfer instruction is identified by the operand identifying means as a memory address, all instances of the identified memory address from codes written into entry cells of the state table storage means which have a register name as an index item, wherein the first and second writing means perform writing after deletion has been performed by the fourth deletion means.

14. The optimization apparatus of claim 13, wherein the post-execution state analysis means further includes:

memory space judging means for judging, when the destination code of a transfer instruction is identified by the operand identifying means as a code for an indirect reference using a predetermined register, whether a transfer destination of the transfer instruction is a stack memory space or an external memory space by analyzing a stored value of the predetermined register;

fifth deletion means for deleting codes written in the state table storage means which are related to the stack memory space, when the memory space judging means judges that the transfer destination is the stack memory space; and sixth deletion means for deleting codes written in the state table storage means which are related to the external memory space, when the memory space judging means judges that the transfer destination is the external memory space.

15. The optimization apparatus of claim 14,
wherein the state table of the state table storage means includes the register names of the predetermined registers as index items and has entry cells corresponding to said index items,
wherein the first writing means writes, when a resource name in the instruction extracted by the first extraction means is identified as a predetermined register by the operand identifying means, the source code of the extracted instruction into an entry cell which has the register name of the identified predetermined register as an index item,
and wherein the memory space judging means judges whether the transfer destination of a transfer instruction is the stack memory space or the external memory space by referring to codes written in an entry cell with the register name of the identified predetermined register as an index item.

16. The optimization apparatus of claim 12,
wherein any of the registers is a broken register whose stored value is not saved and restored at a beginning and end of a subroutine call instruction,
wherein when the instruction extracted by the first extraction means is a subroutine call instruction, the second deletion means deletes all codes written in entry cells which correspond to a register name of the broken register,
and wherein the third deletion means deletes from the stored content of the state table storage means, all incidences of a register name of the broken register from all codes written in entry cells which have a register name of a register aside from the broken register as an index item.

17. An optimization apparatus which, for a program in which instructions are executed in a plurality of different execution orders due to conditional branches, analyzes hardware resources whose stored values are equal in every execution order and which deletes transfer instructions according to the analysis result, said optimization apparatus comprising:
  execution order information generation means for generating execution order information which includes branch origin-branch destination relations between a plurality of basic blocks, wherein a basic block is a small program unit which is divided from the program based on branch instructions and branch destination labels;
  post-execution state analysis means for analyzing which hardware resources are storing a same value in a state (hereinafter called the "post-execution state") after each instruction in a branch origin destination block has been executed by a processor, and for generating a post-execution equivalence set, made up of names of resources which store a same value in the post-execution state, for each branch origin basic block;
  pre-execution state analysis means for selecting common elements of the post-execution equivalence sets of all branch origin basic blocks which have a common branch destination basic block and for generating a pre-execution equivalence set for said common branch destination basic block, made up of names of resources which store a same value in a state (hereinafter called the "pre-execution state") when a first instruction in said branch destination basic block is about to be executed;
  block internal analysis means for analyzing, on receiving a pro-execution equivalence set of a basic block destination basic block, changes to composite elements of the equivalence group at every point after execution of an instruction included in said branch destination basic block, and for calculating an equivalence set after an execution of each instruction as a result of analysis of each instruction;
  resource name judgment means for judging, after receiving an equivalence set after execution of an instruction, whether a next instruction located immediately after said instruction indicates resource names as a transfer origin and a transfer destination which are included in said equivalence set;
  predicting means for predicting, when the resource name judging means judges that an instruction located immediately after any of said instructions indicates resource names which are given in an equivalence set as one of a source code and a destination code, an instruction cost, shown by at least one of an execution time and a memory size, of a following instruction that is one of a calculation instruction and a transfer instruction when a resource name is replaced with each resource name in an equivalence relation set at the execution point of said following instruction; and
  replacing means for replacing, when the predicted instruction cost is reduced by a substitution of a resource name, one of a transfer origin and a transfer destination in said following instruction by said resource name.

18. The optimization apparatus of claim 17, wherein the pre-execution state analysis means includes:
  detection means for detecting a plurality of basic blocks which have a same basic block as a branch destination; and
  set product calculation means for calculating elements in a pre-execution equivalence set or the branch destination basic block by finding a set product of the post-execution equivalence sets generated by the post-execution state analysis means of the basic blocks detected by the detection means.

19. The optimization apparatus of claim 18, further including:
  state table storage means for storing a correspondence table, which has a plurality of resource names as index items and an entry call corresponding to each index item, for each basic block; and
  initialization means for detecting all codes showing a transfer origin resource (hereinafter called source code ) and all codes showing a transfer destination resource (hereinafter called destination code) from the entire program, and for initializing entry cells by writing all the detected codes into an entry cell of each branch destination basic block in the correspondence tables,
  wherein the post-execution state analysis means includes:
    first extraction means for extracting, once the detected codes have been written by the initialization means, one instruction at a time from a present basic block in order from a start of the basic block to an end;
    instruction identifying means for identifying the extracted instruction;
    first deletion means for deleting, when the extracted instruction has been identified as one of a transfer instruction and a calculation instruction, all of the codes written into an entry cell of the state table storage means which has a resource name of a destination code of the extracted instruction as an index item;

operand identifying means for identifying, when the extracted instruction has been identified as a transfer instruction and deletion has been performed by the first deletion means, resource names which are a source code and a destination code of said transfer instruction;

first writing means for writing the resource name identified as the destination code into a cell which has the resource name identified as the source code as an index item and for writing the resource name identified as the source code into a cell which has the resource name identified as the destination code as an index item;

indicating means for indicating a next extraction of an instruction to the first extracting means when writing by the first writing means has been performed; and setting means for setting, after a final instruction has been extracted due to repetition of the indicating by the indicating means, a stored content of state table storage means as the post-execution equivalence set of the present basic block.

20. The optimization apparatus of claim 19, wherein the pre-execution state analysis means includes establishing means for establishing a post-execution equivalence set in an entry cell corresponding to a branch destination basic block in a correspondence table stored by the state table storage means, wherein the optimization apparatus further comprises:

reserve storage moans for storing, once the establishing means has established the post-execution equivalence set, a copy of the poet-execution equivalence set obtained from the state table storage means as a reserve;

first activating means for reactivating the post-execution state analysis means after the post-execution equivalence set has been established in an entry cell by the establishing means;

collating means for collating a new equivalence set achieved in the state table storage means due to a reactivation of the post-execution state analysis means with the reserve stored in the reserve storage means, and for judging whether there has been any change to the reserve; and second reactivation means for reactivating the post-execution state analysis means and the set product calculation means when the collating means judges that there is a change in a number of codes in the new equivalence set, and wherein when the collating means judges that there is no change in a number of codes, the block internal analysis means sets a result of a most recent set product calculation as a pro-execution equivalence relation set before commencing analysis of equivalence relations for each instruction.

21. The optimization apparatus of claim 20, wherein the post-execution state analysis means further includes:

second writing means for expressing, in the state table storage means, register names and memory addresses which have a same stored value due to a transfer instruction identified by the instruction identifying means, by copying, when the operand identifying means identifies a register name as the source code and a register name as the destination code, all codes written into a entry cell which has the register name of the source code as an index item into an entry cell which has the register name of the destination code as an index item, and copying all codes written in an entry cell which has the register name of the destination code as an index item into an entry cell which has the register name of the source code as an index item.

22. An optimization apparatus which, for a program in which instructions are executed in a plurality of different execution orders due to conditional branches, analyzes hardware resources whose stored values are equal in every execution order and which deletes transfer instructions according to the analysis result, said optimization apparatus comprising:

execution order information generation means for generating execution order information which includes branch origin-branch destination relations between a plurality of basic blocks, wherein a basic block is a small program unit which is divided from the program based on branch instructions and branch destination labels;

post-execution state analysis means for analyzing which hardware resources are storing a same value in a state (hereinafter called the "post-execution state") after each instruction in a branch origin destination block has been executed by a processor, and for generating a post-execution equivalence set, made up of names of resources which store a same value in the post-execution state, for each branch origin basic block;

pre-execution state analysis means for selecting common elements of the post-execution equivalence sets of all branch origin basic blocks which have a common branch destination basic block and for generating a pre-execution equivalence set for said common branch destination basic block, made up of names of resources which store a same value in a state (hereinafter called the "pre-execution state") when a first instruction in said branch destination basic block is about to be executed;

block internal analysis means for analyzing, on receiving a pre-execution equivalence set of a basic block destination basic block, changes to composite elements of the equivalence group at every point after execution of an instruction included in said branch destination basic block, and for calculating an equivalence set after an execution of each instruction as a result of analysis of each instruction;

as reference instruction detection means for detecting, on receiving an equivalence set for an execution state of an instruction, transfer instructions and calculation instructions (hereinafter referred to as "reference instructions") which have resource names included in the equivalence set for the execution state of the instruction as a transfer origin and a transfer destination;

definition transfer instruction detection means for detecting definition transfer instructions which set a value of a source code of an instruction detected by the reference instruction detection means from all branch origin basic blocks;

replacement possibility judgment means for judging whether the replacement of the source code of an instruction detected by the reference instruction detection means with the source code of the definition transfer instruction detected by the definition transfer instruction detection means is possible, based on the equivalence set for the execution state of the reference instruction; and transfer instruction deletion means for writing the reference instruction when the replacement possibility judgment means judges that replacement is possible, and then deleting all of the definition transfer instructions in the branch origin basic blocks for the resource which was replaced.

23. The optimization apparatus of claim 22, wherein the replacement possibility judgment means includes:
an identical judging unit for judging whether the source code in all of the definition instructions detected by the definition transfer instruction detection means are the same; and
an existence judging unit for judging whether the source code of the definition transfer instruction and the source code of the instruction extracted by the second extracting means are included in an equivalence set for an execution state of a reference instruction which has a basic block which includes any extracted instruction as a branch destination,
wherein when the identical judging unit judges that the source codes are identical and the existence judging unit judges that an extracted instruction is included, the replacement possibility judgment means judges that replacement is possible.

24. The optimization apparatus of claim 23, wherein the transfer instruction deletion unit includes:
cost storage means for storing costs, which express at least one of a memory size and an execution time of an instruction, corresponding to a plurality of instructions; and
predicting means for predicting changes in at least one of memory size and execution time before and after replacement of source code in an extracted transfer instruction and deletion of a definition transfer instruction,
wherein the destination code is replaced and deletion is performed when the predicting means predicts that there is a reduction in at least one of execution time and memory size after replacement.

25. The optimization apparatus of claim 24, wherein the pre-execution state analysis means includes:
detection means for detecting a plurality of basic blocks which have a same basic block as a branch destination; and
set product calculation means for calculating elements in a pre-execution equivalence set of the branch destination basic block by finding a set product of the post-execution equivalence sets generated by the post-execution state analysis means of the basic blocks detected by the detection means.

26. The optimization apparatus of claim 25, further including:
state table storage means for storing a correspondence table, which has a plurality of resource names as index items and an entry cell corresponding to each index item, for each basic block; and
initialization means for detecting all codes showing a transfer origin resource (hereinafter called source code ) and all codes showing a transfer destination resource (hereinafter called destination code ) from the entire program, and for initializing entry cells by writing all the detected codes into an entry cell of each branch destination basic block in the correspondence tables,
wherein the post-execution state analysis means includes:
first extraction means for extracting, once the detected codes have been written by the initialization means, one instruction at a time from a present basic block in order from a start of the basic block to an ends;
instruction identifying means for identifying the extracted instruction;
first deletion means for deleting, when the extracted instruction has been identified as one of a transfer instruction and a calculation instruction, all of the codes written into an entry cell of the state table storage means which has a resource name of a destination code of the extracted instruction as an index item;
operand identifying means for identifying, when the extracted instruction has been identified as a transfer instruction and deletion has been performed by the first deletion means, resource names which are a source code and a destination code of said transfer instruction;
first writing means for writing the resource name identified as the destination code into a cell which has the resource name identified as the source code as an index item and for writing the resource name identified as the source code into a cell which has the resource name identified as the destination code as an index item;
indicating means for indicating a next extraction of an instruction to the first extracting means when writing by the first writing means has been performed; and
setting means for setting, after a final instruction has been extracted due to repetition of the indicating by the indicating means, a stored content of state table storage means as the post-execution equivalence sat of the present basic block.

27. The optimization apparatus of claim 26, wherein the pre-execution state analysis means includes establishing means for establishing a post-execution equivalence set in an entry cell corresponding to a branch destination basic block in a correspondence table stored by the state table storage means,
wherein the optimization apparatus further comprises:
reserve storage means for storing, once the establishing means has established the post-execution equivalence set, a copy of the post-execution equivalence set obtained from the state table storage means as a reserve;
first activating means for reactivating the post-execution state analysis means after the poat-execution equivalence set has been established in an entry cell by the establishing means;
collating means for collating a new equivalence set achieved in the state table storage means due to a reactivation of the post-execution state analysis means with the reserve stored in the reserve storage means, and for judging whether there has been any change to the reserve; and
second reactivation means for reactivating the post-execution state analysis means and the set product calculation means when the collating means judges that there is a change in a number of codes in the new equivalence set,
and wherein when the collating means judges that there is no change in a number of codes, the block internal analysis means sets a result of a most recent set product calculation as a pre-execution equivalence relation set before commencing analysis of equivalence relations for each instruction.

28. The optimization apparatus of claim 27, wherein the post-execution state analysis means further includes:
second writing means for expressing, in the state table storage means, register names and memory addresses which have a same stored value due to a transfer instruction identified by the instruction identifying means, by copying, when the operand identifying means identifies a register name as the source code and a register name as the destination code, all codes written into a entry cell which has the register name of the source code as an index item into an entry cell which has the register name of the destination code as an index item, and copying all codes written in an entry cell which has the register name of the destination code as an index item into an entry cell which has the register name of the source code as an index item.

* * * * *